(12) United States Patent
Agee

(10) Patent No.: US 12,228,656 B2
(45) Date of Patent: Feb. 18, 2025

(54) RESILIENT DESPREADING OF TERRESTRIAL NAVIGATION SIGNALS

(71) Applicant: Brian G. Agee, San Jose, CA (US)

(72) Inventor: Brian G. Agee, San Jose, CA (US)

( * ) Notice: Subject to any disclaimer, the term of this patent is extended or adjusted under 35 U.S.C. 154(b) by 89 days.

(21) Appl. No.: 18/195,786

(22) Filed: May 10, 2023

(65) Prior Publication Data

US 2023/0296787 A1     Sep. 21, 2023

Related U.S. Application Data

(63) Continuation of application No. 17/479,658, filed on Sep. 20, 2021, now Pat. No. 11,650,328, which is a continuation of application No. 16/701,144, filed on Dec. 2, 2019, now Pat. No. 11,125,888, and a continuation-in-part of application No. 15/731,417, filed on Jun. 5, 2017, now Pat. No. 10,775,510.

(60) Provisional application No. 62/773,605, filed on Nov. 30, 2018, provisional application No. 62/773,589, filed on Nov. 30, 2018, provisional application No.
(Continued)

(51) Int. Cl.
| | | |
|---|---|---|
| *G01S 19/24* | (2010.01) | |
| *G01S 19/21* | (2010.01) | |
| *H04B 1/707* | (2011.01) | |
| *H04B 7/10* | (2017.01) | |
| *H04L 27/26* | (2006.01) | |

(52) U.S. Cl.
CPC ............ *G01S 19/243* (2013.01); *G01S 19/21* (2013.01); *G01S 19/246* (2013.01); *H04B 1/707* (2013.01); *H04B 7/10* (2013.01); *H04L 27/2636* (2013.01)

(58) Field of Classification Search
CPC ............................. G01S 19/243; G01S 19/41
USPC .................................. 342/357.68, 455, 442
See application file for complete search history.

(56) References Cited

U.S. PATENT DOCUMENTS

| | | |
|---|---|---|
| 5,663,734 A | 9/1997 | Krasner |
| 5,781,156 A | 7/1998 | Krasner |
| 5,812,087 A | 9/1998 | Krasner |

(Continued)

FOREIGN PATENT DOCUMENTS

| | | |
|---|---|---|
| EP | 2908454 | 8/2015 |
| WO | 2016133719 | 8/2016 |
| WO | 2017062306 | 4/2017 |

OTHER PUBLICATIONS

Cheong, et. al., Characterizing the Signal Structure of Locata's Pseudolite-based Positioning System, in Proc. International Global Navigation Satellite Systems Society IGNSS Symposium 2009, Dec. 1-3, 2009, Paradise, Qld, Australia.
(Continued)

*Primary Examiner* — Bo Fan
(74) *Attorney, Agent, or Firm* — Steven J Shattil

(57) ABSTRACT

A method and apparatus resiliently despreads terrestrial navigation signals in which the spreading code duration is equal to an underlying baseband symbol rate, including ground beacons based on civil GNSS waveforms, and malicious spoofers. Symbol-rate synchronous channelizers exploit the baseband symbol rate, and means for blindly and resiliently detecting and determining geo-observables of those signals are described. Disclosed techniques can despread signals in arbitrary multipath, and subject to near-far interference in which the relative strength of the interferer is much higher than the despreading gain of the receiver, including near-far tonal and narrowband co-channel interference.

24 Claims, 23 Drawing Sheets

Related U.S. Application Data

62/429,029, filed on Dec. 1, 2016, provisional application No. 62/392,623, filed on Jun. 6, 2016.

(56) References Cited

U.S. PATENT DOCUMENTS

| | | | |
|---|---|---|---|
| 5,831,574 | A | 11/1998 | Krasner |
| 5,841,396 | A | 11/1998 | Krasner |
| 5,945,944 | A | 8/1999 | Krasner |
| 7,250,903 | B1 | 7/2007 | McDowell |
| 7,453,413 | B2 | 11/2008 | Larry et al. |
| 7,577,464 | B2 | 8/2009 | Ezal et al. |
| 7,616,682 | B2 | 11/2009 | Small |
| 7,848,397 | B2 | 12/2010 | Small |
| 7,936,305 | B2 | 5/2011 | Small |
| 8,009,098 | B2 | 8/2011 | Lamance |
| 8,130,141 | B2 | 3/2012 | Pattabiraman et al. |
| 8,218,692 | B2 | 7/2012 | Lorenzelli |
| 8,259,858 | B2 | 9/2012 | Ruelke et al. |
| 8,305,265 | B2 | 11/2012 | Ezal et al. |
| 8,629,803 | B2 | 1/2014 | Pattabiraman et al. |
| 8,704,728 | B2 | 4/2014 | Mujahed et al. |
| 8,804,808 | B1 | 8/2014 | Dybdal et al. |
| 8,917,209 | B2 | 12/2014 | Krasner et al. |
| 8,934,844 | B2 * | 1/2015 | Small .................... H01Q 21/00 455/562.1 |
| 8,977,843 | B2 * | 3/2015 | Gutt ........................ H04L 45/00 713/168 |
| 9,035,829 | B2 | 5/2015 | Raghupathy et al. |
| 9,059,784 | B2 * | 6/2015 | Enge ........................ H04K 3/90 |
| 9,097,798 | B2 | 8/2015 | Martens et al. |
| 9,119,165 | B2 | 8/2015 | Krasner et al. |
| 9,176,217 | B2 | 11/2015 | Krasner et al. |
| 9,176,231 | B2 | 11/2015 | Whelan et al. |
| 9,178,894 | B2 | 11/2015 | O'Connor et al. |
| 9,392,410 | B2 | 7/2016 | Sendonaris |
| 9,523,763 | B2 | 12/2016 | Lawrence et al. |
| 9,645,249 | B2 | 5/2017 | Krasner et al. |
| 9,654,158 | B2 | 5/2017 | Dafesh et al. |
| 9,739,872 | B2 | 8/2017 | Krasner et al. |
| 9,748,815 | B2 | 8/2017 | Tanaka et al. |
| 9,801,153 | B2 | 10/2017 | Raghupathy et al. |
| 9,860,866 | B2 | 1/2018 | Sendonaris |
| 9,874,624 | B2 | 1/2018 | Mahmood et al. |
| 9,913,273 | B2 | 3/2018 | Seibert |
| 9,933,526 | B2 | 4/2018 | Gates et al. |
| 9,967,845 | B2 | 5/2018 | Raghupathy et al. |
| 9,992,761 | B2 | 6/2018 | Shvodian et al. |
| 10,162,060 | B2 | 12/2018 | Jaeckle |
| 10,175,945 | B2 | 1/2019 | Kalkunte et al. |
| 10,194,269 | B2 | 1/2019 | Venkataraman et al. |
| 10,194,395 | B2 | 1/2019 | Raghupathy et al. |
| 10,203,397 | B2 | 2/2019 | Sendonaris et al. |
| 10,231,201 | B2 | 3/2019 | Meiyappan et al. |
| 10,254,379 | B2 | 4/2019 | Sendonaris et al. |
| 10,281,556 | B2 | 5/2019 | Mahmood et al. |
| 10,444,369 | B2 | 10/2019 | Raghupathy et al. |
| 10,470,129 | B2 | 11/2019 | Raghupathy et al. |
| 10,470,184 | B2 | 11/2019 | Seibert |
| 10,598,757 | B2 | 3/2020 | Gates et al. |
| 11,125,888 | B2 | 9/2021 | Agee |
| 2019/0101652 | A1 | 4/2019 | Jaeckle |

OTHER PUBLICATIONS

Lamance, et. al., Locata Correlator-Based Beam Forming Antenna Technology for Precise Indoor Positioning and Attitude, in Proc. International Technical Meeting of the Satellite Division of The Institute of Navigation, Sep. 13-23, 2011, Portland, OR, pp. 2436-2445.

Amt, et. al., Flight Testing of a Pseudolite Navigation System on a UAV, in Proc. ION Conference, Jan. 2007.

Rizos, et. al., Locata: A new high accuracy indoor positioning system, in Proc. 2010 International Conference on Indoor Positioning and Indoor Navigation (IPIN), Sep. 15-17, 2010, Zurich, Switzerland.

Rizos, et. al., Locata: A Positioning System for Indoor and Outdoor Applications Where GNSS Does Not Work, in Proc. 18th Association of Public Authority Surveyors Conference (APAS2013), Mar. 12-14, 2013, Cnberra, Australian Capital Territory, Australia, pp. 73-83.

Global Satellite Navigation Sattelite System GLONASS Interface Control Document, Navigational Radiosignal in Bands L1, L2, Edition 5.1, 2008, Russian Institute of Space Device Engineering, Moscow.

European GNSS (Galileo) Open Service Signal in Space Interface Control Document, European Union, Nov. 2015.

BeiDou Navigation Satellite System Signal in Space Interface Control Document, Open Service Segmenr (version 2.0), China Satellite Navigation Office, Dec. 2013.

Quasi-Zenith Satellite System Navigation Service, Interface Specification, Satellite Positioning, Navigation, and Timing (IS-QZSS-PNT-003), The Cabinet Office, Government of Japan (CAO) and Quazi-Zenith Satellite System Services, Inc., Aug. 30, 2016.

Indian Regional Navigation Satellite System, Signal in Space for Standard Positioning Service, Version 1.0 (ISRO-IRNSS-ICD-SPS-1.0), Satellite Navigation Programme, ISRO Satellite Centre, Indian Space Research Organization, Bangalore, India, Jun. 2014.

Dunn (authenticated by), Global Positioning Systems Directorate, Systems Engineering & Integration, Interface Specification IS-GPS-705, Navstar GPS Segment/User Segment L5 Inferface, Mar. 21, 2014.

Dunn (authenticated by), Global Positioning Systems Directorate, Systems Engineering & Integration, Interface Specification IS-GPS-200, Navstar GPS Space Segment/Navigation User Interfaces, Mar. 21, 2014.

J. Bruce, K.Snow, "Final Technical Report, Teal Wing Program," Probe Systems Technical Report No. PSI-ER-327, Oct. 1974 (pp. 3-43 to 3-46).

W. Gardner, Statistical Spectral Analysis: A Nonprobabilistic Theory, Prentice-Hall, Englewood Cliffs, NJ, 1987.

G. Golub, C. Van Loan, Matrix Computations, 3rd Edition, The John Hopkins University Press, London: 1996 (Cover, ToC, pp. 223, 231-233).

J. Rissanen; "Modeling By Shortest Data Description"; International Federation of Automatic Control Pergamon Press Ltd. 1978. Printed in Great Britain.

B.G. Agee; "Solving the Near-Far Problem: Exploitation of Spatial and Spectral Diversity in Wireless Personal Communication Networks"; 1993 MPRG Workshop on Mobile Communications Virginia Polytechnic Institute, Blacksburg VA, 1993; Jun. 11, 1993.

S.Schell, B.G. Agee; "Application of the SCORE Algorithm and SCORE Extensions to Sorting in the Rank-L Spectral Self-coherence Environment"; Twenty-Second Asilomar Conference on Signals, Systems and Computers Year: 1988.

B.G. Agee; "The Property Restoral Approach to Blind Adaptive Signal Extraction," Ph.D. dissertation, Dept. Electrical Engineering and Computer Science, University of California, Davis, 1989.

B.G. Agee, et al.;"Spectral Self-coherence Restoral: A New Approach to Blind Adaptive Signal Extraction Using Antenna Arrays"; Proc. IEEE, V. 78 No. 4, pp. 753-767.

B.G. Agee; "The Copy/DF Approach to Signal-Specific Emitter Location"; 1991 Conference Record of the Twenty-Fifth Asilomar Conference on, At Pacific Grove, CA. Nov. 1991.

B.G. Agee; "Solving the Near-Far Problem: Exploitation of Spatial and Spectral Diversity in Wireless Personal Communication Networks"; Wireless Personal Communications: Trends and Challenges, ISBN: 978-1-4613-6190-9; Jan. 1994.

J. Madhow, et al.; "MMSE Interference Suppression for Direct-Sequence Spread-Spectrum Cdma"; IEEE Transactions on Communications I vol. 42, Issue: 12; Year: 1994.

B.G.Agee, et al.; "Exploitation of Signal Structure in Array-Based Blind Copy and Copy-Aided DF Systems"; Acoustics, Speech and Signal Processing, 1998. Proceedings of the 1998 IEEE International Conference on, vol. 4.

(56) References Cited

OTHER PUBLICATIONS

J. Madhow; "Blind Adaptive Interference Suppression for Direct-Sequence CDMA"; Proceedings of the IEEE Year: 1998 | vol. 86, Issue: 10.

J. Madhow and M.L. Honig; "On the Average near-far resistance for MMSE detection of direct-sequence CDMA signals with random spreading"; IEEE Transactions on Information Theory; Year: 1999 | vol. 45, Issue: 6.

M.G. Amin; "A Novel Interference Suppression Scheme for Global Navigation Satellite Systems Using Antenna Array"; IEEE Journal on Selected Areas in Communications, vol. 23, No. 5, May 2005.

W. Sun and M. Amin; "A Self-Coherence Based Anti-Jam GPS Receiver"; IEEE Workshop on Statistical Signal Processing, Year: 2003.

M. Sahmoudi, et al.; "Acquisition of Weak GNSS Signals Using a New Block Averaging Pre-Processing"; 2008 IEEE/ION Position, Location and Navigation Symposium; Year: 2008.

Global Position Systems Directorate Systems Engineering & Integration, Interface Specification IS-GPS-200; Spe 24, 2013.

A.J. Kerns, et al.; "Unmanned Aircraft Capture and Control via GPS Spoofing"; Journal of Field Robotics 31(4)—Jul. 2014.

T. Kraus, et al.; "Survey of In-Car Jammers—Analysis and Modeling of the RF signals and IF samples (suitable for active signal cancellation)"; Proceedings of the 24th International Technical Meeting of the Satellite Division of The Institute of Navigation (ION GNSS 2011), Sep. 20-23, 2011.

D. Mccarthy, et al.; "Tips and Tricks for finding GNSS Jammers—A Field Study"; Proceedings of the 27th International Technical Meeting of the Satellite Division of The Institute of Navigation (ION GNSS+ 2014) Sep. 8-12, 2014.

L. Purdue; "An Examination of Low SWaP-C Anti-Jam Techniques"; ION Institute of Navigation, Joint Navigation Conference; Jul. 10, 2019.

B. Abbott and L. Purdue; "Using Sensor Fusion to Detect, Mitigate, and Protect against GNSS threats"; ION Institute of Navigation, Joint Navigation Conference; Jul. 10, 2019.

K. D. Snow, et al, "Teal Wing Program: Principals of Spread Spectrum Intercept," Probe Systems Report PSI-ER-5419-05, Probe Systems, Inc., Sunnyvale California, Unclassified, Feb. 1978.

F. van Graas and S. Meiyappan; "Terrestrial GPS Augmentation with a Metropolitan Beacon System"; Presentation to: National Space-Based Positioning, Navigation, and Timing Advisory Board; Dec. 10, 2014.

Metropolitan Beacon System (MBS) ICD Version G1.0 (An Implementation of a Terrestrial Beacon System); NextNav; 2015.

J. Vogedes; "Metropolitan Beacon System (MBS) ICD"; Internet Engineering Task Force; IETF Trust; Apr. 1, 2014.

\* cited by examiner

FIG. 4

Exemplary Pertinent Civil GNSS Modulation Formats

| Format (Orbit) | Ranging Code Modulation | Code Period | Exploitable symbol stream properties |
|---|---|---|---|
| GPS C/A (MEO) | • 50 sps BPSK, repeated 20 times (1 ksps symbol stream), I rail<br>• No modulation, Q rail | 1 ms (1,023 chips) | • 1:20 repeated symbol sequence<br>• BPSK symbol stream<br>• Constant-modulus symbol stream |
| GPS L5 (MEO), QZSS (GSO) | • 50 sps BPSK, rate ½ encoded to 100 sps, modulated by 10-bit Neuman-Hoffman code (1 ksps symbol stream), I rail<br>• Repeated 20-bit (20 ms) Neuman-Hoffman code, Q rail | 1 ms (10,230 chips) | • Known pilot, 20 ms period, Q rail<br>• Constant-modulus symbol stream |
| GLONASS C/A (MEO) | • 50 sps BPSK, modulated by 2-bit meander code (100 sps base symbol stream), I rail<br>• No modulation, Q rail | 1 ms (511 chips) | • 1:10 (effective) symbol sequence<br>• Constant-modulus symbol stream |
| Galileo E5A (MEO) | • 50 sps BPSK, modulated by 20-bit secondary code (1 ksps symbol stream), I rail<br>• Repeated 100-bit (100 ms) secondary code, Q rail | 1 ms (10,230 chips) | • Known pilot, 100 ms period, Q rail<br>• Constant-modulus symbol stream |
| Galileo E5B (MEO) | • 250 sps BPSK, modulated by 4-bit secondary code (1 ksps symbol stream), I rail<br>• Repeated 100-bit (100 ms) secondary code, Q rail | 1 ms (10,230 chips) | • Known pilot, 100 ms period, Q rail<br>• Constant-modulus symbol stream |
| Galileo E6B, E6C (MEO) | • 1,000 sps BPSK (1 ksps symbol stream), I rail<br>• Repeated 100-bit (100 ms) secondary code, Q rail | 1 ms (5,115 chips) | • Known pilot, 100 ms period, Q rail<br>• Constant-modulus symbol stream |
| Beidou 1B (MEO) | • 50 sps QPSK, modulated by 20-bit secondary code (1 ksps symbol stream) | 1 ms (2,046 chips) | • Constant-modulus symbol stream |
| NAVIC (IRNSS) SPS-L5, SPS-S (all GSO) | • 25 sps BPSK w/ rate ½ encoded to 50 sps, repeated 20 times (1 ksps base symbol stream), I rail<br>• No modulation, Q rail | 1 ms (1,023 chips) | • 1:20 (effective) symbol sequence<br>• BPSK symbol sequence<br>• Constant modulus symbol sequence |
| NAVIC (IRNSS) RS BOC (GSO) | • Repeated 40-bit (160 ms) secondary code, I rail<br>• 250 sps BPSK, ~ ½ dB below pilot, Interplex signal, Q rail<br>• BOC (5,2) chip shaping (±5.115 MHz offset from SPS) | 4 ms (8,184 chips) | • Known pilot, 160 ms period, I rail<br>• Asymmetric 250 sps symbol stream |

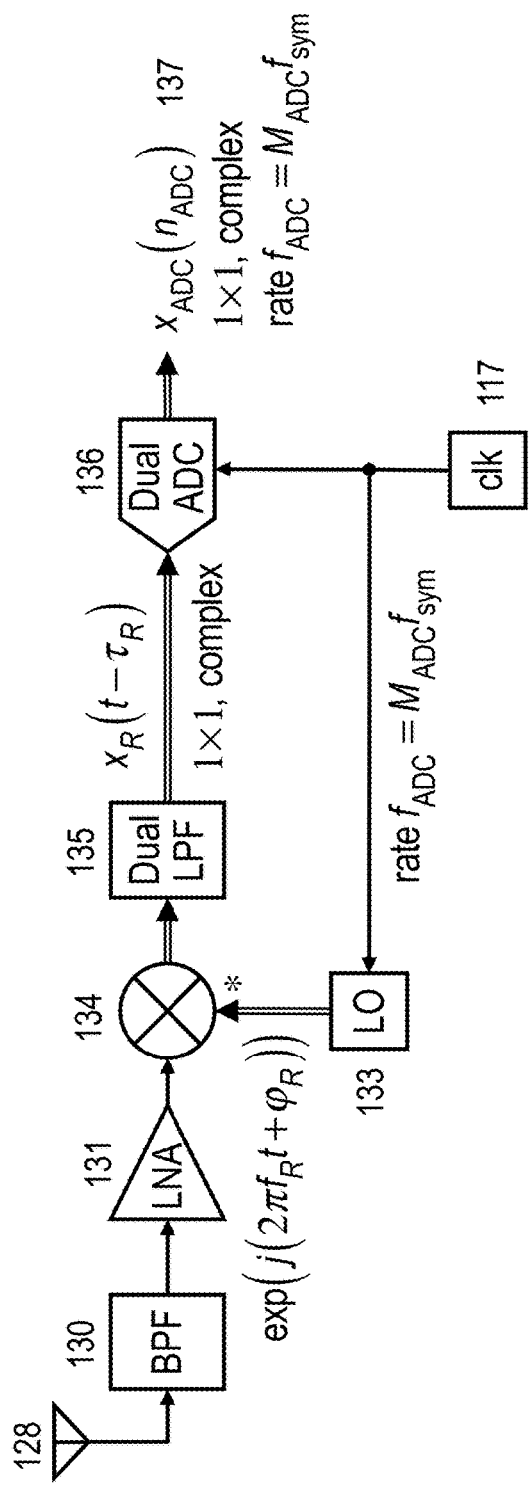
FIG. 5A: Direct Conversion Dedicated Receiver Front-End
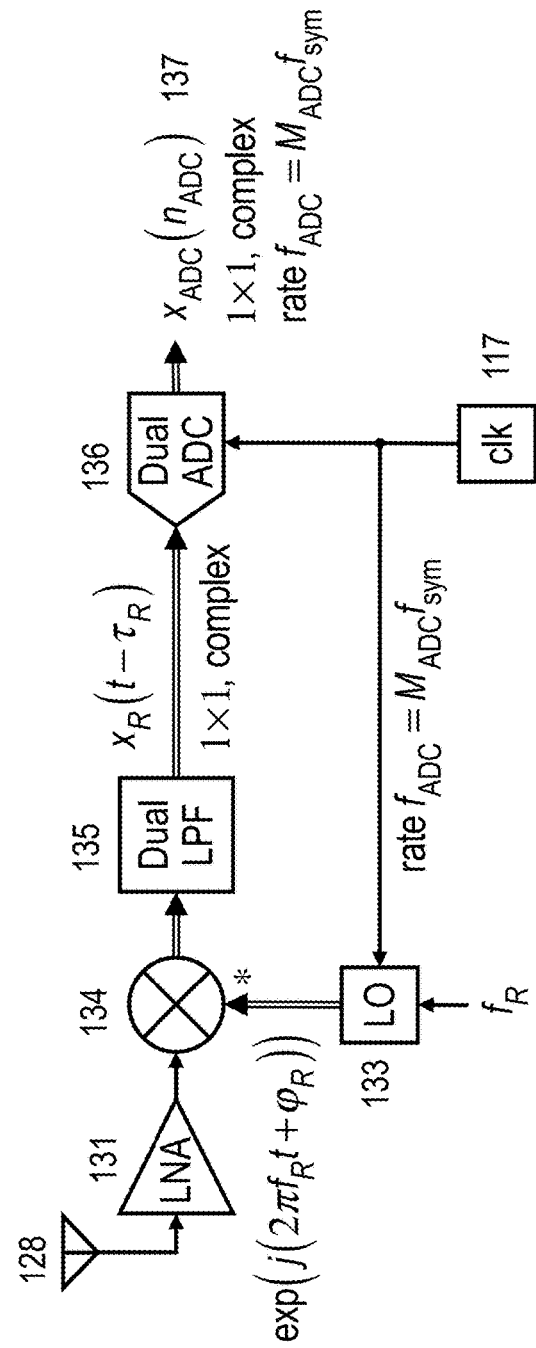
FIG. 5B: Direct Conversion SDR Receiver Front-End

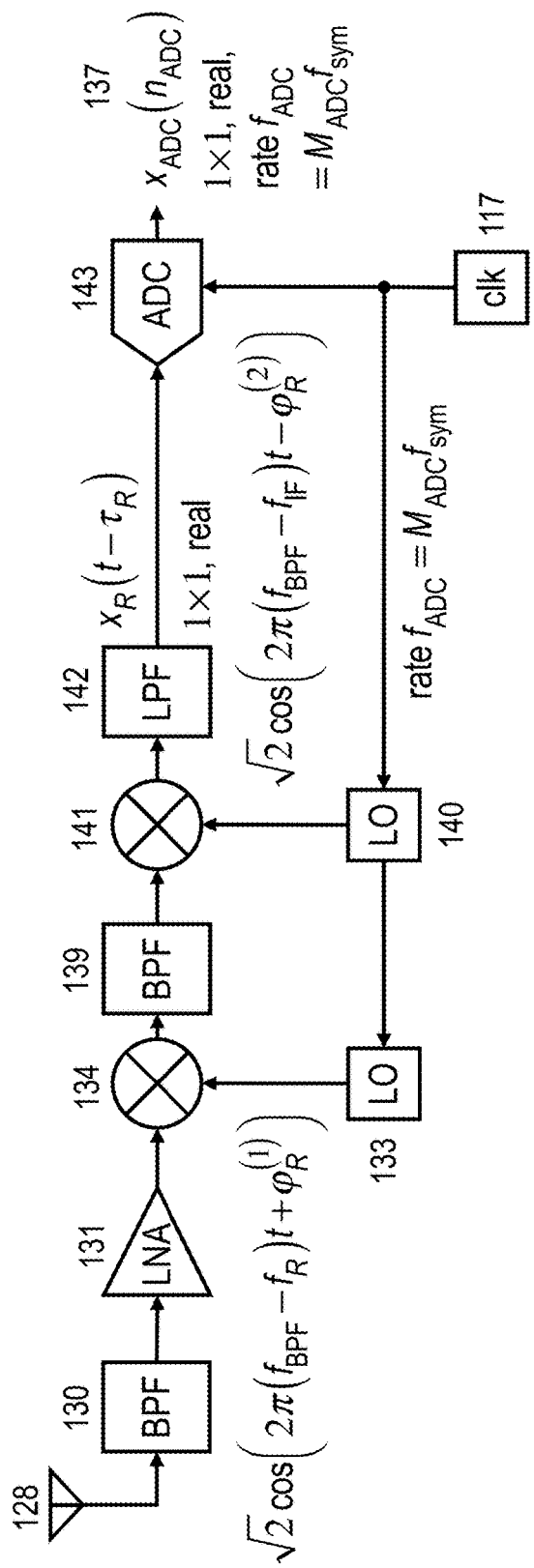
FIG. 6A: Superheterodyne Dedicated Receiver Front-End
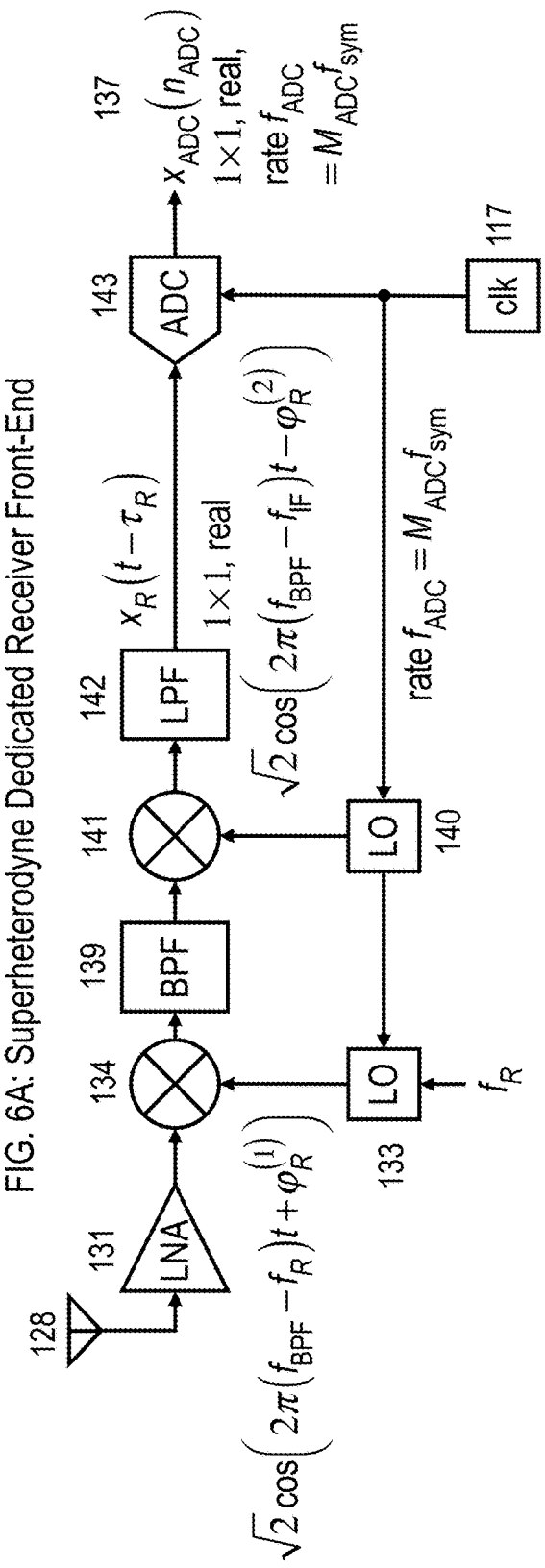
FIG. 6B: Superheterodyne SDR Receiver Front-End

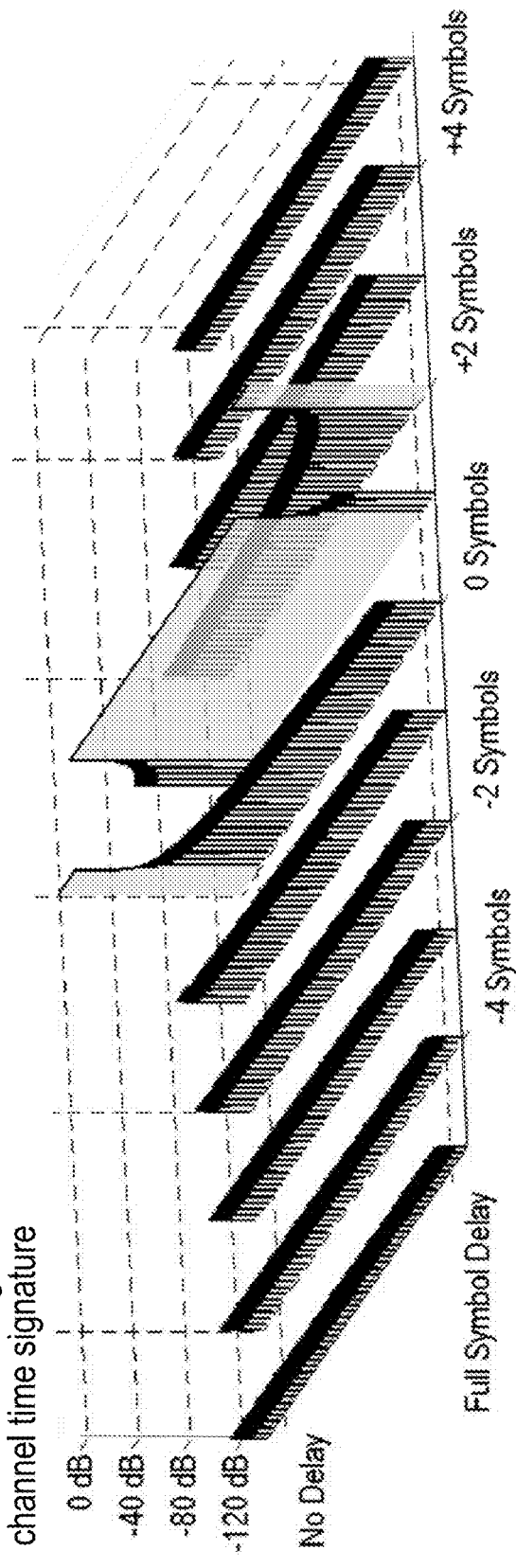
FIG. 12A: Rectangular window channel time signature
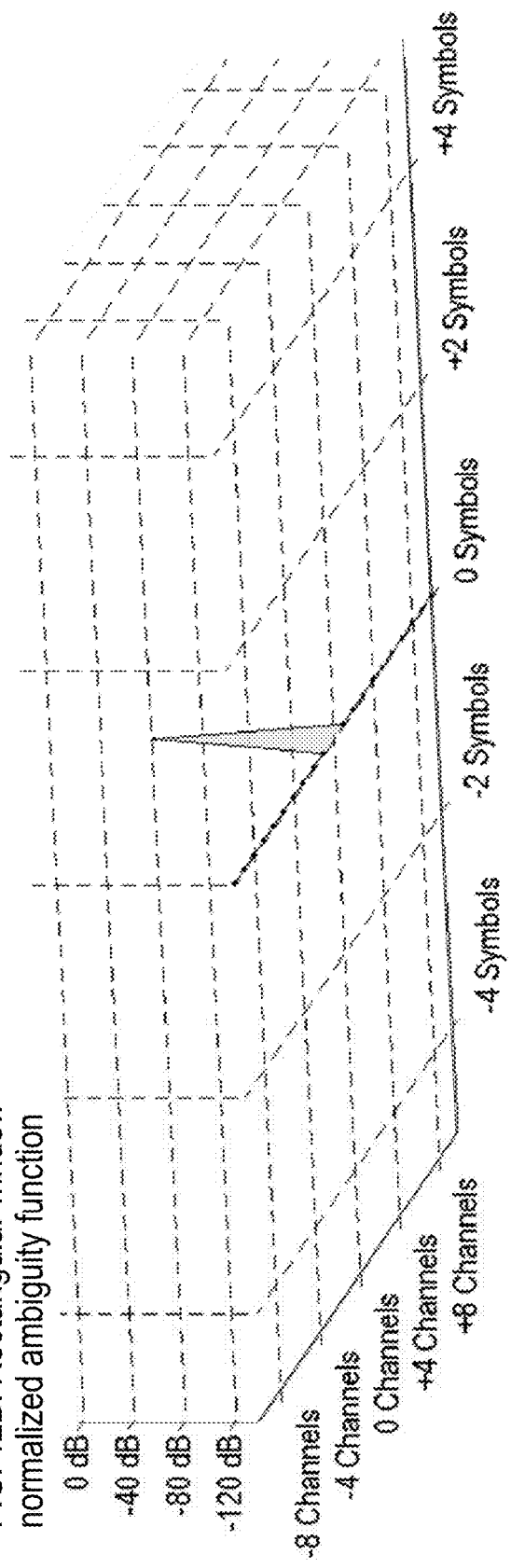
FIG. 12B: Rectangular window normalized ambiguity function

FIG. 16

Exemplary Multi-Subband GPS L1 Legacy Signal Despreader Parameters, 960 kHz Integration Bandwidth

| | | 1 | 2 | 3 | 4 | 5 | 6 |
|---|---|---|---|---|---|---|---|
| Receive feeds | $M_{feed}$ | 1 | 2 | 3 | 4 | 5 | 6 |
| Dual-ADC rate* | $f_{ADC}$ | 1.92 Msps | 1.92 Msps | 1.92 Msps | 1.92 Msps | 1.92 Msps | 1.92 Msps |
| S/P size | $M_{ADC}$ | 1,920 | 1,920 | 1,920 | 1,920 | 1,920 | 1,920 |
| FFT size | $K_{FFT}$ | 1,920 | 1,920 | 1,920 | 1,920 | 1,920 | 1,920 |
| FFT bins used** | $K_{chn}$ | 960 | 960 | 960 | 960 | 960 | 960 |
| No. subbands | $K_{sub}$ | 16 | 32 | 48 | 64 | 80 | 96 |
| Bins/subband | $M_{sub}$ | 60 | 30 | 20 | 15 | 12 | 10 |
| Adapt DoF's | $M_{DoF}$ | 60 | 60 | 60 | 60 | 60 | 60 |
| Complexity | Mop/s | O(57.6) | O(115.2) | O(172.8) | O(230.4) | O(288) | O(345) |
| Converge time | ms | O(60) | O(60) | O(60) | O(60) | O(60) | O(60) |

* Compatible, Ettus Research B200mini Series USRP, 61.44 Msps true ADC rate, 32:1 decimation in FPGA

** Compatible, antialiasing LPF shape factor of 3

FIG. 17

Exemplary Multi-Subband GPS L5 Civil Signal Despreader Parameters, 7.68 MHz Integration Bandwidth

| Receive feeds | $M_{feed}$ | 1 | 2 | 3 | 4 | 5 | 6 |
|---|---|---|---|---|---|---|---|
| Dual-ADC rate* | $f_{ADC}$ | 15.36 Msps | 15.36 Msps | 15.36 Msps | 15.36 Msps | 15.36 Msps | 15.36 Msps |
| S/P size | $M_{ADC}$ | 15,360 | 15,360 | 15,360 | 15,360 | 15,360 | 15,360 |
| FFT size | $K_{FFT}$ | 15,360 | 15,360 | 15,360 | 15,360 | 15,360 | 15,360 |
| FFT bins used* | $K_{chn}$ | 9,600 | 9,600 | 9,600 | 9,600 | 9,600 | 9,600 |
| No. subbands | $K_{sub}$ | 160 | 320 | 480 | 640 | 800 | 960 |
| Bins/subband | $M_{sub}$ | 60 | 30 | 20 | 15 | 12 | 10 |
| Adapt DoF's | $M_{DoF}$ | 60 | 60 | 60 | 60 | 60 | 60 |
| Complexity | Mop/s | O(576) | O(1,152) | O(1,728) | O(2,304) | O(2,880) | O(3,456) |
| Converge time | ms | O(60) | O(60) | O(60) | O(60) | O(60) | O(60) |

* Compatible, Ettus Research B200mini Series USRP, 61.44 Msps true ADC rate, 4:1 decimation in FPGA
** Compatible, antialiasing LPF shape factor of 2.2.

RESILIENT DESPREADING OF TERRESTRIAL NAVIGATION SIGNALS

CROSS REFERENCE TO RELATED APPLICATIONS

This application is a Continuation of U.S. patent application Ser. No. 17/479,658, filed Sep. 20, 2021, now U.S. Pat. No. 11,650,328; which is a Continuation of U.S. patent application Ser. No. 16/701,144, filed on Dec. 2, 2019, now U.S. Pat. No. 11,125,888; which claims priority to Provisional Appl. No. 62/773,589, filed Nov. 30, 2018, and Provisional Appl. No. 62/773,605, filed Nov. 30, 2018; and U.S. patent application Ser. No. 16/701,144 is a Continuation-in-Part of U.S. patent application Ser. No. 15/731,417, filed Jun. 5, 2017, now U.S. Pat. No. 10,775,510; which claims priority to Provisional Appl. No. 62/392,623, filed Jun. 6, 2016, and Provisional Appl. No. 62/429,029, filed Dec. 1, 2016; all of which are hereby incorporated by reference in their entireties and all of which this application claims priority under at least 35 U.S.C. 120 and/or any other applicable provision in Title 35 of the United States Code.

FIELD OF THE INVENTION

Aspects of the disclosure relate generally to location determination, and more particularly to detecting or determining geo-observables of navigation signals transmitted by satellite vehicles (SV's) in Global Navigation Satellite Systems (GNSS), airborne non-SV beacons (e.g., pseudolites), and ground-based beacons.

BACKGROUND

The American Global Positioning System (GPS) L1 coarse acquisition signal (commonly referred to as the "L1 C/A signal," or more recently as the "L1 legacy signal"), originally developed as a means for aiding acquisition of the military-grade P (later encrypted P(Y)) code, has gained near-ubiquitous use as a means for navigation and carrier/timing synchronization in civil positioning, navigation, and timing (PNT) systems. This is due in part to the GPS network's worldwide visibility; the publicly disclosed and well-known structure of the L1 C/A signal-in-space (SiS); and the ready availability of mature, low-cost hardware for receiving the L1 C/A signal.

The success of the GPS L1 C/A signal has resulted in incorporation of "civil" modes in all of the Global Navigation Satellite System (GNSS) signals developed to date, e.g., the GLONASS, Galileo, Beidou, and NAVIC/IRNSS signals. In addition, the need for additional precision to support civil PNT operation in urban canyons and autonomous navigation systems has spurred the development of the wideband civil GPS L5, Galileo E5B, and E6B/C modes, and the Japanese Quasi-Zenith Satellite System (QZSS), which is transmits a version of the civil GPS L5 signal from geosynchronous orbit. Moreover, similar civil signal modes have been proposed as GNSS-like ground and air beacons, such as the Locata's LocataLite signal, which emulates the GPS C/A signal with a ×10 spreading rate in the 2.4-2.485 GHZ ISM band. All of these civil modes possess a common modulation format, referred to herein as modulation-on-symbol direct-sequence spread spectrum (MOS-DSSS), in which a baseband symbol stream, typically (but not always) operating at a 1,000 sample-per-second (1 ksps) symbol rate, is modulated by a higher-rate ranging code that repeats every symbol.

Since its inception, the only method used to acquire, demodulate, and determine geo-observables of these navigation signals in PNT applications has been matched-filter despreading methods. These methods operate by correlating the ranging code (or a set of ranging codes that the transmitter may be using) against the received signal and adjusting the carrier and timing offset of that code (referred to herein as geo-observables of the received navigation signal) until it aligns with the code received from the GNSS transmitter. However, matched filter despreading possesses inherent limitations that can degrade its performance in many reception environments. Known limitations include the following:

Slow cold-start time-to-first-fix (TTFF), even in the most benign environments. In a cold start scenario, the receiver does not know the specific ranging codes used by any of the GNSS satellite vehicles, nor does it know the timing phase or frequency offset of those codes, hence it must search over code, timing, and frequency to synchronize with a single satellite. Cold-start TTFF can be on the order of minutes, and in addition can be quite power consumptive.

High sensitivity to multipath interference, including inadvertent multipath induced by the specular reflectors in the vicinity of the receiver, which can distort the ranging codes and degrade or destroy correlation peaks, and synthetic multipath induced by malicious repeaters. Inadvertent multipath is especially acute in urban and indoor navigation and localization scenarios.

High susceptibility to strong co-channel interference, including near-far interference from local beacons, malicious non-targeted spoofing signals, and malicious jamming signals. The GNSS signals deployed to date only provide a despreading gain of 30-40 dB, based on the chip-rate of the GNSS ranging codes, most of which is needed to raise the GNSS signal above the background noise; hence the signal is easily jammed by many types of interference. An additional 10-13 dB gain can be obtained by exploiting additional structure of the baseband symbol stream. However, this further increases TTFF in cold-start acquisition scenarios.

High susceptibility to targeted or "aligned" covert spoofers that can use knowledge of the ranging code from the satellite and rough location of the receiver platform to duplicate and attempt to supplant signals from those satellites.

Reliance on ancillary anti-spoofing (AS) codes, e.g., the GPS L1 P(Y) code, to overcome jamming and spoofing events. This reliance increases the cost of the receiver, limits AS capability to a subset of military receivers (again, with inherently higher cost), and introduces a host of physical security measures and restrictions to prevent compromise of AS-capable receivers.

Need to maintain a library of all of the GNSS ranging codes, or seeds used to initiate the codes, in order to implement the despreader. This can complicate the receiver architecture, especially for "multi-GNSS receivers" that are designed to exploit civil signals generated by multiple families of satellites.

Moreover, there is a perceived (but not real) need for matched-filter despreaders to receive and sample signals over wide bandwidths, constrained to a large integer multiple of the ranging code chip-rate, e.g., 1.023 million chips per second (Mcps) for the GPS C/A code, and 10.23 Mcps for the GPS L5 short code, in order to fully exploit the processing gain of the code, overcome aforementioned channel multipath effects, and (in military GPS receivers)

exploit moderate and long codes overlaid on top of the short civil code. This perceived need is further complicated in multi-GNSS radios, which must accommodate wide ranges of chip rates and bandwidths.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that follows.

Disclosed aspects provide for detecting and obtaining geo-observables of navigation signals generated by satellite vehicles (SV's) in Global Navigation Satellite Systems (GNSS), and generated by ground-based or airborne non-SV beacons, e.g., pseudolites. This includes effecting detection and geo-observable estimation in environments populated with many sources, including malicious sources intending to disrupt or subvert information provided by legitimate sources, for example, non-GNSS jammers, spoofers that emulate GNSS signals, and repeaters that can record and replay environments containing true GNSS signals. Furthermore, this includes effecting said detection and geo-observable estimation in environments subject to potentially severe differences in power levels between such signals, for example, "near-far interference" between remote GNSS signals and nearby ground or air based beacons, jammers, and spoofers.

Aspects of the disclosure can achieve these and other goals by exploiting the massive spectral redundancy of navigation signals employing modulation-on-symbol direct-sequence spread spectrum (MOS-DSSS) modulation formats, in which a baseband symbol sequence is spread by a ranging code that repeats every each baseband symbol. Novel and powerful methods for exploiting this signal structure are introduced. For example, aspects described herein can exploit the time, frequency and code diversity of those signals, to implement adaptive linear combining methods and linear-algebraic combiner adaptation algorithms to detect all of the MOS-DSSS navigation signals in the received environment at the maximum signal-to-interference-and-noise ratio (max-SINR) achievable by the combiners; estimate key geo-observables of those detected signals; identify detected malicious sources ahead of or during PNT acquisition and tracking operations; prevent those malicious sources from corrupting or subverting the PNT operation; and optionally alert the receiver to the presence of those sources, and/or geolocate those malicious sources. In aspects employing multifeed receivers wherein multiple spatial and/or polarization diverse antennas are coupled to multiple receivers that are receptive to the MOS-DSSS navigation signals, aspects of the disclosure can additionally exploit the additional spatial and/or polarization diversity of navigation and non-navigation (e.g., jamming) signals to further remove non-navigation signals from the received MOS-DSSS navigation signals, and to remove targeted spoofing signals that closely emulate the time, frequency, and code diversity of navigation signals the spoofers are intending to displace at a victim receiver.

Moreover, such aspects can perform all of these operations without knowledge of, a search over, or synchronization to the specific ranging codes employed by each navigation signal. As a consequence, the system described herein can enable faster time-to-first-fix (TTFF) than conventional navigation receivers that require a search over ranging code parameters, and additional robustness to multipath interference (including synthetic multipath induced by repeaters) that can impair that search. Disclosed aspects also provide enhanced compatibility with implementations employing software-defined radio (SDR) architectures, including general-purpose SDR (GPSDR) architectures that are not optimized to GNSS applications, further improving cost and flexibility of the system.

Aspects disclosed herein can adapt symbol-rate (e.g., not chip-rate) synchronous reception and channelization structure, using both purpose-built equipment designed specifically for GNSS bands and signals of interest, or general-purpose software-defined receiver (GPSDR) equipment, e.g., Ettus Research Universal Research Software Peripheral (USRP) radios such as the B200mini-series device, which can employ a much wider range of sampling rates and bandwidths, and which employ analog-to-digital converters (ADC) with 8 or more bits per in-phase (I) and quadrature (Q) rail, allowing implementation of sophisticated jammer mitigation techniques and operation in severe multipath environments. This is in contrast to GNSS-specific SDR (GNSS-SDR) equipment, e.g., the Maxim MAX2769 series of Universal GNSS Receivers, which are employ ADC's with sampling rates preset to integer multiple of the GNSS chip-rate, e.g., 16.238 Msps (16×1.023 Msps), and with ADC precisions of 1-2 bits per I and Q rail, or 3 bits per I rail, thereby substantively worsening the receivers' vulnerability to jamming measures and severe multipath.

Aspects disclosed herein can be configured to operate in devices, systems, and methods disclosed in nonprovisional patent application Ser. No. 15/731,417, "Blind Despreading of Civil GNSS Signals for Resilient PNT Applications" (the '417 NPA), incorporated herein by reference. Such aspects can be employed in a method, system, and/or apparatus for receiving, blindly despreading, and determining geo-observables, of true civil Global Navigation Satellite Systems (GNSS) navigation signals generated by any of the set of satellite vehicles and ground beacons, amongst false echoes and malicious GNSS signals from spoofers and repeaters; for identifying malicious GNSS signals, and preventing those signals from corrupting or capturing PNT tracking operations; and for geolocating malicious GNSS signals. Some aspects can be configured for spatial/polarization diverse receivers that remove non-GNSS jammers received by the system, as well as targeted GNSS spoofers that can otherwise emulate GNSS signals received at victim receivers.

Aspects of the disclosure are further described for exploiting navigation signal modulation formats in which a component of the baseband symbol sequence, referred to herein as a "pilot signal," is periodically repeated. Novel and powerful methods for exploiting this signal structure is an additional focus of aspects disclosed herein. For example, means are described for exploiting the period or content of those pilot signals to effect "partially blind" signal detection and geo-observable estimation methods that are highly efficient relative to equivalent "fully blind" methods that exploit more general properties of the baseband symbol sequence; and that can perform this detection and geo-observable estimation at much lower received incident powers (RIP's) than equivalent fully-blind methods.

Aspects of the disclosure are further described for exploiting navigation or symbol streams provided by third parties.

It is known that fully-blind despreading methods introduce complexity inherent to the goals and needs of the method; specifically, the demodulation (symbol estimation) step. This step inherently requires a despreader output signal-to-noise ratio (SNR) that is high enough to determine the baseband symbols after integration over each symbol, or to demodulate the navigation sequence after integration over each navigation symbol. This introduces a fundamental "acquisition threshold" for any fully blind method, i.e., the received incident power (RIP) or despread signal-to-inference-and-noise ratio (SINR) at which navigation signals can be reliably demodulated by the methods, or for that matter for any conventional matched-filter despreading method. This also places a limit on the accuracy of any geo-observable estimation algorithm that relies on that demodulated navigation data, which will be degraded by errors in that data.

However, in many use scenarios, baseband symbol or navigation sequences can be obtained from third-party sources. For example, in some use scenarios, PNT-capable platforms may possess GNSS reception devices that can receive, despread, and demodulate navigation data on their own in non-challenged environments. For example, recent versions of Android provide raw GPS navigation bit-streams along with GNSS measurement results. In other use scenarios, a PNT-capable or noncapable platform may possess communication links to other PNT-capable platforms or network infrastructure capable of receiving, despreading, and demodulating navigation signals. For example CORS (Continuously-Operating Reference Stations) decode navigation data and make it available in a decoded format that can be obtained over the Internet.

This third-party data can be used to implement "partially-blind" methods that can achieve the blind signal separation, jammer/spoofer resilience, near-far interference resilience, and multipath robustness without the need for, or sensitivity to, demodulating the received navigation data. Among other advantages, these approaches can develop resilient PNT (RPNT) analytics over integration times that are substantively (in theory, arbitrarily) longer than a single baseband or navigation symbol, allowing accurate signal geo-observable estimation well below the acquisition threshold required for both any fully-blind despreading method. In many use scenarios, this performance can furthermore be provided at substantively lower complexity than fully-blind methods that require demodulation of the navigation sequence.

Aspects disclosed herein also allow the use of multi-subband architectures in which symbol-rate synchronous channelizers are employed over multiple subbands within the GNSS signal band, or symbol-rate synchronous channelizer bins covering the GNSS signal bandwidth are organized into subbands within the GNSS signal band. In these aspects, linear combiners, and interference-excising linear-algebraic combiner adaptation algorithms, are employed to develop detection features and signal estimates within each subband metrics, which are then combined across subbands. The resultant method can exploit the full bandwidth of the GNSS signal, with a system complexity that scales linearly with the bandwidth exploited (number of subbands), and can constrain the dimensionality (and therefore complexity) of linear combiner adaptation operations employed in each subband to just that needed to effectively excise interference encountered within that subband. The multi-subband approach also provides a means for naturally excising non-tonal narrowband jamming signals, by selectively and adaptively suppressing subbands containing strong non-GNSS interference.

In one aspect, a low-cost single-feed reception system and multi-subband symbol-rate synchronous channelizer is presented that can develop resilient positioning, navigation, and timing (RPNT) analytics for civil modes of Global Navigation Satellite System (GNSS) signals generated by satellite vehicles (SV's), civil modes of navigation signals generated by ground and air beacons generated by pseudolites, in the presence of large numbers of malicious tonal and narrowband jammers; malicious signals attempting to spoof those signals; and time and frequency selective multipath induced by natural reflections or malicious repeaters. The system can operate without prior knowledge of, or a search over, the ranging codes for those signals, and even if those signals are received at widely separated power levels; and perform this differentiation based only on the time, frequency, and code diversity between those signals.

In one aspect, the multi-subband channelization architecture is extended to spatial and/or polarization diverse multi-feed reception systems, in which each subband employs linear combiners, and linear-algebraic combiner adaptation algorithms, which combine data over spectral and spatial/polarization diversity dimensions to separate GNSS signals and excise jamming interference, and then combine detection features from each subband over the full bandwidth of the GNSS signal. Such systems can exploit spatial and/or polarization diversity between the true navigation signals and the malicious spoofers and repeaters to further blindly detect and differentiate the navigation signals from wideband jammers, and from signals generated by closely aligned repeaters and targeted spoofers that are attempting to match the time, frequency, and code diversity of the navigation signals. As an added advantage, the dimension of each subband combiner can be held constant as the number of spatial/polarization diversity dimensions grows, resulting in a linear growth in complexity as spatial/polarization diversity is increased.

Aspects of the disclosure described herein include a system having identifying means comprising at least one antenna, coupled to at least one receiver receptive to energy in a band containing at least one navigation signal with an MOS-DSSS modulation format. The identifying means can include a receiver, for example, dedicated or software-defined radio resources, and a digital signal processor (DSP) (e.g., DSP FPGA, GPU, or the like, with associated storage capability), or combinations of DSP hardware configured for implementing software or firmware installed on that DSP hardware. In these aspects, reception operations can comprise:

receiving and amplifying at least one signal-in-space (SiS) containing at least a subband of the at least one navigation signal, comprising at least one signal with a MOS-DSSS modulation format comprising a baseband signal with symbol rate $f_{sym}$, spread by a ranging code that repeats every baseband symbol;

frequency-shifting the at least one SiS to an intermediate or complex baseband frequency, e.g., using a direct-conversion mixer with LO frequency $f_R$ and appropriate filtering operations; and sampling the frequency-shifted SiS using an analog-to-digital convertor (ADC) with a sampling rate $f_{ADC}$ that is equal to an integer multiple of the baseband symbol rate $f_{sym}$, i.e., $f_{ADC} = M_{ADC} f_{sym}$, where $M_{ADC}$ is a (typically large) integer.

In these aspects, the DSP can perform the following operations:

capturing at least one sampled and frequency-shifted SiS over a block of received data samples, and recording the approximate reception time and reception frequency of that data block, referred to herein as a "time/frequency stamp";

channelizing the sampled received data block using at least one symbol-rate synchronous channelizer to provide at least $K_{chn}$ frequency channels with output rate $f_{sym}$, each with frequency extent lying within the active bandwidth of the MOS-DSSS navigation signal;

organizing the at least $K_{chn}$ frequency channels into $K_{sub}$ subsets of frequency channels, referred to herein as subbands, each comprising $M_{sub}$ frequency channels;

in multifeed receivers, wherein multiple spatial and/or polarization diverse antennas are coupled to $M_{feed}$ receivers receptive to energy in a band containing at least one navigation signal with an MOS-DSSS modulation format, channelizing each feed into $K_{chn}$ frequency channels with output rate $f_{sym}$, organizing those frequency channels into $K_{sub}$ subbands each comprising $M_{sub}$ frequency channels, and combining those subbands across receiver feeds to form a $M_{DoF} \times 1$ vector signal with symbol rate $f_{sym}$ for each subband, where $M_{DoF} = M_{sub} M_{feed}$ is referred to herein as the degrees of freedom (DoF's) of the subband, and where $M_{DoF} = M_{sub}$ for the single-feed receiver ($M_{feed} = 1$);

collecting the $K_{sub}$ subbands of $M_{DoF} \times 1$ data vectors over $N_{sym}$ symbols, and adding a time and frequency stamp those collections of symbols, to form a time/frequency stamped multi-subband output data block;

obtaining third-party baseband symbol data or navigation data from time channels and frequency bands covering the time/frequency stamp, including uncertainty between the receiver LO, clock rate, and/or clock timing phase and universal time coordinates (UTC), using external resources also available to the system; and processing the time/frequency stamped multi-subband output data block to obtain RPNT analytics, using blind adaptive processing operations responsive to at least one navigation signal received by the system, and using the third-party baseband symbol data or navigation data.

In some aspects of the disclosure, the sampled receive data block, or the channelized received data block, along with its time/frequency stamp, might be transported to additional DSPs for processing to obtain the RPNT analytics. These additional DSPs may be onboard the platform containing the reception means, or in a different location entirely, including infrastructure equipment, i.e., "in the Cloud," if the platform possesses communications means allowing those data blocks to be transported from the platform.

In some aspects, the reception operations are instantiated using purpose-built hardware and DSP hardware. In other aspects, the reception operations are instantiated using general-purpose software-defined radio (GPSDR) and DSP hardware. In either aspect, the receiver clock may be adjusted to remove error from UTC, once a PNT solution is obtained for the receiver. Alternately, the ADC output data may be frequency-sampled and resampled to conform to UTC using algorithms implemented in DSP hardware, once that solution is obtained.

In the various aspects, the ADC sampling rate need not have any relation to the chip-rate of the navigation signal; nor need it have any relation to the bandwidth of the navigation signal. In particular, it can have a value that is easily instantiated in low-cost, general-purpose, receiver hardware; and it can have a value that is substantively less than the bandwidth of the navigation signal.

In one aspect of the disclosure, the symbol-rate synchronous subband generation is performed by first applying an $M_{ADC}$-sample fast Fourier transform (FT) to each S/P output data vector on each of $M_{feed}$ receiver feeds, and then selecting $K_{FFT}$ output bins lying within the active bandwidth of the MOS-DSSS navigation signal, to create $K_{chn}$ frequency channels each with output rate $f_{sym}$ and dimensionality $M_{feed} \times 1$. These $M_{feed} \times 1$ dimensional frequency channels are then organized into $K_{sub}$ subbands with $M_{sub}$ channels per subband, creating $K_{sub}$ subband signals with output sampling rate $f_{sym}$ and dimension $M_{DoF} \times 1$, where $M_{DoF} = M_{sub} M_{feed}$. In another aspect of the disclosure, the subband generation is performed by passing the ADC output signals provided by each of $M_{feed}$ receiver feeds through a bank of $K_{sub}$ frequency converters and decimators, each with decimated output sampling rate $f_{dec} = M_{dec} f_{sym}$, and then passing each decimated signal through a symbol-rate synchronous channelizer to produce a separate $M_{sub} \times 1$ subband signal with sampling rate $f_{sym}$, on each feed, and then "stacking" those signals to generate a $M_{DoF} \times 1$ vector signal with sampling rate $f_{sym}$, where $M_{DoF} = M_{sub} M_{feed}$. However, the channelizer output data may be generated using many different channelizer structures.

The DSP software can implement algorithms that exploit baseband symbol sequences or navigation data provided by external or "third-party" resources, for each navigation signal of interest to the system, to efficiently obtain RPNT analytics without the need to demodulate the navigation data. Exemplary RPNT analytics can include:

estimates of observed received parameters of navigation signals, including signal geo-observables usable to obtain PNT solutions for the reception platform, e.g., observed signal frequency-of-arrival (FOA), time-of-arrival (TOA), and observed local direction-of-arrival (DOA) or global line-of-bearing (LOB) in systems employing multi-feed receivers;

estimates of received signal quality, e.g., received incident power, and of despread/demodulated navigation sequence quality, e.g., despreader output signal-to-interference-and-noise ratio (SINR); and measures of accuracy of parameter and signal quality estimates.

RPNT analytic measurement methods include "partially-blind" methods that do not require knowledge of the ranging code for the navigation signals or spatial/polarization array-manifold data (measurement of cross-feed spatial/polarization signatures as a function of DOA) for the receiver, and "copy-aided" methods that may require one or both of the ranging codes or the array manifold to provide more complete RPNT analytics.

In some aspects, referred to herein as "multi-subband" systems, the blind pilot-exploiting adaptive detection and geo-observable estimation DSP algorithm can be implemented over multiple contiguous or non-contiguous channelizer subbands. Within each subband, the method can detect and separate signals without knowledge of the spreading code; in the presence of arbitrary channel multipath, tonal and narrower-band jammers; and in the presence of near-far interference that is much higher than the spreading gain of conventional PNT systems. The method then combines the subbands to provide a detection statistic and geo-observable estimate that exploits the full bandwidth of the system. The method can also provide a natural means for rejecting narrowband jamming, such as by simply "de-emphasizing" subbands containing excessive interference energy. As part of the FOA estimation step, the method may also compute the differential FOA between subbands, thereby allowing direct estimation of the observed transmitter speed. In aspects where multiple navigation signal transmitter ephemeres are available, the method can provide a full PNT solution based on this information alone.

In one aspect, the DSP algorithms can be implemented over multiple portions of the navigation signal band, referred to herein as "navigation signal subbands." The navigation signal subbands can be obtained using combinations of analog and digital processing. For example, off-center subbands can be obtained by frequency-shifting the SiS with frequency shift $f_R$ that differs substantively from the navigation signal transmit frequency, and sampling the frequency-shifted SiS using an ADC with a sampling rate that is much lower than the bandwidth of the navigation signal. Alternately, off-center subbands can be obtained by down-converting, sampling, and frequency-channelizing the navigation signal over its full bandwidth, and then selecting subsets of frequency channels to for each subband. In both cases, the subbands are processed using the adaptive detection, geo-observable estimation, and (for blind methods) symbol stream estimation DSP algorithms described herein. Any combination of methods spanning this range of methods can be similarly employed.

If the number of channelizer DoF's in each subband is greater than the total number of MOS-DSSS signals (e.g., legitimate navigation signals, spoofers, and substantively time and/or frequency offset multipath images), and tonal interferers in the subband, plus additional processing gain needed to integrate the pilot signal above the non-MOS-DSSS noise-and-interference power level (not limited by the jamming margin of the ranging code), then some aspects of the disclosure can be used to detect and determine geo-observables of all of the MOS-DSSS navigation signals covering that subband without knowledge of the spreading code. Moreover, aspects of the disclosure can be used to perform this detection and geo-observables estimation in the presence of near-far interference that is much higher than the spreading gain of conventional PNT systems, even given the much narrower bandwidth of the single-subband system. In some use scenarios, e.g., reception of navigation signals transmitted from ground or air beacons, where the signal RIP's are at or near the noise level, little or no additional processing gain is needed to detect the navigation signals, and $M_{DoF}$ can be much less than the spreading gain of the navigation signals. At the same time, the number of baseband symbols needed to obtain a useful detection solution can be greatly reduced by minimizing $M_{DoF}$. Consequently, this aspect can sharply reduce the complexity of the DSP algorithms, and the susceptibility of the method to "signature blur" induced by motion of the signal transmitters and receivers over the data collection interval.

In some aspects, the navigation signal subbands covered by the channelizer is also dynamically adjusted between collection intervals, e.g., by "stepping" the channelizer through multiple navigation signal subbands, randomly moving the channelizer to different subbands during different collection intervals, or re-tasking the channelizer based on metrics computed during prior collections. This can further reduce susceptibility of the system to narrowband or partial-band jammers attempting to block a portion of the navigation signal band, perhaps a large portion of the band.

In one aspect, dynamic adjustment of the channelizer band is used to identify and remove ambiguities in the FOA estimates provided by the system, based on differential Doppler shift between widely-spaced navigation signal subbands. For example, assuming a 1.2 kilometer/second observed SV speed, the GPS L5 short civil signal can experience a 40 Hz difference in Doppler shift over its ~10 MHz bandwidth (80 Hz if the 20 MHz null-to-null bandwidth is assumed), which is well within the resolution capabilities of the method over 1-to-4 second collect intervals, and is sufficient to estimate the observed SV speed, and thereby resolve the 1 KHz FOA ambiguity induced by the 1 ksps baseband symbol rate of this signal. In aspects where multiple navigation signal transmitter ephemeres (time varying position, velocity, acceleration, and transmission time in universal time coordinates) are available, e.g., determined from demodulated navigation data or external resources, methods can provide a full PNT solution based on this information alone.

The DSP detection and geo-observable estimation algorithm can extend without qualitative change to scenarios in which the receiver possesses $M_{feed} > 1$ spatial/polarization diverse receive feeds, except that the channelizer DoF's are multiplied by the number of receive feeds, such that $M_{DoF} = M_{chn} \odot M_{feed}$, where $M_{chn}$ is the number of channels per feed. However, the resultant system can additionally exploit spatial/polarization diversity of MOS-DSSS signals, including target spoofers that closely emulate the time, frequency, and code diversity of the legitimate navigation signals, and can further excise up to $M_{feed} - 1$ wideband jammers, on the basis of said spatial/polarization diversity, even if those jammers are much stronger than the legitimate navigation signals. As in single-feed aspects, the total DoF's must additionally be greater than at least the number of MOS-DSSS signals (e.g., legitimate navigation signals and spoofers) and tonal signals impinging on the receiver, over the bandwidth used by the system.

In one aspect of the disclosure, $M_{chn} \approx M_{DoF}/M_{feed}$, such that $M_{DoF}$ is held constant as the number of feeds is increased. This can further reduce susceptibility of the system to signature blur and provide enhanced rejection of jammers and targeted spoofers attempting to match the time, frequency, and code diversity of legitimate navigation signals, even if those jammers or spoofers are much stronger than the legitimate navigation signals.

In another aspect of the disclosure, a multi-subband channelizer with $K_{sub}$ subbands is implemented on each receiver feed, and $M_{chn}$ and $K_{sub}$ are simultaneously set to $M_{chn} \approx M_{DoF}/M_{feed}$ and $K_{sub} \approx M_{DoF} \odot M_{feed}$, such that both $M_{DoF}$ and the total bandwidth used by the system are held constant as the number of feeds is grown. Assuming the constraints on $M_{DoF}$ and $M_{feed}$ given above, the resultant system can achieve the full processing gain of the navigation signal modulation format, and the robustness to near-far interference exhibited by the method in any reception scenario, without unduly affecting complexity or convergence time of the system.

In some aspects of the disclosure, copy-aided post-processing geo-observable estimation methods, along with ranging code information determined from demodulated navigation data or through external resources, are used to resolve the FOA and TOA ambiguities. In systems employing multi-feed receivers, further aspects can use the directional array manifold of the receiver to determine the direction of arrival (DOA) of the received signals; the receiver orientation; and true lines-of-bearing (LOB's) from the receiver to the signal emitters. In both aspects, the fine geo-observables can be used to geolocate spoofers identified by the system, using known location of the receiver and geo-observables of those spoofers.

In another aspect of the disclosure, the system employs additional network communication methods to allow intercommunication of parameters between multiple receivers.

These receivers can employ combinations of single-feed or multi-feed receivers, and can have different ADC rates and channelization methods, as long as each channelizer provides a vector sequence at a 1 ksps output data rate. Among other advantages, this aspect provides additional means for detecting and defeating target spoofers, by using additional network diversity to prevent targeted spoofers from overwhelming any single receiver in the environment.

Any of these aspects can demodulate civil navigation signals in the presence of arbitrary multipath because they do not explicitly exploit the PRN code in the demodulation process. Any of these aspects can provide for determining the yaw-pitch-roll orientation of the receive platform, such as due to relationship between Doppler shift and direction vectors to the GNSS emitters, once the GNSS emitter and receiver positions are determined.

In networked receiver configurations, intercommunication can allow each receiver to continuously draw from and update a "network database" containing estimated TOA's, FOA's, and (for multi-feed receivers) DOA's for navigation signals detected by any receiver in the network, and containing ephemeris information for those receivers. This database can be used to further identify spoofers, including targeted spoofers, based on differential FOA (DFOA) and TOA (DTOA) measured at those receivers, which removes any deliberate timing or frequency shift used by the spoofer to emulate a true navigation signal at a specific victim receiver. If the victim receiver does not employ a multi-feed receiver, and may therefore find itself being successfully spoofed by a targeted attack, this network will provide an unambiguous alert to such an attack, as the spoofed signals will not possess the true GNSS FOA or TOA at the other receivers in the network, and will therefore be removed using the blind adaptive despreading methods employed in aspects of the disclosure.

BRIEF DESCRIPTION OF THE DRAWINGS

Block diagrams and flow diagrams depicted herein can represent computer software instructions or groups of instructions. One or more of the processing blocks or steps may be implemented with modules (e.g., procedures, functions, and so on) that perform the functions described herein. The software codes may be stored in non-transitory computer-readable memory. Alternatively, processing blocks or steps described herein may represent steps performed by hardware, including one or more functionally equivalent circuits, such as a digital signal processor, an application specific integrated circuit, a programmable logic device, a field programmable gate array, a general-purpose processor programmed to perform one or more of the disclosed steps, or other electronic units designed to perform the functions disclosed herein. Disclosed aspects can employ multiple processors communicatively coupled together, and can employ distributed computing, such as Cloud computing, cluster computing, distributed computing, etc.

FIG. 4 is a Table of civil GNSS modulation formats that aspects of the disclosure can be configured to exploit.

FIG. 5A, FIG. 5B, FIG. 6A, and FIG. 6B are block diagrams of receiver front-ends that can be configured according to aspects of the disclosure.

FIG. 12A and FIG. 12B depict exemplary channelizer metrics for a rectangularly windowed polyphase filter based symbol-rate synchronous channelizer.

FIG. 16 and FIG. 17 illustrate despreader parameters that can be employed in aspects disclosed herein.

DETAILED DESCRIPTION

Various aspects of the disclosure are described below. It should be apparent that the teachings herein may be instantiated in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

In the following description, for the purposes of explanation, numerous specific details are set forth in order to provide a thorough understanding of the invention. It should be understood, however, that the particular aspects shown and described herein are not intended to limit the invention to any particular form, but rather, the invention is to cover all modifications, equivalents, and alternatives falling within the scope of the invention as defined by the claims.

Figure 1:
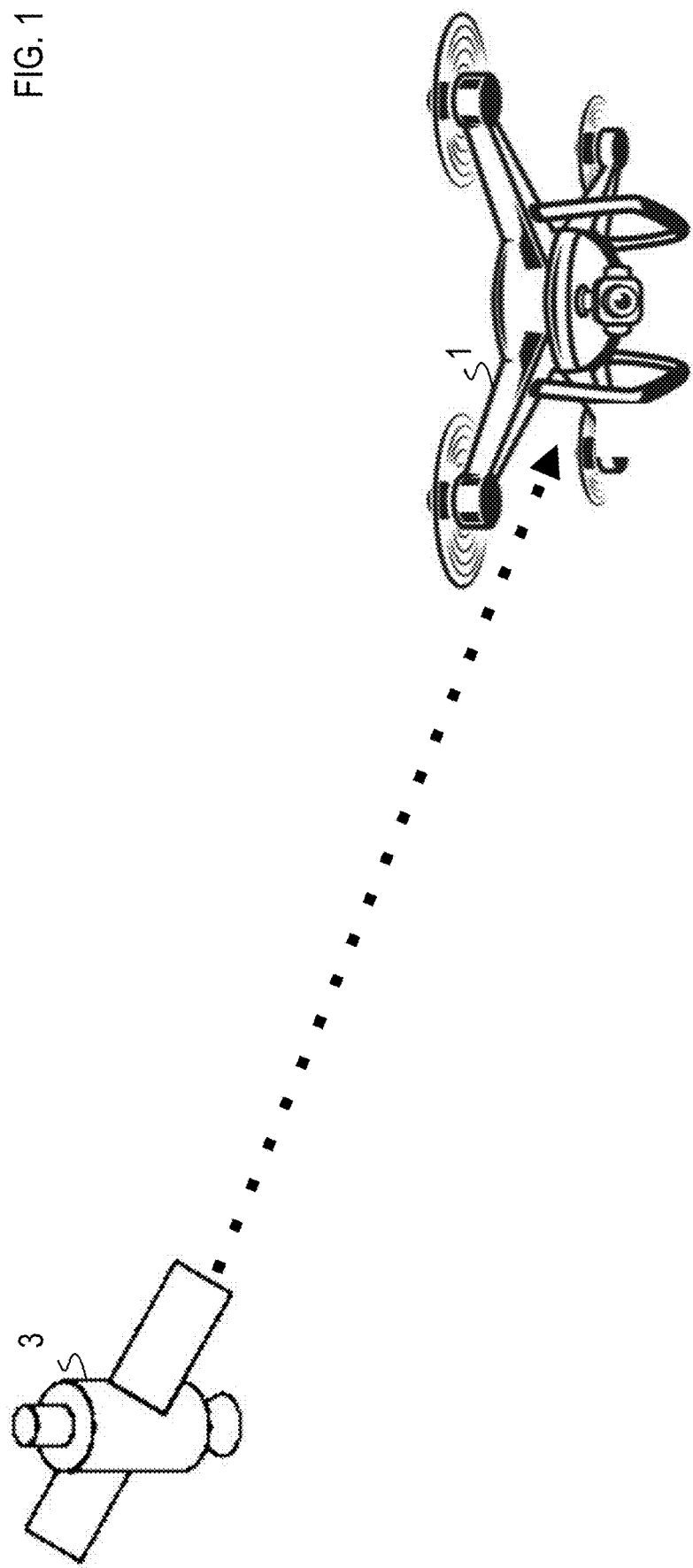
FIG. 1 depicts a system in which aspects of the disclosure can be implemented.

FIG. 1 depicts a model of the presumed normal condition wherein a receiver (1) is receiving GPS signals from an SV (3).

Figure 2:
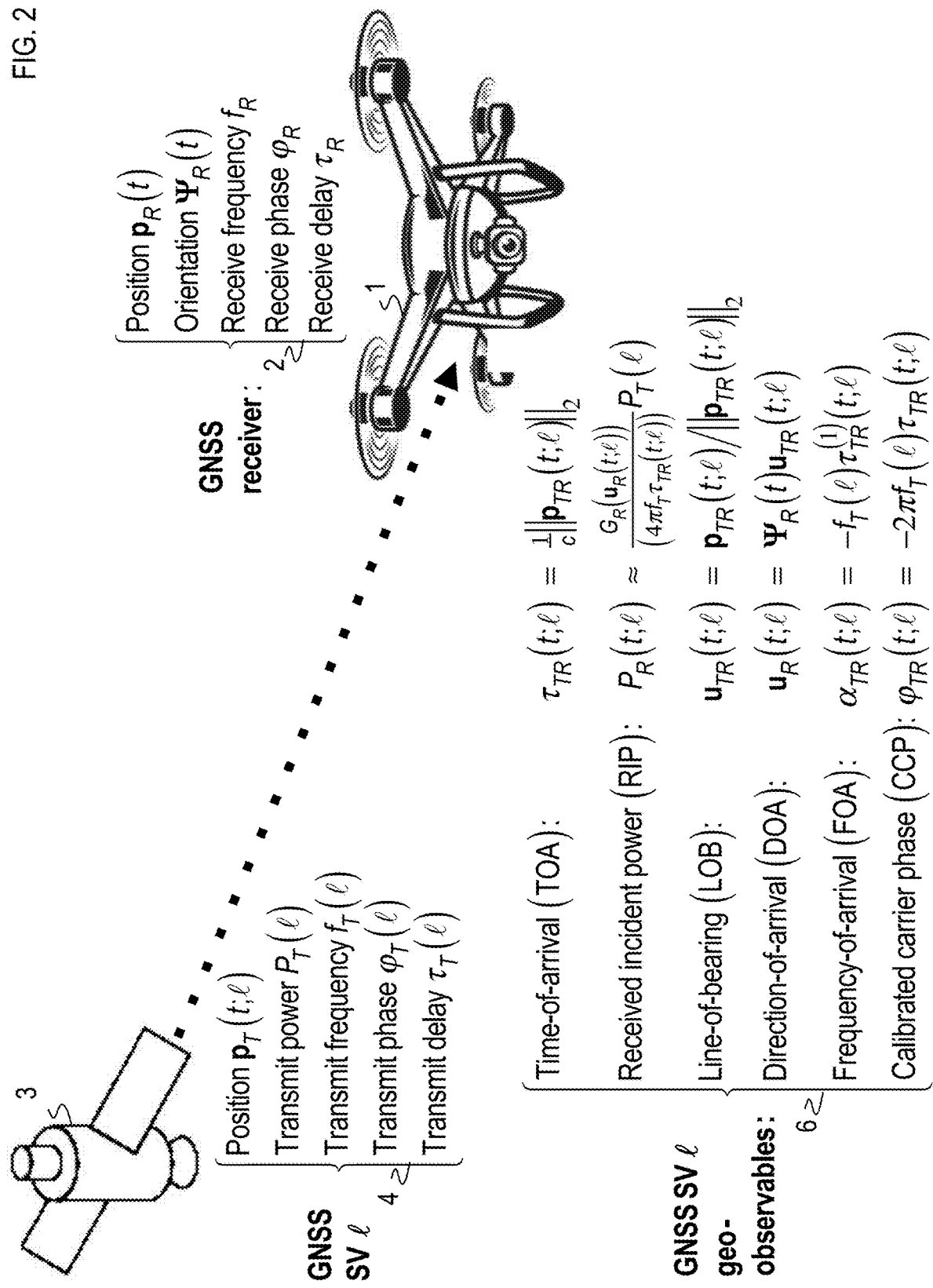
FIG. 2 illustrates operating parameters and geo-observables that can be employed in aspects disclosed herein.

FIG. 2 Illustrates exemplary observable parameters of signals transmitted from a GNSS SV (3) to a GNSS receiver (1) that can be used to geo-locate those signals ("geo-observables") (6), as a function of parameters local to the GNSS SV (4) and the GNSS receiver (2). These geo-observables (6) include the time-of-arrival (TOA) (after removal of delays induced in transmitter and receiver electronics), received incident power (RIP), line-of-bearing (LOB), direction-of-arrival (DOA) relative to the platform orientation, frequency-of-arrival (FOA) (after removal of known frequency offset between the transmitter and receiver center frequencies), and carrier phase (CCP) (e.g., after calibration and removal of transmitter and receiver phase offsets), which are measurable and differentiable at the receiver (1).

The TOA, RIP, FOA, LOB, DOA, and CCP are referred to as geo-observable, as they are observable parameters of the GNSS received signals that can be used to geo-locate the GNSS receiver, given knowledge of the GNSS transmitter locations over time, which are transmitted within the navigation stream of those signals. They are also referred to here as positioning, navigation, and timing (PNT) analytics, as they provide metadata of the transmitted signals that can be used for purposes beyond geo-location of the receiver, e.g., to assess quality and reliability of the received GNSS signals, in order to aid other PNT systems on board the receiver platform.

Figure 3:
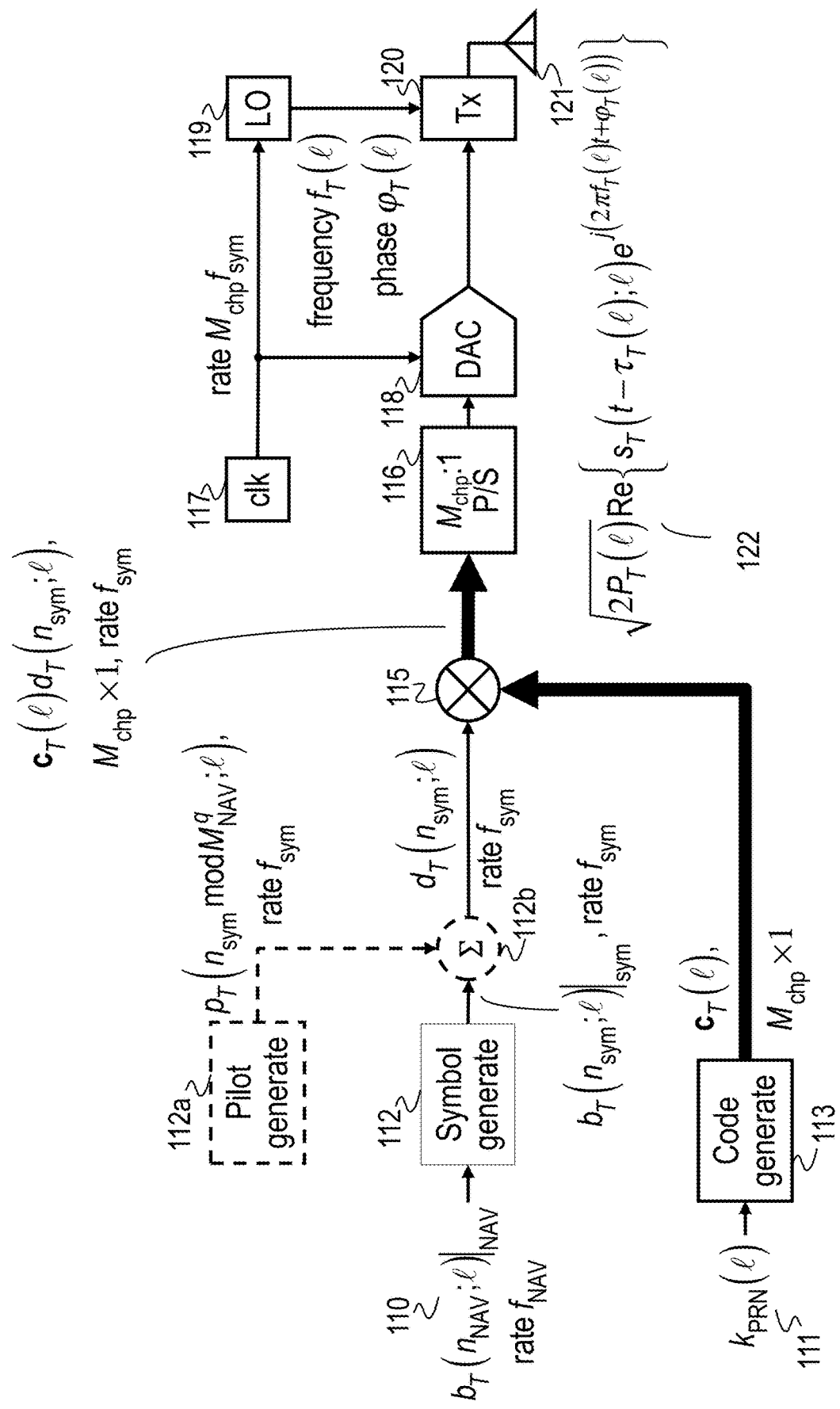
FIG. 3 is a block diagram that depicts generation of civil navigation signals that aspects of the disclosure can be configured to exploit.

FIG. 3 depicts operations used to generate the civil navigation signals that are the focus of the invention. It should be noted that the processing steps shown in FIG. 3 is one conceptual means for generating civil GNSS signals, and ignore other SiS's that may be transmitted simultaneously with civil GNSS signals, for example, the GPS P, P(Y), M, and L1C SiS's. In practice, these other SiS's are largely outside the band occupied by the civil GNSS signals, and moreover are received well below the noise floor. Therefore, their effect on aspects described herein is small. An important exception is military GNSS signals that may be generated by terrestrial pseudolites, as the non-civil components of those signals may be above the noise floor within the civil GNSS passband in some use scenarios.

The processing steps shown in FIG. 3 generate a particular class of spread spectrum signal, referred to herein as a modulation-on-symbol direct-sequence spread spectrum (MOS-DSSS) signal, in which a data symbol sequence $d_T(n_{sym};\ell)$ with symbol rate $f_{sym}$ is spread by a $M_{chp} \times 1$ dimensioned ranging code $c_T(\ell)=[c_T(m_{chp};\ell)]_{m_{chp}=0}^{M_{chp}-1}$ that is repeated over every data symbol. The spread signal can be represented as the multiplication of data symbol sequence $d_T(n_{sym};\ell)$ and code vector $c_T(\ell)$ (115), resulting in $M_{chp} \times 1$ $c_T(\ell)d_T(n_{sym};\ell)$. The vector signal is then passed through a $M_{chp}$:1 parallel-to-serial (P/S) converter (116), resulting in a scalar spread signal with rate $M_{chp}f_{sym}$, which can be expressed as $c_T(n_{chp} \mod M_{chp};\ell)d_T(\lfloor n_{chp}/M_{chp} \rfloor;\ell)$, where ($\circ$)mod M and $\lfloor \circ \rfloor$ denote the modulo-M operation and integer truncation or "floor" operations, respectively. As shall be described below, this property induces inherent massive spectral redundancy to the civil GNSS format that is exploited by disclosed aspects.

The chip-rate spread signal is then passed through digital-to-analog conversion (DAC) (118), and transmission/upconversion stages (120), controlled by an internal clock (clk) (117) and local-oscillator (LO) (119) stages, and transmitted from an antenna (121) to generate a signal-in-space (SiS) given by $\sqrt{2P_T(\ell)}\text{Re}\{s_T(t-\tau_T(\ell);\ell)e^{j(2\pi f_T t+\varphi_T(\ell))}\}$ for transmitter $\ell$ (122), where $f_T(\ell)$ is the transmit frequency, typically common to all SV's ($f_T(\ell)\equiv f_T$), $P_T(\ell)$, $\varphi_T(\ell)$ and $\tau_T(\ell)$ are the transmit power, phase, and electronics delay for SiS $\ell$, respectively, and where $s_T(t;\ell)$ is the complex baseband representation of the transmitted signal.

Based on these operations, the complex-baseband signal can be modeled by $$s_T(t;\ell) = \sum_{n_{sym}} d_T(n_{sym};\ell)h_T(t - T_{sym}n_{sym};\ell), \quad \text{Eqn (1)}$$

where $d_T(n_{sym};\ell)$ is the encoded symbol stream, $T_{sym}=1/f_{sym}$ is the symbol period, and $h_T(t;\ell)$ is a spread symbol given by $$h_T(t;\ell) = \sum_{m_{chp}=0}^{M_{chp}-1} c_T(m_{chp};\ell)g_T(t - T_{chp}m_{chp};\ell), \quad \text{Eqn (2)}$$

$$T_{chp} = \frac{T_{sym}}{M_{chp}},$$

and where $g_T(t;\ell)$ is the chip symbol modulated by each chip, referred to here as the chip shaping. The spread symbol can also be expressed by it's continuous Fourier transform $H_T(f;\ell)=\int h_T(f;\ell)e^{-j2\pi ft}df$, $$H_T(f;\ell)=C_T(e^{j2\pi fT_{chp}};\ell)G_T(f;\ell), \quad \text{Eqn (3)}$$

where $$C_T(e^{j2\pi f};\ell) = \sum_{m_{chp}} c_T(m_{chp})e^{-j2\pi fm_{chp}}$$

is the discrete Fourier transform of $c_T(m_{chp};\ell)$, and where $G_T(f;\ell)$ is the continuous Fourier transform of $g_T(t;\ell)$. The spread signal can therefore be modeled as a pulse-amplitude modulated (PAM) waveform in which baseband symbol sequence modulates a symbol waveform that is itself direct-sequence spread by the ranging code, leading to the MOS-DSSS nomenclature employed here.

In typical navigation systems, the chip shaping is identical for each transmitted signal ($g_T(t;\ell)\equiv g_T(t)$); however, in practice, the shaping can also vary between transmitters. For typical navigation systems, the chip shaping is also nominally rectangular, such that $G_T(f;\ell)\equiv T_{chp}\text{Sa}(\pi fT_{chp})$, where $\text{Sa}(x)=\sin(x)/x$; however, different chip shapings can be employed without changing the basic structure of the MOS-DSSS modulation format.

In typical navigation systems, the spreading code $c_T(\ell)$ employed at transmitter $\ell$ is unique to that transmitter, and is in fact provisioned by the navigation system. In contrast, the transmit power and center frequency are typically (but not necessarily) identical for each transmitter, while the transmitter carrier phase, delay, and other impairments will vary between the transmitters. However, any of these typical assumptions can be varied in practice, or in different instantiations of a navigation system.

As shown in FIG. 3, the full symbol sequence $d_T(n_{sym};\ell)$ is generated from an underlying navigation sequence $b_T(n_{NAV};\ell)|_{NAV}$ with navigation rate $f_{NAV}$, which contains information needed to generate a full positioning, navigation, and timing (PNT) solution at navigation receiver. The navigation sequence typically provides timing and ephemeris (time-stamped position, velocity, and acceleration) of the navigation transmitter and larger network, known impairments at the transmitter, and additional information needed to determine quality and timing of the transmitted signal. The navigation sequence also typically provides information about the specific spreading code(s) employed at the transmitter. This navigation sequence is then passed through processing operations to generate an encoded signal sequence $b_T(n_{sym};\ell)|_{sym}$, with symbol rate $f_{sym}$ and for some modulation formats combined with a known pilot sequence $p_T(n_{sym};\ell)$, with symbol rate $f_{sym}$ (112b) to generate the full symbol sequence signal $d_T(n_{sym};\ell)$. All of these additional processing steps add additional known structure to the transmitted MOS-DSSS signal, which can be exploited in subsequent processing stages. Additionally, the navigation sequence, the information contained within that sequence (e.g., the transmitter ephemeres) can be obtained after transmission from third-party sources, providing additional exploitable structure in applications some aspects of the invention.

FIG. 4 is a tabular description of GNSS networks employing civil GNSS signals that can be modeled as MOS-DSSS signals. As this Figure shows, every GNSS network deployed to date possesses at least one signal type that can be modeled by FIG. 3. Moreover, all of these signals have a 1 millisecond (ms) ranging code period, and therefore a 1 ksps (kilosample per second) MOS-DSSS baseband symbol rate, albeit with widely varying chip rates and SiS bandwidths, allowing their demodulation using a common receiver structure.

As the last column of FIG. 4 shows, the symbol streams of each of these signals possess properties that can be used to detect and differentiate them from other signals in the environment, including military GNSS signals, jammers, and civil GNSS signals with the same or similar properties. For example, the GPS coarse acquisition (C/A) or "legacy" signal listed in the first row of FIG. 4 is constructed from a 50 bit/second (bps) BPSK (real) navigation sequence $b_T(n_{NAV};\ell)|_{NAV}$, repeated 20 times per MOS-DSSS symbol to generate 1 ksps symbol sequence $d_T(n_{sym};\ell) = b_T(n_{sym};\ell)|_{sym} = b_T(\lfloor n_{sym}/M_{NAV}\rfloor;\ell)|_{NAV}$ where $M_{NAV}=20$. Moreover, $b_T(n_{NAV};\ell)|_{NAV}$ possesses internal fields that can be further exploited to aid the demodulation process, e.g., the TLM Word Preamble transmitted within every 300-bit Navigation subframe.

Similarly, the GPS L5, QZSS, Galileo E5B, E6B, and Beidou 1B transmitters all add a periodic pilot to the quadrature rail of their navigation signals, and the NAVIC RS BOC transmitter adds a periodic pilot to the in-phase rail of its navigation signal. Means for exploiting periodic pilots are a focus of some aspects of this invention.

FIG. 5A and FIG. 5B each depict exemplary direct-conversion front-end reception processing for a single-feed receiver receiving GNSS signals. FIG. 5A shows a direct-conversion receiver front-end that is dedicated to a specific GNSS band, and FIG. 5B shows a direct-conversion receiver front-end that can be flexibly tasked to any GNSS band, consistent with a software defined radio (SDR) architecture. Each can be used as a part of, and in, some of the disclosed aspects.

The direct-conversion receivers shown in FIG. 5A and FIG. 5B each comprise the following:
   An antenna (128) and low-noise amplifier (LNA) (131), which receives an SiS containing GNSS emissions within the FoV of the receiver.
   A local oscillator (LO) (133), which generates a complex sinusoid with frequency $f_R$ and phase $\varphi_R$, comprising an in-phase (I) real sinusoid, and a quadrature (Q) sinusoid shifted by 90° in phase from the in-phase sinusoid;
   A complex mixer (134), which multiplies the LNA output signal by the conjugate of the complex sinusoid, thereby creating a complex signal with real and imaginary parts, referred to herein as the in-phase (I) and quadrature (Q) rails of that signal, which has been downconverted by frequency shift $f_R$
   A dual lowpass filter (LPF) (135), which filters each signal rail to remove unwanted signal energy from the complex downconverted signal, yielding analog scalar complex-baseband signal $x_R(t)$, centered at 0 MHz if $f_R=f_T$.
   A dual analog-to-digital converter (ADC) (136), which samples each rail of $x_R(t)$ at rate $f_{ADC}=M_{ADC}f_{sym}$, where $f_{sym}$ is the civil GNSS signal symbol rate shown in FIG. 3 and $M_{ADC}$ is a positive integer, thereby generating complex dual-ADC output signal $x_{ADC}(n_{ADC})$ with time index $n_{ADC}$ (137).

The receiver structure shown in FIG. 5A possesses an additional bandpass filter (BPF) (130), inserted between the antenna and LNA, and dedicated to a specific GNSS band, which removes unwanted adjacent-channel interference (ACI) from the received GNSS SiS, and depicts an LO that is locked to specific, preset value, consistent with a dedicated receiver that is optimized for a specific GNSS band. This structure is more typical of existing GNSS receivers, and provides enhanced signal quality at cost of receiver flexibility.

In contrast, the receiver structure shown in FIG. 5B is consistent with SDR receivers that can be tasked to any GNSS band under user control. This receiver structure can also be used to receive a segment of a GNSS band, e.g., a 1 MHz segment of the GPS L5 band, if $f_R$ is significantly offset from the GNSS band center $f_T$. The ability to blindly detect, demodulate, and estimate geo-observables of any portion of any GNSS band using the same reception, downconversion, and sampling hardware regardless of the actual bandwidth of the GNSS signals present in that band can be an advantageous feature of at least some of the disclosed aspects.

FIG. 6A and FIG. 6B each depict exemplary front-end reception processing for a single-feed superheterodyne receiver receiving GNSS signals; with FIG. 6A showing a superheterodyne receiver front-end that is dedicated to a specific GNSS band, and FIG. 6B showing a superheterodyne receiver front-end that can be flexibly tasked to multiple GNSS bands. Each can be used as a part of, and in, at least some aspects disclosed herein.

The heterodyne receivers shown in FIG. 6A and FIG. 6B shift the SiS received by an antenna (128) and amplified in an LNA (130) to IF frequency $f_{IF}$, typically using a two-stage mixer 134, 141, yielding analog scalar real-IF signal $x_R(t)$ centered on IF frequency $f_{IF}$ if $f_R=f_T$, with receive phase-shift $\varphi_R=\varphi_R^{(1)}+\varphi_R^{(2)}$. The analog signal is then passed to an ADC (143) that samples $x_R(t)$ at rate $M_{ADC}f_{sym}$, where $f_{sym}$ is the MOS-DSSS signal symbol rate shown in FIG. 6A and FIG. 6B, and $M_{ADC}$ is a positive integer, yielding real ADC output signal $x_{ADC}(n_{ADC})$ with time index $n_{ADC}$ (137). The receiver structure shown in FIG. 6A can be optimized for a specific GNSS band, while the receiver structure shown in FIG. 6B can be flexibly tasked to different navigation signal bands, or to segments of such bands, under software control.

In all four cases, the receiver can induce additional delays, frequency offsets, and sampling rate offsets due to internal electronics in the receiver systems, and due to clock rate and timing offset from universal time coordinates (UTC). These are subsumed into the overall channel response, and measured and removed as part of the geo-location solution.

As will be discussed below, the ADC output signal provided by either the direct-conversion or the superheterodyne receivers can be used in disclosed aspects without any change to the design, except control parameters used in channelization operations immediately after that ADC. The disclosed aspects can also be practiced with many other receiver front-ends known to the art. In many cases, the disclosed aspects are blind to substantive differences between those receiver front-ends.

Assuming the reception scenario shown in FIG. 2, and the direct-conversion receiver structure shown in FIG. 5, the downconverted and filtered signal shown in $x_R(t)$ is given by $$x_R(t) = i_R(t) + \sum_{\ell=1}^{L} s_R(t; \ell), \qquad \text{Eqn (4)}$$

where $i_R(t)$ is the noise and interference received in the receiver passband and $s_R(t; \ell)$ is the complex-baseband representation of the signal received from transmitter $\ell$. Over time intervals on the order of 1-10 seconds from reception time $t_0$, $s_R(t; \ell)$ can be modeled by $$s_R(t_0 + t; \ell) \approx g_{TR}(\ell) e^{j2\pi\left(\alpha_{TR}(\ell)t + \frac{1}{2}\alpha_{TR}^{(1)}(\ell)t^2\right)} s_T\left(\left(1 - \tau_{TR}^{(1)}(\ell)\right)t - \tau_{TR}(\ell); \ell\right), \qquad \text{Eqn (5)}$$

at the input to the dual-ADC's shown in FIG. 5, where $g_{TR}(\ell) \triangleq \sqrt{P_R(t_0; \ell)} \exp(j\varphi_{TR}(\ell))$, end-to-end complex channel gain  Eqn (6)

$\varphi_{TR}(\ell) \triangleq \varphi_T(\ell) - \varphi_R - 2\pi f_T(\ell)\tau_{TR}(t_0; \ell)$, end-to-end channel phase  Eqn (7)

$\tau_{TR}(\ell) \triangleq \tau_T(\ell) + \tau_R + \tau_{TR}^{(0)}(t_0; \ell)$, end-to-end observed TOA  Eqn (8)

$\alpha_{TR}(\ell) \triangleq f_T(\ell) + f_R - f_T(\ell)\tau_{TR}^{(1)}(t_0; \ell)$, end-to-end observed FOA  Eqn (9)

$\tau_{TR}^{(1)}(\ell) \triangleq \tau_{TR}^{(1)}(t_0; \ell)$, observed differential TOA (DTOA)  Eqn (10)

$\alpha_{TR}^{(1)}(\ell) \triangleq -f_T(\ell)\tau_{TR}^{(2)}(t_0; \ell)$, observed differential FOA (DFOA).  Eqn (11)

and where $\varphi_T(\ell)$, $f_T(\ell)$, and $\tau_T(\ell)$ are the carrier phase, frequency, and timing offset induced at transmitter $\ell$; $\varphi_R$, $f_R$, and $\tau_R$ are the carrier phase, frequency, and timing offset induced at the receiver; $P_R(t_0; \ell)$ is the received incident power of SiS $\ell$ at the receiver; and $\tau_{TR}^{(q)}(t_0; \ell) = d^q\tau_{TR}(t; \ell)/dt^q$ is the $q^{th}$ derivative of the observed TOA between transmitter $\ell$ and the receiver at time t. Given observed position, velocity, and acceleration $p_{TR}(t; \ell) = p_T(t; \ell) - p_R(t; \ell)$, $v_{TR}(t; \ell) = v_T(t; \ell) - v_R(t; \ell)$, and $a_{TR}(t; \ell) = a_T(t; \ell) - a_R(t; \ell)$, where $\{p_T(t; \ell), v_T(t; \ell), a_T(t; \ell)\}_{\ell=1}^{L}$ and $\{p_R(t), v_R(t), a_R(t)\}$ are the transmitter and receiver ephemeres, respectively, then $\tau_{TR}^{(q)}(t; \ell)$ is given by $$\tau_{TR}^{(0)}(t; \ell) = \frac{1}{c}\|p_{TR}(t; \ell)\|_2, \qquad \text{Eqn (12)}$$

$$\tau_{TR}^{(1)}(t; \ell) = \frac{1}{c}u_{TR}^T(t; \ell)v_{TR}(t; \ell), \qquad \text{Eqn (13)}$$

$$\tau_{TR}^{(2)}(t; \ell) = \frac{1}{c}\left(u_{TR}^T(t; \ell)a_{TR}(t; \ell) + \|P_\perp(p_{TR}(t; \ell))v_{TR}(t; \ell)\|_2\right), \qquad \text{Eqn (14)}$$

where $u_{TR}(t; \ell)$ is the line-of-bearing (LOB) direction vector from the receiver to transmitter $\ell$, $$u_{TR}(t; \ell) = \frac{p_{TR}(t; \ell)}{\|p_{TR}(t; \ell)\|_2}, \qquad \text{Eqn (15)}$$

and $P_\perp(p_{TR}(t; \ell))$ is the projection matrix orthogonal to $p_{TR}(t; \ell)$, given by $$P_\perp(p_{TR}(t; \ell)) = I_3 - \frac{p_{TR}(t; \ell)p_{TR}^T(t; \ell)}{\|p_{TR}(t; \ell)\|_2^2}, \qquad \text{Eqn (16)}$$

and where $\|\cdot\|_2$ and $I_3$ denote the L2 Euclidean vector norm and 3×3 identity matrix, respectively. As shown in the '417 NPA, incorporated herein by reference, the RIP and LOB adheres closely to a zero-order model over time intervals on the order of 1-to-10 seconds, for transmitters in medium-Earth orbits and receivers with dynamics commensurate with high-velocity airborne vehicles.

The local direction-of-arrival (DOA) of the signal received from transmitter $\ell$ can then be represented by local DOA direction vector $u_R(t; \ell) = \Psi_R(t)u_{TR}(t; \ell)$, which can be converted to azimuth relative to the local receiver heading and elevation relative to the plane of receiver motion using well-known directional transformations. As shown in the '417 NPA, incorporated herein by reference, the DOA also adheres closely to a first-order model over time intervals on the order of 1-to-10 seconds, for transmitters in medium-Earth orbits and receivers with dynamics commensurate with high-velocity airborne vehicles. Moreover, the variation in local DOA is nearly identical for all of the received navigation signals under this scenario, as it primarily due to motion/orientation of the receiver, which equally affects all of the signal LOB's.

Figure 7:
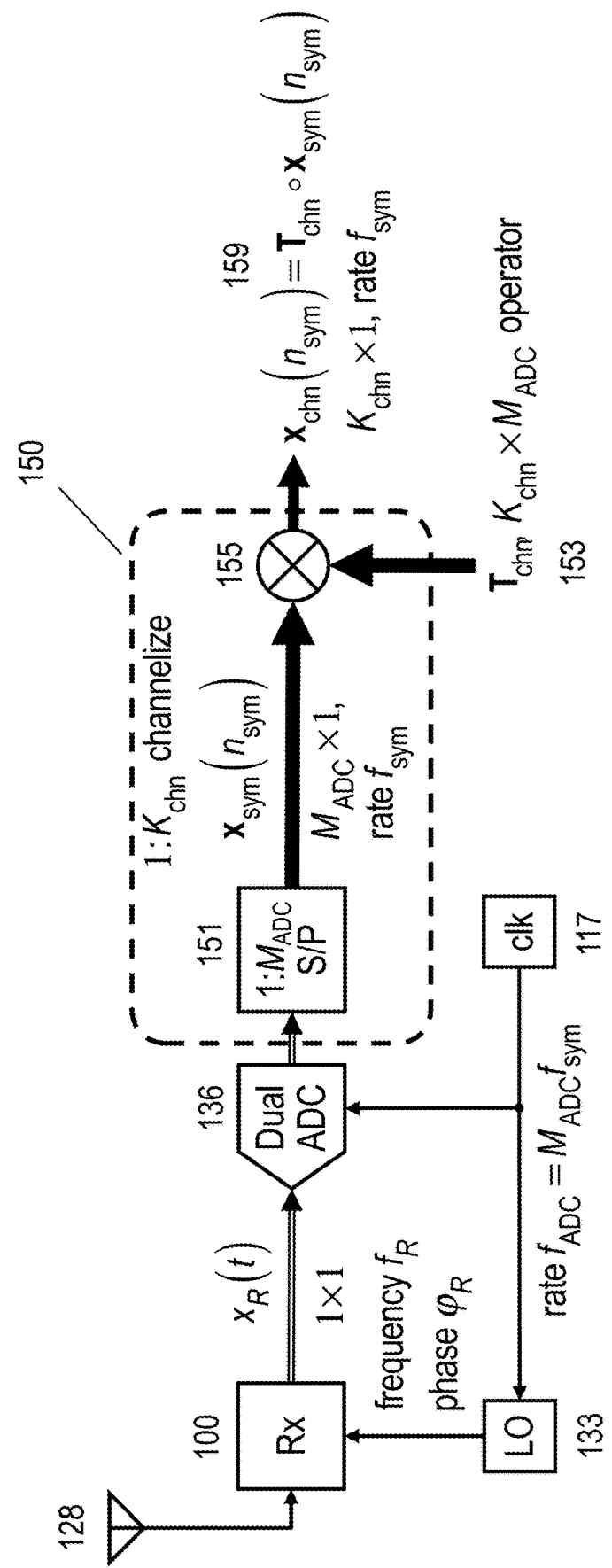
FIG. 7 is a block diagram that depicts a single-feed channelizer in accordance with an aspect of the disclosure.

FIG. 7 shows a single-feed receiver structure used in one aspect of the disclosure, describing the symbol-rate synchronous vector channelizer (150) integral to the disclosure. A SiS is received at an antenna (128), and downconverted to complex baseband using a direct-conversion receiver (100) implementing operations such as those shown in FIG. 5A and FIG. 5B, comprising reception, frequency downconversion by receive frequency $f_R$ to complex baseband representation, and sampling using a dual ADC (136) with sampling rate $M_{ADC}f_{sym}$, where $M_{ADC}$ is a positive integer. The sampled signal is then passed to a symbol-rate synchronous channelizer (150) comprising the following conceptual operations:

A $1:M_{ADC}$ serial-to-parallel conversion operation that transforms the rate $M_{ADC}f_{sym}$ ADC output signal to an $M_{ADC} \times 1$ vector signal $x_{sym}(n_{sym})$ with rate $f_{sym}$, given by $$x_{sym}(n_{sym}) = \begin{pmatrix} x_R(T_{sym}n_{sym}) \\ \vdots \\ x_R\left(T_{sym}\left(n_{sym} + \frac{m_{ADC}-1}{M_{ADC}}\right)\right) \end{pmatrix} \quad \text{Eqn (17)}$$

An $M_{ADC}$:$K_{chn}$ channelization operation (155), conceptually performed by operating on $x_{sym}(n_{sym})$ using $K_{chn} \times M_{ADC}$ channelization matrix operator $T_{chn}$ (153) to form $K_{chn} \times 1$ channelizer output signal $x_{chn}(n_{sym}) = T_{chn} \circ x_{sym}(n_{sym})$ (159), where $K_{chn}$ is the symbol-rate synchronous output channels used in subsequent DSP operations and "∘" denotes a general filtering operation. In some aspects of the invention, $T_{chn}$ (153) is a memoryless matrix and the operation is a simple matrix multiplication. In other aspect of the invention, $T_{chn}$ (153) is a more linear-time-invariant (LTI) impulse response, and the operation is a matrix convolution.

The data rate of $x_{chn}(n_{sym})$ is nominally equal to the symbol rate of the navigation signal of interest to the system (less offset due to nonideal error in the ADC clock), e.g., 1 ksps for the signals listed in FIG. 4, and the dimensionality of $x_{chn}(n_{sym})$ is $K_{chn} \times 1$, where $K_{chn}$ is the number of frequency channels used by subsequent DSP processing stages. Hence this is referred to here as a symbol-rate synchronous vector channelizer.

A variety of different channelization methods can be implemented using this general processing structure, including time and frequency domain channelization methods, or channelizations employing mixed time-frequency channelizations such as wavelet-based channelizers.

Figure 8:
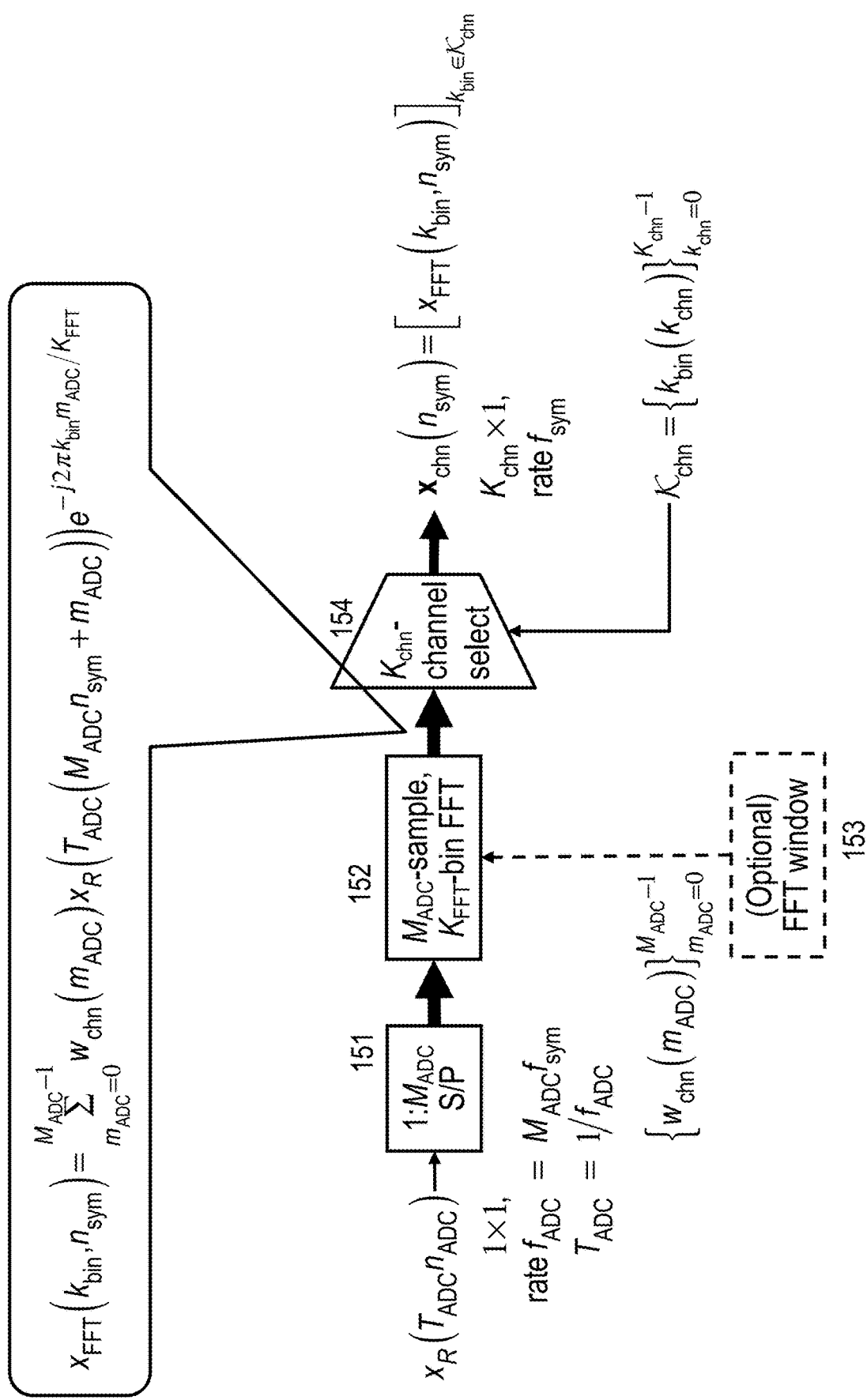
FIG. 8 is a block diagram that depicts a single-feed FFT-based channelizer in accordance with an aspect of the disclosure.

FIG. 8 depicts a specific instantiation of the symbol-rate synchronous vector channelizer (150), using Fast-Fourier Transform (FFT) operations. The channelizer first applies a (nominally zero-padded) discrete Fourier transform (DFT) with $M_{ADC}$ input samples, $K_{FFT} \geq M_{ADC}$ output bins (152), and a (nominally rectangular) window $\{w_{chn}(m_{ADC})\}_{m_{ADC}=0}^{M_{ADC}-1}$ (156) to each S/P output vector, where $K_{FFT}$ can be conveniently chosen to minimize computational complexity and/or cost of the DFT using an FFT algorithm. The channelizer then selects $K_{chn}$ output bins $\{k_{bin}(k_{chn})\}_{k_{chn}=0}^{K_{chn}-1}$ for use in subsequent adaptive processing algorithms (154). The channelization operation can be expressed as a multiplication of $x_{sym}(n_{sym})$ by $K_{chn} \times M_{ADC}$ matrix (153)

$$T_{chn} = \left[\exp\left(-j2\pi k_{bin}(k_{chn})\frac{m_{ADC}}{K_{FFT}}\right)w_{chn}(m_{ADC})\right].$$

In one aspect of the invention, the output channelizer bins are selected contiguously over the passband of the receiver, e.g., using formula $k_{bin}(k_{chn})$ 32 $(k_{init}+k_{chn})$mod $K_{FFT}$, wherein $k_{init}$ is the first FFT bin output from the channelizer (FFT bin associated with channelizer bin 0). As will be discussed herein, an advantage of this approach is minimization of channel signature blur due to movement of the transmitter and/or receiver platforms. In another aspect of the invention, the output channelizer bins are selected sparsely over the passband of the receiver, e.g., using formula $k_{bin}(k_{chn}) = (k_{init} + K_{sep}k_{chn})$mod $K_{FFT}$, where $K_{sep}$ is an integer separation factor between channelizer bins. An advantage of this approach is ability to avoid known receiver impairments such as LO leakage (e.g., by setting $k_{init}$ to a non-multiple of $K_{sep}$), or to reduce complexity of the channelization operation, e.g., using sparse FFT methods.

In some aspects of the invention, the output channelizer bins are preselected, e.g., to avoid known receiver impairments such as LO leakage, or to reduce complexity of the channelization operation. In other aspects of the invention, the output channelizer bins are adaptively selected, e.g., to avoid dynamic narrowband co-channel interferers (NBCCI).

In, the '417 NPA, which has been incorporated herein by reference, means for processing the vector channelizer output signal, in that case with $K_{chn} = M_{DoF}$. However, exploitation of channelization dimensionalities covering the full active bandwidth of the GPS L1 legacy signal, much less the much wider bandwidth GPS L5 and other civil GNSS signals, would substantively increase both the complexity of the linear-algebraic methods disclosed in the '417 NPA, and the reception time needed to implement those methods. For this reason, the '417 NPA focused on partial-band and subband methods that only exploited a part of that active bandwidth. Methods for overcoming this limitation without unduly affecting complexity or reception time is a primary focus of this invention.

Figure 9:
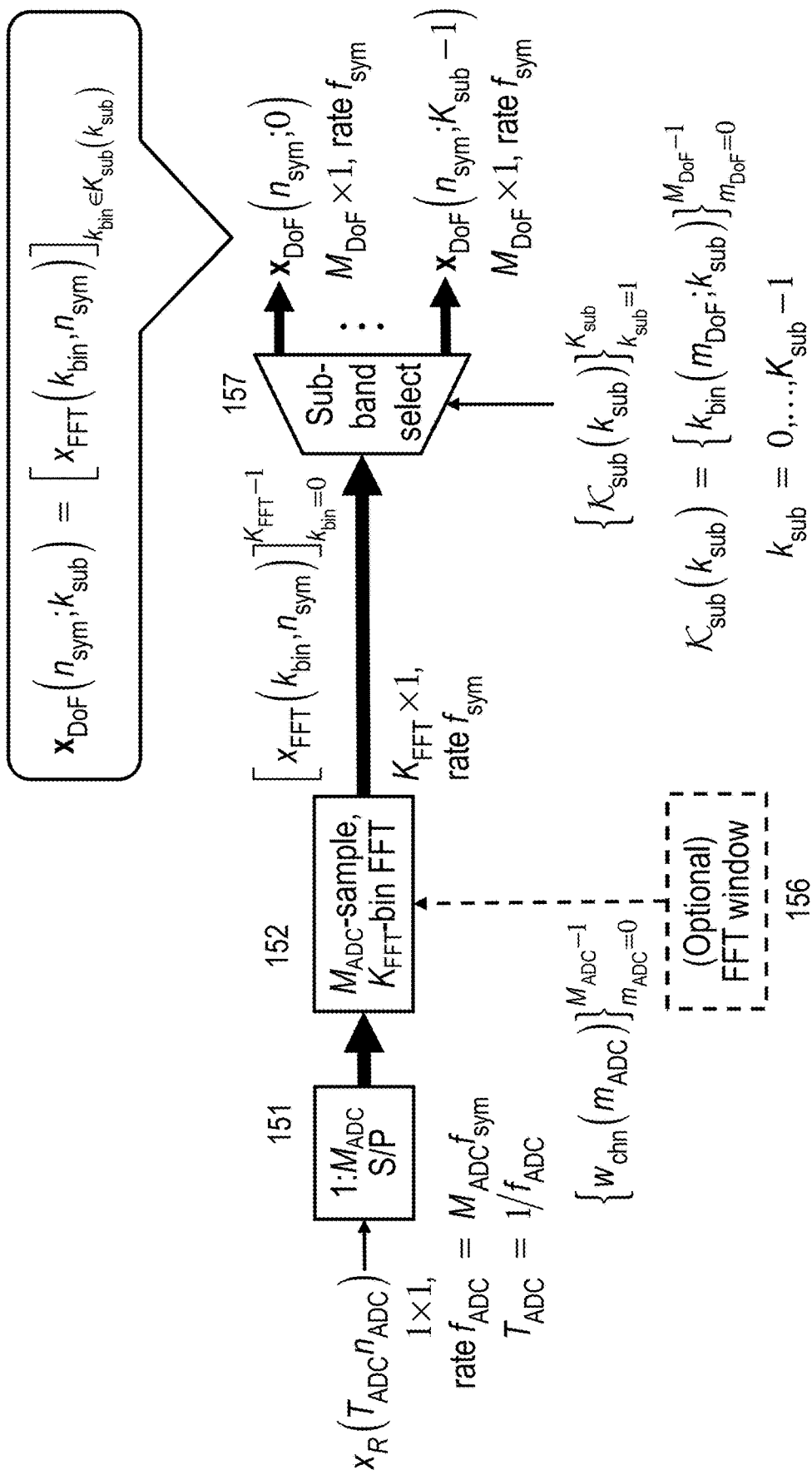
FIG. 9 is a block diagram of a single-feed FFT-based symbol-rate synchronous multi-subband channelizer according to an aspect of the disclosure.

FIG. 9 depicts an instantiation of a single-feed FFT-based symbol-rate synchronous multi-subband channelizer, intended to overcome these limitations. This instantiation is identical to the FFT-based symbol-rate synchronous channelizer shown in FIG. 8, except that the $K_{chn}$-channel selection operation (154) is replaced by a subband selection operation (157) that selects $K_{sub}$ subbands from the $K_{FFT}$ FFT output bins provided by the FFT operation (152). In the aspect of the invention shown in this Figure, the number of bins in each subband is equal to the same number, $M_{DoF}$, referred to herein as the number of degrees of freedom of the subband. This has the benefit of regularizing linear-algebraic DSP operations performed on each subband in subsequent processing steps. However, other aspects of the invention can vary the number of bins, and therefore processing degrees of freedom, e.g., based on numbers of interferers present in each subband or other factors. The FFT output bins selected for the subbands are then organized into $K_{sub}M_{DoF} \times 1$ vector signals given by $$x_{DoF}(n_{sym}; k_{sub}) = \begin{pmatrix} x_{FFT}(k_{bin}(0; k_{sub}), n_{sym}) \\ \vdots \\ x_{FFT}(k_{bin}(M_{DoF}-1; k_{sub}), n_{sym}) \end{pmatrix}, \quad \text{Eqn (18)}$$

$$k_{sub} = 0, \ldots, K_{sub} - 1,$$

each with output rate $f_{sym}$; where $\{x_{FFT}(k_{bin}, n_{sym})\}_{k_{bin}=0}^{K_{FFT}-1}$ are the bins output from the FFT (152).

In one aspect of the invention, the FFT bins selected for each subband are contiguous, e.g., set using formula $k_{bin}(m_{DoF}; k_{sub}) = (k_{init}(k_{sub}) + m_{DoF})$mod $K_{FFT}$, where $k_{init}(k_{sub})$ denotes the initial FFT bin selected for subband $k_{sub}$. As will be discussed herein, an advantage of this approach is minimization of channel signature blur due to movement of the transmitter and/or receiver platforms. In another aspect of the invention, the FFT bins selected for each subband are more sparsely distributed, e.g., using formula $k_{bin}(m_{DoF}; k_{sub}) = (k_{init}(k_{sub}) + K_{sep}m_{DoF})$mod $K_{FFT}$, where $K_{sep}$ is an integer separation between bins within the subband. An advantage of this approach is ability to avoid known receiver impairments such as LO leakage, or to reduce complexity of the channelization operation, e.g., using sparse FFT methods. The bin spacing $K_{sep}$ can be equal for each subband, or be different between subbands.

In one aspect of the invention, the subband are themselves contiguous, e.g., such that $k_{init}(k_{sub}+1)=(k_{init}(k_{sub})+M_{DoF})$ mod $K_{FFT}$ for subbands with contiguous bins within each subband, and $k_{init}(k_{sub}+1)=(k_{init}(k_{sub})+K_{sep}M_{DoF})$mod $K_{FFT}$ for subbands with sparsely separated bins within each subband. In other aspects of the invention, subbands may be widely separated. In yet other aspects of the invention, subbands may be interleaved, e.g., by setting $K_{sep}=K_{sub}$ and $k_{init}(k_{sub})=k_{init}(0)+k_{sub}$, such that $k_{bin}(m_{DoF};k_{sub})=(k_{init}(0)+(K_{sub}m_{DoF}+k_{sub}))$mod $K_{FFT}$.

In some aspects of the invention, the output subband bins are preselected, e.g., to avoid known receiver impairments such as LO leakage, or to reduce complexity of the channelization operation. In other aspects of the invention, the output subband bins are adaptively selected, e.g., to avoid dynamic narrowband co-channel interferers (NBCCI).

Figure 10:
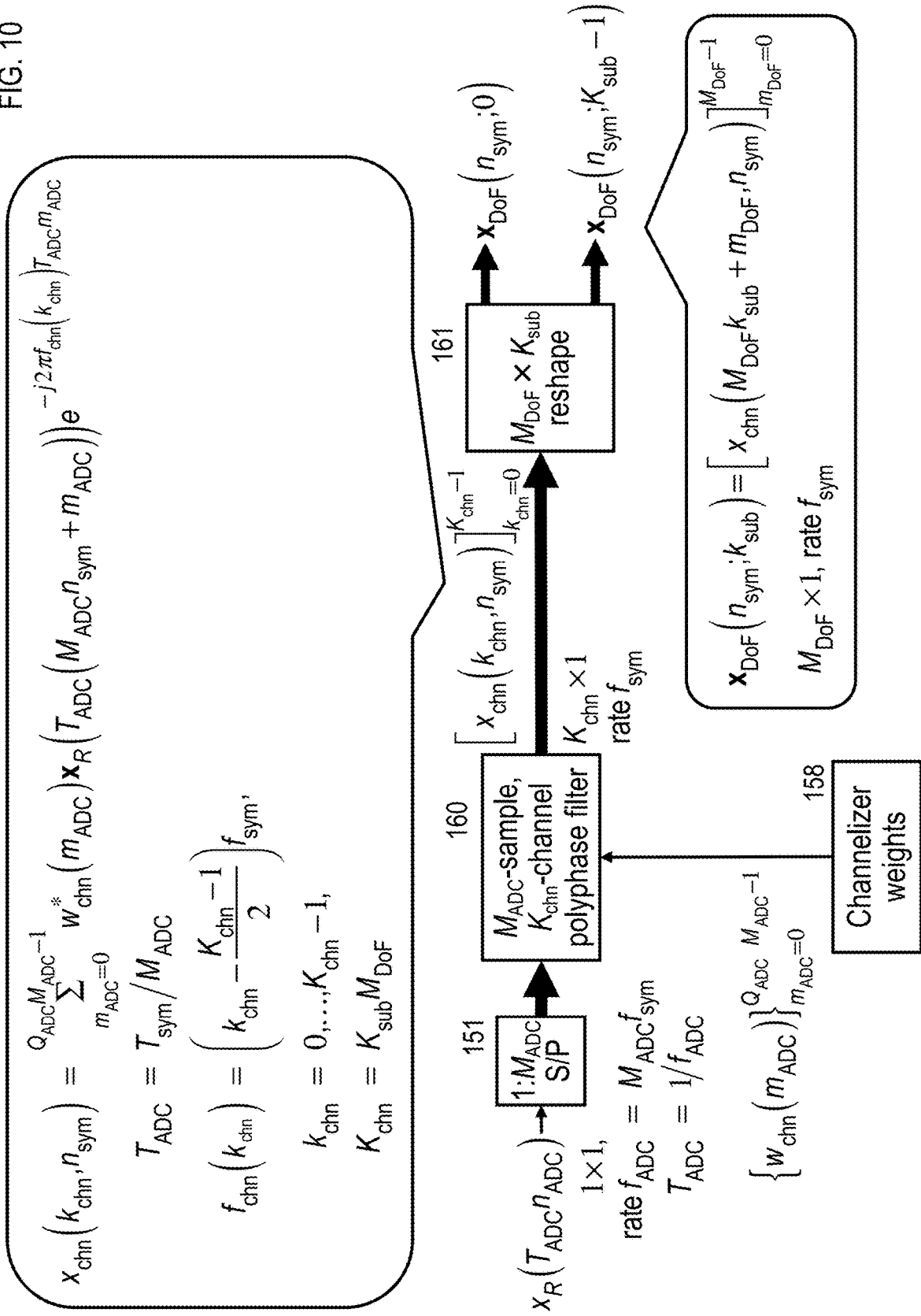
FIG. 10 is a block diagram of a single-feed polyphase filter based symbol-rate synchronous multi-subband channelizer according to an aspect of the disclosure.

FIG. 10 is a block diagram of an alternate single-feed polyphase filter based symbol-rate synchronous multi-subband channelizer, according to an aspect of the disclosure. This block diagram also depicts a simple means for separating the channelizer output signal into contiguous subbands. The ADC output data $x_R(T_{ADC}n_{ADC})$ is passed through a 1:$M_{ADC}$ serial-to-parallel converter (151) and a $Q_{ADC}M_{ADC}$-tap polyphase filter (160) with (typically real, potentially complex) channelizer weights $\{w_{chn}(m_{ADC})\}_{m_{ADC}=0}^{Q_{ADC}M_{ADC}}$ (158), given by $$x_{chn}(k_{chn}, n_{sym}) = \sum_{m_{ADC}=0}^{Q_{ADC}M_{ADC}-1} w^*_{chn}(m_{ADC}) \quad \text{Eqn (19)}$$
$$x_R(T_{ADC}(M_{ADC}n_{sym}+m_{ADC}))e^{-j2\pi f_{chn}(k_{chn})T_{ADC}m_{ADC}},$$

such that $x_{chn}(n_{sym})$ is given by $$x_{chn}(n_{sym}) = -1\sum_{q_{ADC}=0}^{Q_{ADC}-1} T_{chn}(q_{sym})x_{sym}(n_{sym}+q_{sym})T_{chn}(q_{sym}) = \quad \text{Eqn (20)}$$
$$[w^*_{chn}(M_{ADC}q_{sym}+m_{ADC})e^{-j2\pi f_{chn}(k_{chn})T_{ADC}(M_{ADC}q_{sym}+m_{ADC})}].$$

Relating to FIG. 7, this channelizer employs a transformation $x_{chn}(n_{sym})=T_{chn}\circ x_{sym}(n_{sym})$, where $T_{chn}$ is a $K_{chn}\times M_{ADC}$ polyphase filter with response length $Q_{ADC}$. In the aspect shown in FIG. 10, the channel frequencies $\{f_{chn}(k_{chn})\}_{k_{chn}=0}^{K_{chn}-1}$ are furthermore assumed to satisfy $$f_{chn}(k_{chn}) = \left(k_{chn} - \frac{K_{chn}-1}{2}\right)f_{sym} \quad \text{Eqn (21)}$$

such that $$T_{chn}(q_{sym})=(-1)^{(K-1)q_{sym}}[w^*_{chn}(M_{ADC}q_{sym}+m_{ADC})e^{-j2\pi k_{chn}m_{ADC}/M_{ADC}}.] \quad \text{Eqn (22)}$$

This channelizer can be implemented using methods well-known to those of ordinary skill in the art.

If $K_{chn}=K_{sub}M_{DoF}$, then $x_{chn}(n_{sym})$ can be directly transformed to $K_{sub}$ contiguous $M_{DoF}\times 1$ vector subband signals $\{x_{DoF}(n_{sym};k_{sub})\}_{k_{sub}=0}^{K_{sub}-1}$ with contiguous in-subband channels using a $M_{DoF}\times K_{sub}$ reshaping operation (161), such that $x_{DoF}(n_{sym};k_{sub})=[x_{chn}(M_{DoF}k_{sub}+m_{DoF},n_{sym})]_{m_{DoF}=0}^{M_{DoF}-1}$. The subband center frequencies $\{f_{sub}(k_{sub})\}_{k_{sub}=0}^{K_{sub}-1}$ are then given by $$f_{sub}(k_{sub}) = \left(k_{sub} - \frac{K_{sub}-1}{2}\right)M_{DoF}f_{sym}, k_{sub} = 0, , K_{sub}-1 \quad \text{Eqn (23)}$$

while the frequency channels within each subband are locally given by $$f_{chn}(m_{DoF}) = \left(m_{DoF} - \frac{M_{DoF}-1}{2}\right)f_{sym}, m_{DoF} = 0, , M_{DoF}-1 \quad \text{Eqn (24)}$$

such that $f_{chn}(M_{DoF}k_{sub}+m_{DoF})=f_{sub}(k_{sub})+f_{chn}(m_{DoF})$.

Figure 11:
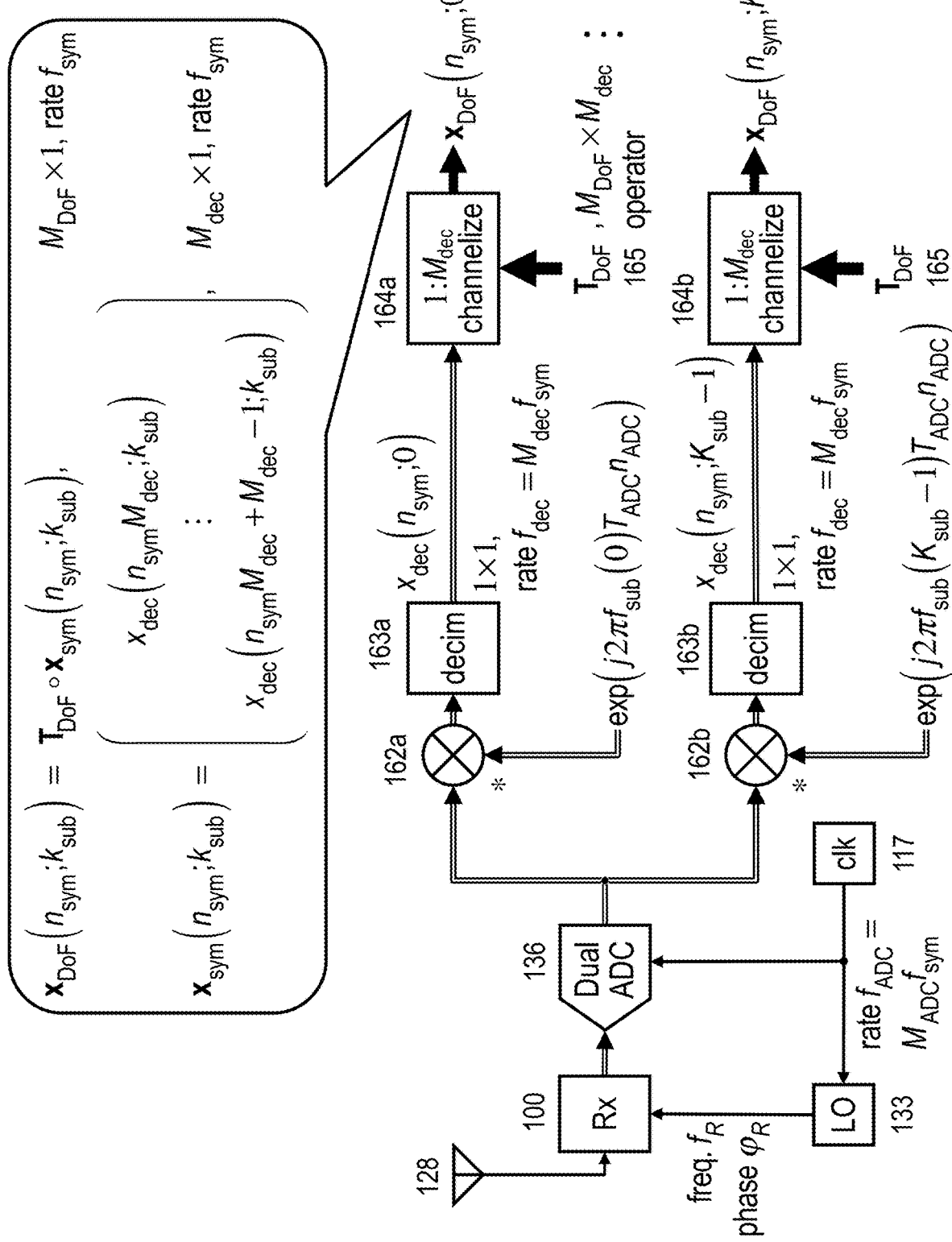
FIG. 11 is a block diagram of single-feed symbol-rate synchronous multi-subband channelizer according to another aspect of the disclosure.

FIG. 11 is a block diagram of a single-feed symbol-rate synchronous multi-subband channelizer according to another aspect of the disclosure. In this aspect, the ADC output signal is passed through a set of $K_{sub}$ frequency converters (162a)-(162b) and decimators (163a)-(163b), each of which frequency downconverts the ADC output signal by frequency $f_{sub}(k_{sub})$, and decimates that signal to intermediate rate $f_{dec}=M_{dec}f_{sym}$, where $M_{dec}$ is a positive integer. Each decimated signal $x_{dec}(n_{dec};k_{sub})$ is then passed through a symbol-rate synchronous channelization operation (164a)-(164b) comprising a 1:$M_{dec}$ serial-to-parallel converter and a $M_{DoF}\times M_{dec}$ channelization operator $T_{DoF}$ (165), to form channelized subband signal $x_{DoF}(n_{sym};k_{sub})=T_{DoF}\circ x_{sym}(n_{sym};k_{sub})$, where $x_{sym}(n_{sym};k_{sub})=[x_{dec}(M_{dec}n_{sym}+m_{dec};k_{sub})]_{m_{dec}=0}^{M_{dec}-1}$. The subband frequencies $\{f_{sub}(k_{sub})\}_{k_{sub}=0}^{K_{sub}-1}$ can be organized in accordance with Eqn (23); set to a preselected set of arbitrary frequencies; or adaptively determined based on channel dynamics or co-channel interference considerations.

Given the reception scenario described in FIG. 1 and FIG. 2, and the received signal model given in Eqn (4)-Eqn (14), then the single-sample channelizer output signal shown in FIG. 7 can be modeled by $$x_{chn}(n_{sym}) = i_{chn}(n_{sym}) + \sum_{\ell=1}^{L_T} s_{chn}(n_{sym};\ell), \quad \text{Eqn (25)}$$

where $i_{chn}(n_{sym})=T_{chn}\circ i_{sym}(n_{sym})$ and $s_{chn}(n_{sym};\ell)=T_{chn}\circ s_{sym}(n_{sym};\ell)$ are the $K_{chn}\times 1$ interference and navigation signal $\ell$ channelizer output signals, respectively, and where $$i_{sym}(n_{sym}) = \left[i_R\left(T_{sym}\left(n_{sym}+\frac{m_{ADC}}{M_{ADC}}\right)\right)\right] \text{ and}$$

$$s_{sym}(n_{sym};\ell) = \left[s_R\left(T_{sym}\left(n_{sym}+\frac{m_{ADC}}{M_{ADC}}\right);\ell\right)\right] \text{ are the } M_{ADC}\times 1$$

interference and GNSS signal $\ell$ S/P output vectors, respectively.

The '417 NPA, incorporated herein by reference, provides a detailed description of the signals obtaining at the output of a symbol-rate-synchronous channelizer with $K_{chn}=M_{DoF}$. A simpler channel model can be obtained using the polyphase filter aspect shown in FIG. 10. In this case, under the simplifying assumption $$s_R(t;\ell) \approx g_{TR}(\ell)e^{j2\pi\alpha_{TR}(\ell)t}s_T(t-\tau_{TR}(\ell);(\ell), \quad \text{Eqn (26)}$$

i.e., ignoring affects of platform dynamics other than Doppler shift caused by the transmitter velocity observed at the receiver, then the channelizer output signal $s_{chn}(k_{chn},n_{sym};\ell)$ is given by $$s_{chn}(k_{chn}, n_{sym}; \ell) = \quad \text{Eqn (27)}$$
$$e^{j2\pi\alpha_{TR}(\ell)T_{sym}n_{sym}} \sum_{q_{sym}} a_{chn}(k_{chn}, q_{sym}; \ell) d_T(n_{sym} - q_{sym}; \ell),$$

where $a_{chn}(k_{chn},n_{sym};\ell)$ is given by $$a_{chn}(k_{chn}, q_{sym}; \ell) = e^{j2\pi(q_{sym}T_{sym}-\tau_{TR}(\ell))f_{chn}(k_{chn})} e^{-j2\pi q_{sym}\alpha_{TR}(\ell)} \times \quad \text{Eqn (28)}$$
$$\int_{-\infty}^{\infty} w_{chn}^*(e^{j2\pi fT_{ADC}}) H_{TR}(f + f_{chn}(k_{chn})) e^{j2\pi(q_{sym}T_{sym}-\tau_{TR}(\ell))f} df,$$

in which $W(e^{j2\pi f})$ is the discrete Fourier transform of $w_{chn}(m_{ADC})$ and $H_{TR}(f;\ell)$ is the frequency response of the end-to-end symbol shaping, given by $$H_{TR}(f;\ell) = g_{TR}(\ell) e^{j2\pi\alpha_{TR}(\ell)\tau_{TR}(\ell)} H_R(f) H_T$$
$$(f-\alpha_{TR}(\ell);\ell)\sqrt{P_T(\ell)}, \quad \text{Eqn (29)}$$

where $H_T(f;\ell)$ is the Fourier transform of $h_T(t;\ell)$ given in Eqn (2) and $H_R(f)$ is the frequency response of the receiver filtering operations.

If $H_{TR}(f;\ell)$ is bandlimited below $f_{ADC}/2$, e.g., using typical pre-ADC antialiasing filters, the bandwidth of $W(e^{j2\pi f})$ is much less than the frequency variation in $H_{TR}(f;\ell)$, and $f_{chn}(k_{chn})$ is given by Eqn (21), then Eqn (28) can be approximated by $$a_{chn}(c_{chn},q_{sym};\ell) \approx a_{chn}(k_{chn};\ell) a_{sym}(q_{sym};\ell) \quad \text{Eqn (30)}$$

where $a_{chn}(k_{chn};\ell)$ and $a_{sym}(q_{sym};\ell)$ are the frequency-varying and time-varying components of the channel signature, $$a_{chn}(k_{chn};\ell) = f_{ADC} H_{TR}(f_{chn}(k_{chn});\ell) e^{-2\pi f_{chn}(k_{chn})\tau_{TR}(\ell)}, \quad \text{Eqn (31)}$$

$$a_{sym}(q_{sym};\ell) = $$
$$(-1)^{(K_{chn}-1)q_{sym}} W^*_{sym}(q_{sym}-\tau_{TR})(\ell)f_{sym})$$
$$e^{-j2\pi q_{sym}\alpha_{TR}(\ell)}, \quad \text{Eqn (32)}$$

respectively, referred to herein as the channel frequency signature and channel time signature, and where $w_{sym}(\tau)$ is the interpolated channelizer window, given by $$w_{sym}(\tau) = \sum_{m_{ADC}} w_{chn}(m_{ADC}) Sa(\pi(\tau M_{ADC} - m_{ADC})). \quad \text{Eqn (33)}$$

The channelized received signal $s_{chn}(k_{chn},n_{sym};\ell)$ is then approximated by $$s_{chn}(k_{chn},n_{sym};\ell) \approx a_{chn}(k_{chn};\ell) d_R(n_{sym};\ell), \quad \text{Eqn (34)}$$

where $d_R(n_{sym};\ell)$ is the signal $\gamma$ symbol sequence observed at the receiver, given by $$d_R(n_{sym};\ell) = (a_{sym}(n_{sym};\ell) \circ d_T(n_{sym};\ell))$$
$$e^{j2\pi\alpha_{TR}(\ell)T_{sym}n_{sym}}, \quad \text{Eqn (35)}$$

and where "$\circ$" here denotes the convolution operation. Further decomposing $\tau_{TR}(\ell)$ and $\alpha_{TR}(\ell)$ into symbol-normalized TOA and FOA components $$\tau_{TR}(\ell) = \quad \text{Eqn (36)}$$
$$(\tilde{\tau}_{TR}(\ell) + n_{TR}(\ell))T_{sym} \begin{cases} \tilde{\tau}_{TR}(\ell) \in [0\ 1), & \text{fractional fine } TOA \\ n_{TR}(\ell) \in \mathbb{Z}, & \text{TOA symbol offset} \end{cases},$$

$$\alpha_{TR}(\ell) = \quad \text{Eqn (37)}$$
$$(\tilde{\alpha}_{TR}(\ell) + k_{TR}(\ell))f_{sym} \begin{cases} \tilde{\alpha}_{TR}(\ell) \in \left[-\frac{1}{2}\ \frac{1}{2}\right), & \text{fractional fine } FOA \\ k_{TR}(\ell) \in \mathbb{Z}, & \text{FOA Nyquist zone} \end{cases},$$

respectively, then Eqn (34) can be replaced by $$d_R(n_{sym};\ell) = (a_{sym}(n_{sym};\ell) \circ d_T(n_{sym}-n_{TR}(\ell);\gamma))$$
$$e^{j2\pi\tilde{\alpha}_{TR}(\ell)n_{sym}}, \quad \text{Eqn (38)}$$

$$a_{sym}(q_{sym};\ell) = (-1)^{(K_{chn}-1)q_{sym}} W^*_{sym}$$
$$(q_{sym}-\tilde{\tau}_{TR}(\ell)) e^{-j2\pi q_{sym}\alpha_{TR}(\ell)}, \quad \text{Eqn (39)}$$

except for phase shift $\varphi(\ell) = 2\pi(f_{chn}(0)-\tilde{\alpha}_{TR}(\ell))n_{TR}(\ell)$, which is subsumed into end-to-end link gain in $g_{TR}(\ell)$ in Eqn (5). Then $d_R(n_{sym};\ell)$ is completely characterized by the channel time signature defined over fine TOA ranging between 0 and 1; the received TOA measured to integer number of symbols; and the fractional fine FOA ranging between $-\frac{1}{2}$ and $\frac{1}{2}$.

For the GNSS signals listed in FIG. 4, and assuming $|\alpha_{TR}(\ell)| f_{chp}$, then $a_{chn}(k_{chn};\ell)$ can be further approximated by $$a_{chn}(k_{chn};\ell) \approx \quad \text{Eqn (40)}$$
$$\frac{M_{ADC}}{\sqrt{M_{chp}}} Sa(\pi f_{chn}(k_{chn})T_{chp}) H_R(f_{chn}(k_{chn})) g_{TR}(\ell) \sqrt{P_T(\ell)} \varepsilon_R(k_{chn};\ell),$$

$$\varepsilon_R(k_{chn};\ell) = \quad \text{Eqn (41)}$$
$$\frac{1}{\sqrt{M_{chp}}} C_T \left( e^{-j2\pi(f_{chn}(k_{chn})-\alpha_{TR}(\ell))T_{chp}}; \ell \right) e^{-j2\pi(f_{chn}(k_{chn})-\alpha_{TR}(\ell);\ell)\tau_{TR}(\ell)},$$

where normalized observed ranging code frequency signature $\varepsilon_R(k_{chn};\ell)$ captures the cross-channel frequency variability of each channel frequency signature due to the separate ranging code used at each transmitter, and the differing TOA on each transmission path. For well-designed pseudo-random code sequences and $M_{chp}$ 1, $\varepsilon_R(k_{chn};\ell)$ can be modeled as a zero-mean, unit-variance, independent and identically-distributed (i.i.d.) complex-Gaussian random process. The channelized output signal can then be approximated by $$x_{chn}(n_{sym}) \approx i_{chn}(n_{sym}) + \sum_{\ell=1}^{L_T} a_{chn}(\ell) d_R(n_{sym};\ell), \quad \text{Eqn (42)}$$

where $a_{chn}(\ell) = [a_{chn}(k_{chn};\ell)]_{k_{chn}=0}^{K_{chn}-1}$ is the $K_{chn} \times 1$ signal $\ell$ channel frequency signature and $a_{chn}(k_{chn};\ell)$ is given by Eqn (40)-Eqn (41) and $d_R(n_{sym};\ell)$ is given by Eqn (38).

Assuming the background interference $i_R(t)$ given in Eqn (4) is complex-Gaussian and stationary with power spectral density (PDS) $S_{i_R i_R}(f)$, then the interference power level in each channel is given by $$\langle |i_{chn}(k_{chn}, n_{sym})|^2 \rangle = \int_{-1/2}^{1/2} |W_{chn}(e^{j2\pi f})|^2 \tilde{S}_{i_R i_R}(f + f_{chn}(k_{chn})T_{ADC})df, \quad \text{Eqn (43)}$$

where $$\tilde{S}_{i_R i_R}(f) = f_{ADC} \sum_{\ell} |H_R((f+\ell)f_{ADC})|^2 S_{i_R i_R}((f+\ell)f_{ADC})$$

is the PSD of sampled interference signal $i_R(T_{ADC}n_{ADC})$. Assuming the ADC input signal is bandlimited to less than $f_{ADC}/2$ ahead of the sampling operation, and that the PSD frequency variation is low over the passband of the polyphase filter frequency response $W_{chn}(e^{j2\pi f})$, then Eqn (43) can be approximated by $$\langle |i_{chn}(k_{chn}, n_{sym})|^2 \rangle \approx f_{ADC} |H_R(f_{chn}(k_{chn}))|^2 S_{i_R i_R}(f_{chn}(k_{chn})) \int_{-1/2}^{1/2} |W_{chn}(e^{j2\pi f})|^2 df \quad \text{Eqn (44)}$$

$$= f_{ADC} |H_R(f_{chn}(k_{chn}))|^2 S_{i_R i_R}(f_{chn}(k_{chn})) \|w_{chn}\|_2^2$$

$$= \frac{M_{ADC}^2}{M_{chp}} f_{chp} |H_R(f_{chn}(k_{chn}))|^2 S_{i_R i_R}(f_{chn}(k_{chn})),$$

where $$\|w_{chn}\|_2^2 = \sum_{m_{ADC}} |w_{chn}(m_{ADC})|^2$$

denotes the squared L2 Euclidean norm of the channelizer weights $\{w_{chn}(m_{ADC})\}$ (158), and further assuming normalization constraint $|w_{chn}|_2^2 = M_{ADC}$. More generally, the interference cross-correlation across symbol lag and frequency channel offset can be approximated by $$R_{i_{chn} i_{chn}}(k_{chn}, \ell_{chn}; m_{sym}) \triangleq \langle i_{chn}(k_{chn}, n_{sym}) i_{chn}^*(\ell_{chn}, n_{sym} - m_{sym}) \rangle \quad \text{Eqn (45)}$$

$$\approx \frac{M_{ADC}^2}{M_{chp}} f_{chp} S_{i_R i_R}\left(\frac{f_{chn}(k_{chn}) + f_{chn}(\ell_{chn})}{2}\right)$$

$$\times (-1)^{(K_{chn}-1)m_{sym}} \rho_{chn}\left(M_{ADC} m_{cym}, \frac{k_{chn} - \ell_{chn}}{M_{ADC}}\right),$$

where $$\rho_{chn}(m,\alpha) = \frac{1}{M_{ADC}}\sum_n w_{chn}(n)w_{chn}^*(n-m)e^{-j2\pi\alpha n}$$

is the discrete-time ambiguity function for channelizer window $\{w_{chn}(m_{ADC})\}$ (158), normalized by $M_{ADC}$ so that $|\rho_{chn}(m,\alpha)|\leq 1$.

FIG. 12 depicts the channel time signature (FIG. 12A) and normalized ambiguity function (FIG. 12B) induced by the polyphase-filter based symbol-rate synchronous channelizer (160) shown in FIG. 10, using single-symbol rectangularly-windowed channelizer weights (158). This Figure also obtains for the FFT-based symbol-rate synchronous channelized shown in FIG. 8 and FIG. 9. As shown in FIG. 12A, the channel time signature is only substantive over a single symbol for fine TOA offsets between 0 and 1, and is nearly equal to unity within this region. The received symbol sequence $d_R(n_{sym};\ell)$ given in Eqn (38) then simplifies to $$d_R(n_{sym};\ell) = d_T(n_{sym}-1-n_{TR}(\ell);\ell)e^{j2\pi\tilde{\alpha}_{TR}(\ell)n_{sym}}, \quad \text{Eqn (46)}$$

where the phase term $-2\pi\tilde{\alpha}_{TR}(\ell)$ is subsumed into $g_{TR}(\ell)$. Similarly, the normalized ambiguity function shown in FIG. 12B is equal to unity at zero channel and symbol offset. Hence the background interference for this channelizer window can be treated as independent between channels and symbols, yielding $K_{chn}\times K_{chn}$ interference autocorrelation matrix (ACM)

$$R_{i_{chn}i_{chn}} = \frac{M_{ADC}}{M_{chp}}f_{chp}\text{diag}\{|H_R(f_{chn}(k_{chn}))|^2 S_{i_R i_R}(f_{chn}(k_{chn}))\}_{k_{chn}=0}^{K_{chn}-1}. \quad \text{Eqn (47)}$$

However, the channel model established above can be extended to any channelizer window.

Multiplying $x_{chn}(n_{sym})$ by the inverse square-root of $R_{i_{chn}i_{chn}}$ yields normalized signal $$\tilde{x}_{chn}(n_{sym}) \approx R_{i_{chn}i_{chn}}^{-1/2}x_{chn}(n_{sym}), \quad \text{Eqn (48)}$$

$$\approx \varepsilon_{chn}(n_{sym}) + \sum_{\ell=1}^{L_T}u_{chn}(\ell)d_R(n_{sym};\ell),$$

where $d_R(n_{sym};\ell)$ is given by Eqn (46), $\varepsilon_{chn}(n_{sym})$ is a $K_{chn}\times 1$ i.i.d. complex-Gaussian random process with zero mean and ACM $I_{K_{chn}}$, and $u_{chn}(\ell)$ is the $K_{chn}\times 1$ signal $\ell$ normalized channel frequency signature given by $$u_{chn}(\ell) = \left[\frac{Sa(\pi f_{chn}(k_{chn})T_{chp})}{\sqrt{f_{chp}S_{i_R i_R}(f_{chn}(k_{chn}))}}\varepsilon_R(k_{chn};\ell)\right]g_{TR}(\ell)\sqrt{P_T(\ell)}. \quad \text{Eqn (49)}$$

In theory, a set of $K_{chn}\times 1$ combining weights $\tilde{w}_{max-SINR}(\ell)$ can then be developed that extracts $d_R(n_{sym};\ell)$ from $\tilde{x}_{chn}$ ($n_{sym}$) with maximum-attainable signal-to-interference-and-noise ratio (max-SINR). For the channel model given in Eqn (48)-Eqn (49), and assuming the navigation symbol sequences are independent for each transmitter, $\tilde{w}_{max-SINR}(\ell)$ is given by $$w_{max-SINR}(\ell) \propto \left(I_{K_{chn}} + U_{chn}(\sim\ell)U_{chn}^H(\sim\ell)\right)^{-1}u_{chn}(\ell) = \quad \text{Eqn (50)}$$

$$\left(I_{K_{chn}} - U_{chn}(\sim\ell)(I_{L_T-1} + U_{chn}^H(\sim\ell)U_{chn}(\sim\ell))^{-1}U_{chn}^H\right)u_{chn}(\ell),$$

where $U_{chn}(\sim\ell) = [u_{chn}(\ell')]_{\ell'\neq\ell}$ is the $K_{chn}\times(L_T-1)$ matrix of normalized frequency signatures interfering with signal $\ell$, and the max-SINR for symbol sequence $\ell$ is given by $$\gamma_{max-SINR}(\ell) \approx \|u_{chn}(\ell)\|_2^2 - \quad \text{Eqn (51)}$$

$$u_{chn}^H(\ell)U_{chn}(\sim\ell)\left(I_{L_T-1} + U_{chn}^H(\sim\ell)U_{chn}(\sim\ell)\right)^{-1}U_{chn}^H(\sim\ell)u_{chn}(\ell).$$

Modeling $\varepsilon_R(k_{sub};\ell)$ as i.i.d. complex Gaussian with zero mean and unity variance, appropriate for unknown, well-modeled long ranging codes, then Eqn (51) has mean lower bound $$\bar{\gamma}_{max-SINR}(\ell) = E\{\gamma_{max-SINR}(\ell)\} \geq \quad \text{Eqn (52)}$$

$$\left(\bar{\gamma}_{max-SNR}(\ell) - (L_T-1)\left(\frac{\bar{\gamma}_{max-INR}(\ell)}{1+\bar{\gamma}_{max-INR}(\ell)}\right)\max_{k_{chn}}\bar{\gamma}_{Rx-SNR}(k_{chn};\ell)\right),$$

$$\rightarrow \begin{cases} \bar{\gamma}_{max-SNR}(\ell), & \bar{\gamma}_{max-INR}(\ell) \ll 1 \quad \text{Eqn (53)} \\ \bar{\gamma}_{max-SNR}(\ell) - (L_T-1)\max_{k_{chn}}\bar{\gamma}_{max-SNR}(k_{chn};\ell), & \bar{\gamma}_{max-INR}(\ell) \gg 1, \end{cases}$$

where $\bar{\gamma}_{Rx-SNR}(k_{chn};\ell)$ and $\bar{\gamma}_{max-SNR}(\ell)$ are the mean receive SNR (Rx-SNR) and maximum-attainable SNR (max-SNR) of signal $\ell$ in the absence of interference navigation signals, respectively, $$\bar{\gamma}_{Rx-SNR}(k_{chn};\ell) = E\{|u_{chn}(k_{chn};\ell)|\} \quad \text{Eqn (54)}$$

$$= \frac{Sa^2(\pi f_{chn}^f(k_{chn})T_{chp})}{f_{chp}S_{i_R i_R}(f_{chn}(k_{chn}))}|g_{TR}(\ell)|^2 P_T(\ell),$$

$$\bar{\gamma}_{max-SNR}(\ell) = E\{\|u_{chn}(\ell)\|_2^2\} \quad \text{Eqn (55)}$$

$$= \sum_{k_{chn}=0}^{K_{chn}-1}\bar{\gamma}_{Rx-SNR}(k_{chn};\ell),$$

and where $\bar{\gamma}_{max-INR}(\ell)$ is the mean max-attainable SNR of navigation signals interfering with signal $\ell$, $$\bar{\gamma}_{max-INR}(\ell) = \frac{1}{L_T-1}\sum_{\ell'\neq\ell}\bar{\gamma}_{max-SNR}(\ell'). \quad \text{Eqn (56)}$$

As Eqn (53) shows, at high receive SNR, the max-SINR combiner uses $L_T-1$ combiner degrees of freedom (DoF's) to excise the navigation signals impinging on the receiver, and employs the remaining $K_{chn}-L_T+1$ combiner DoF's to suppress the background interference $i_{chn}(n_{sym})$.

As disclosed in the '417 NPA, incorporated herein by reference, linear algebraic methods to determine max-SINR weights can be devised given either knowledge of the content of $\{d_T(n_{sym};\ell)\}\ell_{=1}^{L_T}$, e.g., provided by third-party sources; knowledge of a component of $\{d_T(n_{sym};\ell)\}\ell_{=1}^{L_T}$, e.g., a known/periodic pilot signal; or knowledge of some other exploitable structure of $\{d_T(n_{sym};\ell)\}\ell_{=1}^{L_T}$, as listed in FIG. 4. These methods can be used to detect the navigation signals in the environment, estimate the max-SINR of the combiner output symbol sequences for those signals, and determine at least the geo-observables $\{n_{TR}(\ell), \tilde{\alpha}_{TR}(\ell)\}\ell_{=1}^{L_T}$ for those signals, and if needed estimate information-bearing components of the transmitted symbol streams $\{d_T(n_{sym};\ell)\}\ell_{=1}^{L_T}$. Moreover, these techniques can perform these operations without prior knowledge of the signal ranging code or receive frequency signature for the signals, or a search over TOA and FOA is the ranging code is known.

However, as also disclosed in the '417 NPA, linear-algebraic methods that can develop combiner weights covering the entire navigation signal passband, e.g., $K_{chn} \sim 1,000$ for the GPS L1 legacy signal, and $K_{chn} \sim 10,000$ for the GPS L5 civil signal, require $O(K_{chn}^2)$ operations/symbol to be implemented. Moreover, they require $O(K_{chn})$ symbols to converge to a useful solution, e.g., 2-to-4 seconds for the GPS L1 legacy signal, and 20-40 seconds for the GPS L5 civil signal. This convergence time introduces additional complexity in GNSS reception scenarios, due to channel dynamics caused by movement of the GNSS satellite vehicles.

In the '417 NPA, partial subband methods that reduce $K_{chn}$ to a manageable value are disclosed to overcome these issues. These methods can provide strong advantage in the presence of strong MOS-DSSS spoofing and jamming signals. However, they sacrifice substantive processing gain to achieve this capability at reasonable complexity and over short reception intervals. This issue can be especially significant for modern wideband navigation signals such as the GPS L5 civil signal. The multi-subband approach provides a path to overcome this limitation.

Returning to FIG. 10, reshape operation (161) shown in FIG. 10 separates $x_{chn}(n_{sym})$ into $K_{sub}$ subbands, each comprising $M_{DoF}$ frequency channels such that $K_{chn} = K_{sub} M_{DoF}$, and the signal in each subband can be represented by $$x_{DoF}(n_{sym}; k_{sub}) = \begin{pmatrix} x_{chn}(M_{DoF} k_{sub}, n_{sym}) \\ \vdots \\ x_{chn}(M_{DoF} k_{sub} + M_{DoF} - 1, n_{sym}) \end{pmatrix} \quad \text{Eqn (57)}$$

$$\approx i_{DoF}(n_{sym}; k_{sub}) + \sum_{\ell=1}^{L_T} a_{DoF}(k_{sub}; \ell) d_R(n_{cym}; \ell),$$

where $d_R(n_{sym}; \ell)$, given by Eqn (46) for the rectangularly-windowed channelizer, is shared for all subbands, and $a_{DoF}(k_{sub}; \ell)$ is the $M_{DoF} \times 1$ signal $\ell$ frequency signature for subband $k_{sub}$, $$a_{DoF}(k_{sub}; \ell) = \begin{pmatrix} a_{chn}(M_{DoF} k_{sub}, \ell) \\ \vdots \\ a_{chn}(M_{DoF} k_{sub} + M_{DoF} - 1, \ell) \end{pmatrix}, \quad \text{Eqn (58)}$$

and where $i_{DoF}(n_{sym}; k_{sub})$ is the background noise and interference received in subband $k_{sub}$. If $i_R(t)$ is stationary with PSD $S_{i_R i_R}(f)$ at the LPF output, then the zero-lag ACM of $i_{DoF}(n_{sym}; k_{sub})$ is further approximated by $$R_{i_{DoF} i_{DoF}}(k_{sub}) \approx \frac{M_{ADC}^2}{M_{chp}} f_{chp} |H_R(f_{sub}(k_{sub}))|^2 S_{i_R i_R}(f_{sub}(k_{sub})) P_{sub}, \quad \text{Eqn (59)}$$

where $$f_{sub}(k_{sub}) = \left(k_{sub} - \frac{K_{sub} - 1}{2}\right) M_{DoF} f_{sym}$$

is the center frequency of subband $k_{sub}$, and where $$P_{sub} = \left[\frac{1}{M_{ADC}} \sum_m |w_{chn}(m)|^2 e^{-j2\pi(k-\ell)m/M_{ADC}}\right]_{k,\ell=0}^{M_{DoF}-1}$$

is the normalized subband interference ACM, which is equal to $I_{M_{DoF}}$ for the single-symbol rectangular channelizer window.

If $M_{DoF} \geq L_T$, then navigation symbol sequences $\ell$ can be received in each subband using an appropriately designed set of max-SINR linear in-subband linear combining weights $w_{max-SINR}(k_{sub}; \ell)$, such that combiner output symbol sequence $d_p(n_{sym}; k_{sub}; \ell) = w_{max-SINR}^H(k_{sub}; \ell) x_{sub}(n_{sym}; k_{sub})$ excises the interfering navigation signals $\{d_R(n_{sym}; \ell')\}\ell'_{\neq \ell}$ also received in the subband using $L_T - 1$ degrees of freedom, and suppresses the background interference $i_{sub}(n_{sym}; k_{chn})$ in the subband using the remaining $M_{DoF} - L_T + 1$ degrees of freedom, and where $(\circ)^H$ denotes the Hermitian transpose operation. Assuming a nearly-flat signature and interference response over each subband, and rectangular channelizer windows, then the SINR achievable using this linear combiner satisfies mean lower bound $$\bar{\gamma}_{max-SINR}(k_{sub}; \ell) \geq \quad \text{Eqn (60)}$$

$$\left(M_{DoF} - (L_T - 1)\left(\frac{\bar{\gamma}_{max-INR}(k_{sub}; \ell)}{1 + \bar{\gamma}_{max-INR}(k_{sub}; \ell)}\right)\right) \bar{\gamma}_{Rx-SNR}(k_{sub}; \ell),$$

$$\rightarrow \begin{cases} M_{DoF} \bar{\gamma}_{Rx-SNR}(k_{sub}; \ell) & \bar{\gamma}_{max-INR}(k_{sub}; \ell) \ll 1 \\ (M_{DoF} - L_T + 1) \bar{\gamma}_{Rx-SNR}(k_{sub}; \ell), & \bar{\gamma}_{max-INR}(k_{sub}; \ell) \gg 1 \end{cases} \quad \text{Eqn (61)}$$

in each subband, where $\bar{\gamma}_{Rx-SNR}(k_{sub}; \ell)$ and $\bar{\gamma}_{max-INR}(k_{sub}; \ell)$ are the mean receive signal $\ell$ SNR and the max-attainable navigation signal interference received along with that signal in subband $k_{sub}$, respectively $$\bar{\gamma}_{Rx-SNR}(k_{sub}; \ell) \approx \frac{Sa^2(\pi f_{sub}(k_{sub}) T_{chp})}{f_{chp} S_{i_R i_R}(f_{sub}(k_{sub}))} |g_{TR}(\ell)|^2 P_T(\ell), \quad \text{Eqn (62)}$$

$$\bar{\gamma}_{max-INR}(k_{sub}; \ell) \approx \frac{M_{DoF}}{L_T - 1} \sum_{\ell' \neq \ell} \bar{\gamma}_{Rx-SNR}(k_{sub}; \ell). \quad \text{Eqn (63)}$$

As Eqn (61) shows, the max-SINR weights can excise up to $L_T - 1$ strong MOS-DSSS signals impinging on the receiver in each subband, and can provide an additional factor of $M_{DoF} - L_T + 1$ SNR gain to suppress the remaining background noise and interference in each subband. In low-SNR environments where all of the navigation signals are received well below the noise floor ($\bar{\gamma}_{Rx\text{-}SNR}(k_{sub};\ell) \ll 1/M_{DoF}$), the max-SINR weights can provide the full factor-of-$M_{DoF}$ SNR gain available to the receiver.

In aspects of the invention, the symbol sequence estimates from each subband are then further combined using cross-band linear combining weights $\{g_{sub}(k_{sub};\ell)\}_{k_{sub}=0}^{K_{sub}-1}$, yielding multi-subband symbol sequence estimate $$\hat{d}_R(n_{sym};\ell) \approx \sum_{k_{sub}=0}^{K_{sub}-1} g^*_{sub}(k_{sub};\ell)\hat{d}_R(n_{sym};k_{sub};\ell) \quad \text{Eqn (64)}$$

$$\approx g^H_{sub}(\ell)\hat{d}_{sub}(n_{sym};\ell).$$

Assuming each subband has substantively excised the MOS-DSSS signals impinging on the receiver, and has provided a unit-power output signal, then $\hat{d}_{sub}(n_{sym};\ell)$ can be approximated by $$\hat{d}_R(n_{sym};\ell) \approx \sum\nolimits_{max\text{-}SINR}^{1/2}(\ell)\varepsilon(n_{sym};\ell) + a_{max\text{-}SINR}(\ell)\hat{d}_R(n_{sym};\ell)$$

$$\sum\nolimits_{max\text{-}SINR}(\ell) = \text{diag}\left\{\frac{\gamma_{max\text{-}SINR}(k_{sub};\ell)}{(1+\gamma_{max\text{-}SINR}(k_{sub};\ell))^2}\right\}$$

$$a_{max\text{-}SINR}(\ell) = \left[\frac{\gamma_{max\text{-}SINR}(k_{sub};\ell)}{1+\gamma_{max\text{-}SINR}(k_{sub};\ell)}\right].$$

The SINR of this signal is maximized by setting $g_{sub}(\ell) = [1 + \gamma_{Max\text{-}SINR}(k_{sub};\ell)]$, yielding output SINR $$\gamma_{max\text{-}SINR}(n_{sym};\ell) = \sum_{k_{sub}=0}^{K_{sub}-1} \gamma_{max\text{-}SINR}(k_{sub};\ell), \quad \text{Eqn (65)}$$

which has mean lower bound $$\bar{\gamma}_{max\text{-}SINR}(\ell) \geq \quad \text{Eqn (66)}$$

$$\sum_{k_{sub}=0}^{K_{sub}-1}\left(M_{DoF} - (L_T-1)\left(\frac{\bar{\gamma}_{max\text{-}INR}(k_{sub};\ell)}{1+\bar{\gamma}_{max\text{-}INR}(k_{sub};\ell)}\right)\right)\bar{\gamma}_{Rx\text{-}SNR}(k_{sub};\ell),$$

$$\rightarrow \begin{cases} M_{DoF}\sum_{k_{sub}}\bar{\gamma}_{Rx\text{-}SNR}(k_{sub},\ell), & \bar{\gamma}_{max\text{-}INR}(k_{sub};\ell) \ll 1 \quad \text{Eqn (67)} \\ (M_{DoF}-L_T+1)\sum_{k_{sub}}\bar{\gamma}_{Rx\text{-}SNR}(k_{sub};\ell), & \bar{\gamma}_{max\text{-}INR}(k_{sub};\ell) \gg 1. \end{cases}$$

Thus, the multi-subband solution can recover all or most of the processing gain of the full-channelizer max-SINR combiner, if $M_{DoF}$ is greater than the expected number of MOS-DSSS signals impinging on the receiver.

In-subband linear combining weights approaching the max-SINR solution can be computed using linear-algebraic methods disclosed in the '417 NPA, given either knowledge of the content of $\{d_T(n_{sym};\ell)\}_{\ell=1}^{L_T}$, e.g., provided by third-party sources; knowledge of a component of $\{d_T(n_{sym};\ell)\}_{\ell=1}^{L_T}$, e.g., a known/periodic pilot signal; or other exploitable structure of $\{d_T(n_{sym};\ell)\}_{\ell=1}^{L_T}$, as listed in FIG. 4. These methods also can be used to estimate the max-SINR obtaining in each subband, thereby providing cross-subband weights for the second combining stage shown in Eqn (64). The multi-subband solution can further be used to estimate the full max-SINR of the received symbol sequences, detect the navigation signals in the environment, determine at least the geo-observables $\{n_{TR}(\ell), \tilde{\alpha}_{TR}(\ell)\}_{\ell=1}^{L_T}$ for those signals, and if needed estimate information-bearing components of the transmitted symbol streams $\{d_T(n_{sym};\ell)\}_{\ell=1}^{L_T}$. Moreover, these techniques can perform these operations without prior knowledge of the signal ranging code or receive frequency signature for the signals, or a search over TOA and FOA is the ranging code is known.

In contrast to the full-band solution, however, the complexity of the multi-subband method scales quadratrically with $M_{DoF}$ and linearly with $K_{sub}$, such that the full set of $K_{chn}$ channels provided by the symbol-rate synchronous channelizer can be processing at a complexity of $O(K_{sub}M_{DoF}^2) = O(K_{chn}M_{DoF})$ operations/symbol—a factor of $K_{sub}$ saving in operations relative to the full-band system. Moreover, the number of symbols needed to provide a stable solution using the methods disclosed in the '417 NPA are $O(M_{DoF})$, also a factor of $K_{sub}$ reduction in convergence time relative to the full-band methods. In the invention, the value of $M_{DoF}$ becomes a design parameter dictated by the number of MOS-DSSS signals expected to be encountered in the receive environment, and the desired complexity and convergence time of the signal reception algorithms, independent from the bandwidth of the receiver.

As an specific example, setting $K_{chn} = 960$ for the GPS L1 legacy signal and $K_{chn} = 9,600$ for the GPS L5 civil signal, i.e., and setting $M_{DoF} = 60$ in both cases to allow reception of all of the GPS signals in the field of view of the receiver as well as 30-45 beacons or spoofers, then the multi-subband processor has a complexity and convergence time reduction of 16 for the GPS L1 legacy signal, and 160 for the GPS L5 civil signal, allowing convergence in as little as 120 ms for both methods and complexity of O(57.6) Mops/s for the GPS L1 legacy signal and O(576) Mops/s for the GPS L5 civil signal—well within the capabilities of modern DSP equipment, and low-cost DSP for the GPS L1 legacy signal. Moreover, the multi-subband approach is highly amenable to parallel processing methods, facilitating it's implementation in FPGA's and general-purpose GPU (GPGPU) architectures.

Taking channel time-variation given in Eqn (5)-Eqn (14) due to moving transmitters and/or receivers more precisely into account, then over reception intervals on the order of 0-to-2 seconds, Eqn (42) generalizes to $$x_{chn}(n_{sym}) \approx i_{chn}(n_{sym}) + \sum_{\ell=1}^{L_T} a_{chn}(n_{sym};\ell)d_R(n_{sym};\ell), \quad \text{Eqn (68)}$$

where time-varying frequency-signature $a_{chn}(n_{sym};\ell)$ is approximated by $$a_{chn}(n_{sym};\ell) \approx a_{chn}(\ell) \odot \left[e^{-j2\pi(f_{chn}(k_{chn})-\alpha_{TR}(\ell))T_{sym}(\tau_{TR}(\ell)+\tau^{(1)}_{TR}(\ell)n_{sym})}\right], \quad \text{Eqn (69)}$$

and the observed symbol sequence is given by $$d_R(n_{sym}; \ell) \approx$$ Eqn (70)

$$(a_{sym}(n_{sym}; \ell) \otimes d_T(n_{sym} - n_{TR}(\ell); \ell))e^{j2\pi\left(\tilde{\alpha}_{TR}^{(1)}(\ell)n_{sym} + \frac{1}{2}\tilde{\alpha}_{TR}^{(1)}(\ell)n_{sym}^2\right)} \rightarrow$$

$$d_T(n_{sym} - n_{TR}(\ell) - 1; \ell)e^{j2\pi\left(\tilde{\alpha}_{TR}^{(1)}(\ell)n_{sym} + \frac{1}{2}\tilde{\alpha}_{TR}^{(1)}(\ell)n_{sym}^2\right)},$$

and where " " denotes the element-wise multiplication (Hadamard product) operation, $\tau_{TR}^{(1)}(\ell)$ is the observed differential TOA (DTOA) given in Eqn (10), and $\tilde{\alpha}_{TR}^{(1)}(\ell) = \alpha_{TR}^{(1)}(\ell)T_{sym}^2$ is the symbol-normalized observed differential FOA (DFOA). Hence the DTOA principally affects the channel frequency signature, by inducing a linear frequency shift across the symbol-rate synchronous frequency channels, while the DFOA principally affects the channel time signature, by inducing a quadratic frequency shift over the time symbols. However, it should be noted that the FOA is linearly related to the DTOA, as shown in Eqn (9), hence it affects both signature components.

For typical GNSS reception scenarios, $\tau_{TR}^{(1)}(\ell)$ is typically less than 4 µs/s in magnitude, resulting in a link FOA of ±6.3 kHz at the L1 GPS center frequency, and ±4.7 kHz at the GPS L5 center frequency. From Eqn (69), This DTOA value can also cause a differential frequency shift of as much as 8 Hz over the ±1.023 MHz L1 GPS legacy signal band, or 80 Hz over the ±10.23 MHz L5 civil GPS band; hence it must be taken into account in any geo-observable estimation algorithm implemented over >10 ms reception intervals.

In this regard, the multi-subband approach shown in FIG. 10 provides an additional benefit, by separating the frequency channels into narrow subbands during the reshape operation (161). In this case, the subband signal can be modeled by $$x_{DoF}(n_{sym}) \approx i_{DoF}(n_{sym}) + \sum_{\ell=1}^{L_T} a_{DoF}(n_{sym}; \ell)d_R(n_{sym}; k_{sub}; \ell),$$ Eqn (71)

$$d_R(n_{sym}; k_{sub}; \ell)d_T(n_{sym} - n_{TR}(\ell) - 1; \ell)$$ Eqn (72)

$$e^{-j2\pi(f_T + f_{sub}(k_{sub}))T_{sym}\left(\tau_{TR}^{(1)}(\ell)n_{sym} + \frac{1}{2}\tau_{TR}^{(2)}(\ell)n_{sym}^2\right)},$$

$$a_{DoF}(n_{sym}; \ell) =$$ Eqn (73)

$$a_{DoF}(\ell) \odot \left[e^{-j2\pi\left(m_{DoF} - \left(\frac{M_{DoF}-1}{2}\right)\right)\alpha_{TR}(\ell)T_{sym}}\left(\dot{\tau}_{TR}(\ell) + \tau_{TR}^{(1)}(\ell)n_{sym}\right)\right].$$

In aspects of the invention described herein, the substantive cross-subband frequency shift modeled in Eqn (72) is estimated as part of the geo-observable estimation procedure. The observed time-variability in the subband frequency signature $a_{DoF}(n_{sym}; \ell)$ modeled in Eqn (73) induces a much lower in-subband frequency shift, due to the much lower bandwidth of the subband. For the example cited above, where $M_{DoF}=60$, a DTOA of 4 µs/s induces a frequency shift of 0.24 Hz across the subband, or 0.12 cycles over 500 ms. As disclosed in the '417 NPA, this frequency shift creates low-level dispersive components that can be excised as part of the adaptation process for sufficiently large values of $M_{DoF}$; the value considered here is likely to be more than sufficient for typical GNSS reception scenarios, even in the presence of strong ground beacons, and in the presence of strong spoofers attempting to emulate GNSS transmitter dynamics.

Similarly, for typical GNSS reception scenarios, $\alpha_{TR}^{(1)}(\ell)$ is typically less than 3 Hz/s in magnitude. As a consequence, its affect is minimal for reception intervals of 500 ms or less, and manageable for reception intervals on the order of 2 seconds or less, using aspects of the invention disclosed herein.

Accounting for worst-case channel dispersion, if $M_{DoF} \geq 2L_T$ the entire network symbol stream can be extracted from the channel, i.e., the interfering MOS-DSSS symbol sequences can be excised from each GNSS symbol, using purely linear combining operations, and even if the navigation signals are received with high-SNR inducing significant cross-interference. This can include methods well known to the signal processing community, e.g., blind adaptive baseband extraction methods described in the prior art, and linear minimum-mean-square-error (LMMSE) methods described in the prior art. For signals transmitted from MEO GNSS SV's, and in the absence of pseudolites or spoofers operating in the same band as those SV's, no more than 12 SV's are likely to be within the field of view of a GNSS receiver at any one time ($L_T \leq 12$). Over short observation intervals, maximum substantive rank change induced by the MOS-DSSS signals is therefore likely to be 24. This number can grow to 48 in the presence of 12 spoofers "assigned" to each legitimate navigation signal. In both cases, this is much less than the number of channels available for any GNSS signals listed in FIG. 4.

This channel response is also exactly analogous to channel responses induced in massive MIMO networks currently under investigation for next-generation (5G) cellular communication systems. However, it achieves this response using only a single-feed receiver front-end, thereby bypassing the most challenging aspect of massive MIMO transceiver technology. And it provides an output signal with an effective data rate of 1 ksps for all of the signals listed in FIG. 4, as opposed to 10-20 Msps for massive MIMO networks under consideration for 5G cellular communication applications. This receiver front-end also provides considerable flexibility in the number of degrees of freedom $M_{DoF}$ used at the receiver, e.g., by modifying the ADC sampling rate, or the number of FFT bins used in the channelizer, or any combination thereof (albeit, at loss in processing gain if the channelizer does not fully cover the GNSS signal passband).

Lastly, the digital signal processing (DSP) operations needed to exploit this channel response are expected to be very similar to operations needed for 5G data reception, albeit at a 3-4 order-of-magnitude lower switching rate. Given the massive investment expected in 5G communications over the next decade, and the ongoing exponential improvements in cost and performance of DSP processing and memory, e.g., Moore's and Kryder's Laws, the ability to fully exploit this channel response will become increasingly easier over time.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. The phrase "A or B" may correspond to A only, B only, or A and B. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. The words "module," "block," "element," "device," and the like may not be a substitute for the word "means." As such, no claim element is to be construed as a means plus function unless the element is expressly recited using the phrase "means for."

Extension to Multifeed Reception

Figure 13:
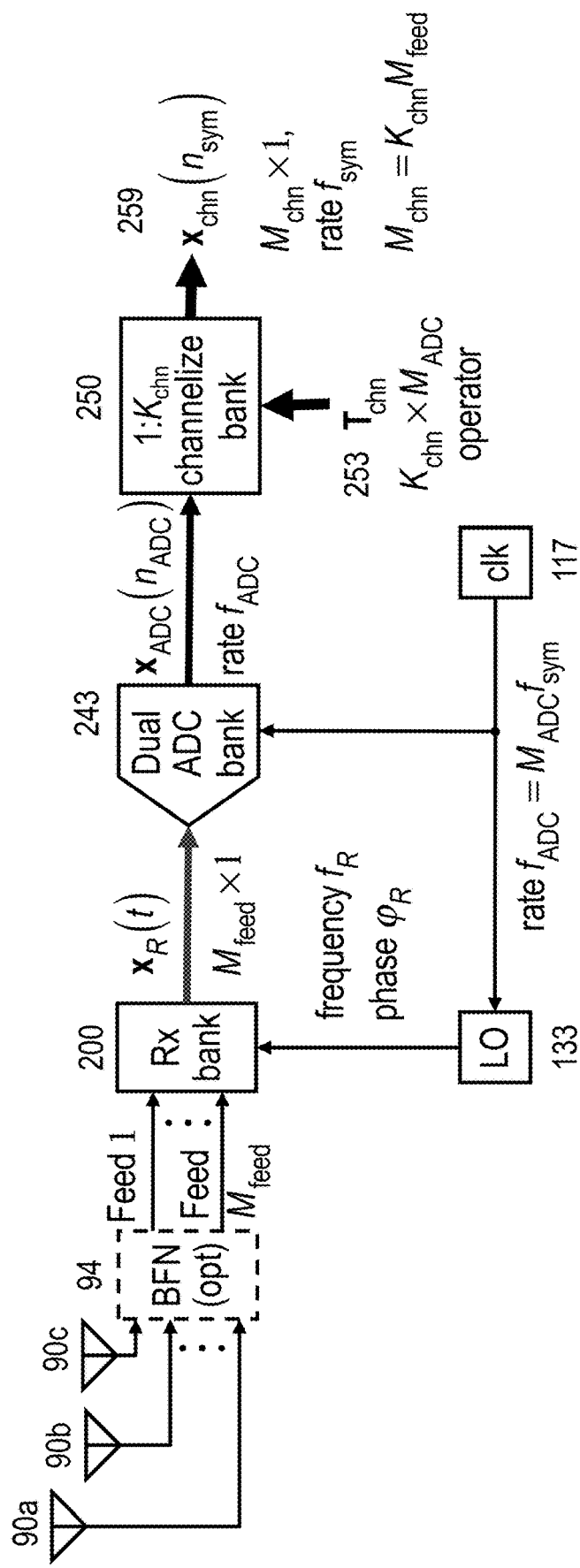
FIG. 13 is a block diagram that depicts a multifeed receiver and channelizer in accordance with an aspect of the disclosure.

FIG. 13 depicts aspects of the invention, in which the MOS-DSSS navigation signals are received over $M_{feed}$ feeds using a set of spatial and/or polarization diverse antennas (90a-90c). In some aspects, that antennas are additionally coupled from a larger set of antennas to $M_{feed}$ feeds using a beamforming network (BFN) (94), e.g., a Butler mode former, to provide spatial beamsteering operations, exclude known interference sources, or extract stronger and/or spatially whitened modes from the antenna array. The $M_{feed}$ feeds are then coherently converted to complex-baseband using a direct-conversion receiver bank (200), to form $M_{feed} \times 1$ signal vector $x_R(t) = [x_R(t; m_{feed})]_{m_{feed}=1}^{M_{feed}}$. The feed vector $x_R(t)$ is then sampled by a bank of dual-ADC's (243), at sampling rate $M_{ADC} f_{sym}$ determined by a common clock (117) where $f_{sym}$ is the baseband symbol rate of the MOS-DSSS navigation signals transmitted to the receiver, and $M_{ADC}$ is a positive integer.

Assuming coherent downconversion of the received signals, the complex $M_{feed} \times 1$ signal generated output from the receiver bank (200) is modeled as $$x_R(t) = i_R(t) + \sum_{\ell=1}^{L} s_R(t; \ell),$$

where $i_R(t)$ comprises the $M_{feed} \times 1$ vector of background noise and co-channel interference (CCI) present in the receiver passband, and $s_R(t; \ell)$ is $M_{feed} \times 1$ vector of MOS-DSSS navigation signals received from transmitted $\ell$. In the absence of nonlocal multipath, $s_R(t; \ell)$ is modeled by $$s_R(t_0 + t; \ell) \approx$$

$$e^{j2\pi(\alpha_{TR}(\ell)t + \frac{1}{2}\alpha_{TR}^{(1)}(\ell)t^2)} g_{TR}(\ell)(a_{TR}(t; \ell) \circ s_T((1-\tau_{TR}^{(1)}(\ell))t - \tau_{TR}(\ell); \ell)),$$

Eqn (74)

where $a_{TR}(t; \ell)$ is the $M_{feed} \times 1$ time-varying spatial signature operator with frequency response $A_{TR}(f; \ell)$, which is also assumed to adhere to a first-order spatial signature blur model in presence of channel dynamics, due to both movement of the receiver over the reception interval, and adjustments in the yaw, pitch, and roll orientation of the receiver platform. Assuming the antennas have nonzero gain along right-hand and left-hand circular polarizations, and in absence of local scattering multipath and channel dynamics, $a_{TR}(t; \ell)$ can be modeled as $$A_{TR}(f; \ell) = A_R(f; \Psi_R u_{TR}(\ell)) p_{TR}(\ell),$$

Eqn (75)

where $u_{TR}(\ell)$ is the observed line-of-bearing (LOB) direction vector given in Eqn (15) and $\Psi_R$ is a 3×3 rotation matrix that captures the yaw, pitch, and tilt of the receiver platform and converts the LOB vector to a local unit-norm direction-of-arrival (DOA) vector, in some aspects parameterized with respect to azimuth and elevation angles, and where $\{A_R(f; u)\}_{|u|_2=1} = \{[A_R(f;u)|_{RHCP} \ A_R(f;u)|_{LHCP}]\}_{|u|_2=1}$ is the array manifold of $M_{feed} \times 2$ complex gains along the right-hand and left-hand circular polarizations at the BFN output, parameterized with respect to 3×1 unit-norm local direction-of-arrival (DOA) vector u, and $p_{TR}(\ell)$ is a 2×1 unit-norm polarization gain vector. The array manifold can include adjustments to account for multipath local to the receiver platform, mutual coupling between antenna elements, and direction-independent complex gains in any distribution system coupling the array to the BFN and/or the receiver bank.

As shown in FIG. 13, each element of signal vector $x_R(t)$ is then channelized into a $K_{chn} \times 1$ signal vector $x_{chn}(n_{sym}; m_{feed}) = [x_{chn}(k_{chn}, n_{sym}; m_{feed})]_{k_{chn}=0}^{K_{chn}-1}$, using a bank of $M_{feed}$ symbol-rate synchronous $1:K_{chn}$ vector channelizers (250), for example, using $M_{feed}$ $1:M_{ADC}$ S/P operations and $K_{chn} \times M_{ADC}$ channelization matrix operators $T_{chn}$ (253), to form channelized signal $x_{chn}(n_{sym} 1 m_{feed}) = T_{chn} \circ [x_R(n_{sym} T_{sym} + m_{ADC} T_{ADC}; m_{feed})]$. The $M_{feed}$ channelizer output signals $\{x_{chn}(n_{sym}; m_{feed})\}_{m_{feed}=1}^{M_{feed}}$ are then combined to form a single $M_{chn} \times 1$ complex vector $x_{chn}(n_{sym})$ (259), where $M_{chn} = K_{chn} M_{feed}$. In some aspects of the invention, this is performed by "stacking" the signals first by receiver feed, and then by channel, such that $$x_{chn}(n_{sym}) = \begin{pmatrix} [x_{chn}(0, n_{sym}; m_{feed})]_{m_{feed}=1}^{M_{feed}} \\ \vdots \\ [x_{chn}(K_{chn}-1, n_{sym}; m_{feed})]_{m_{feed}=1}^{M_{feed}} \end{pmatrix}.$$

Eqn (76)

In others, combining is performed first by channel, then by receiver feed, such that $x_{chn}(n_{sym}) = [x_{chn}(n_{sym}; m_{feed})]_{m_{feed}=1}^{M_{feed}}$. Other, more general combining strategies can also be used; however, the form shown in Eqn (76) is has strong advantages for multi-subband processing.

Figure 14:
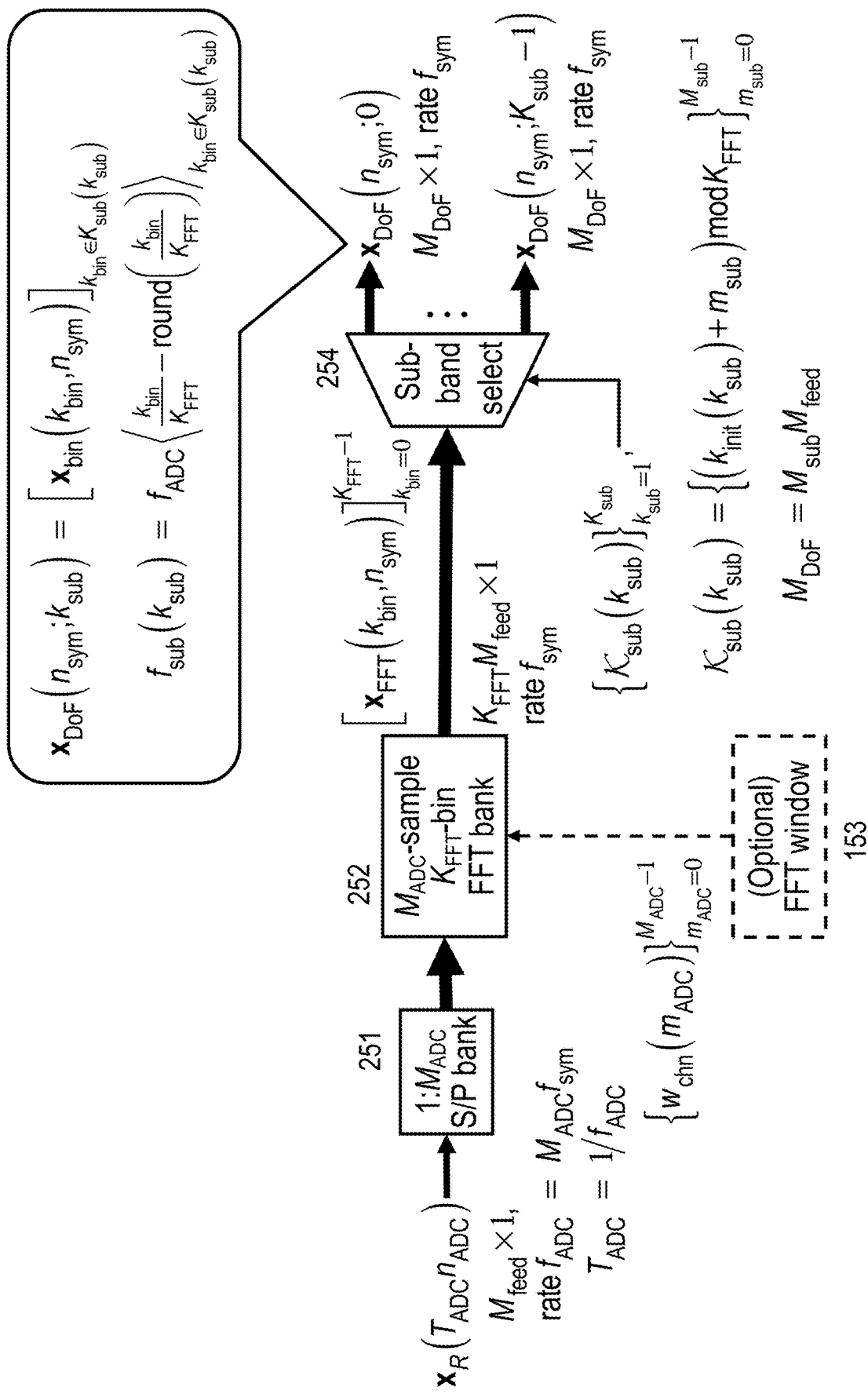
FIG. 14 is a block diagram of a multifeed FFT-based symbol-rate synchronous multi-subband channelizer according to an aspect of the disclosure.

FIG. 14 depicts one aspect for performing multifeed, multi-subband channelization, using an FFT-based frequency channelization method. The $M_{feed} \times 1$ vector ADC output signal $x_{ADC}(n_{ADC}) = x_R(T_{ADC} n_{ADC})$ is passed through a bank of $M_{feed}$ $1:M_{ADC}$ serial-to-parallel (S/P) convertors (251) and optionally windowed (153) symbol-rate synchronous FFT operations (252), each of which computes a $K_{FFT}$-bin FFT using $M_{ADC}$ contiguous samples of ADC output data, where $f_{ADC} = M_{ADC} f_{sym}$. The FFT operation creates $K_{FFT} M_{feed} \times 1$ data vector $[x_{FFT}(k_{bin}, n_{sym})]_{k_{bin}=0}^{K_{FFT}-1}$ with rate $f_{sym}$, where $x_{FFT}(k_{bin}, n_{sym}) = [x_{FFT}(k_{bin}, n_{sym}; m_{feed})]_{m_{feed}=0}^{M_{feed}}$.

The FFT output vector is then passed through a subband selection operation (254), which selects $K_{sub}$ subbands of FFT bins to form subbands $\{x_{DoF}(n_{sym}; k_{sub})\}_{k_{sub}=0}^{K_{sub}-1}$, each with rate $f_{sym}$. In the shown in FIG. 14, each of the subbands comprise $M_{sub}$ FFT bins, such that $x_{DoF}(n_{sym}; k_{sub})$ is an $M_{DoF} \times 1$ vector given by $x_{DoF}(n_{sym}; k_{sub}) = [x_{FFT}(k_{bin}(m_{sub}; k_{sub}), n_{sym})]_{m_{sub}=0}^{M_{sub}-1}$, and where $M_{DoF} = M_{sub} M_{feed}$.

Other aspects may vary the number of FFT bins in each subband, e.g., to account for interference loading or spectral shaping issues in each subband. In the aspect shown in FIG. 14, a "dense" subband selection strategy in which $k_{bin}(m_{sub};k_{sub})=(k_{init}(k_{sub})+m_{sub})\bmod K_{FFT}$ is also shown; however, as in the single-feed receiver, different strategies can be used to form each subband set.

Figure 15:
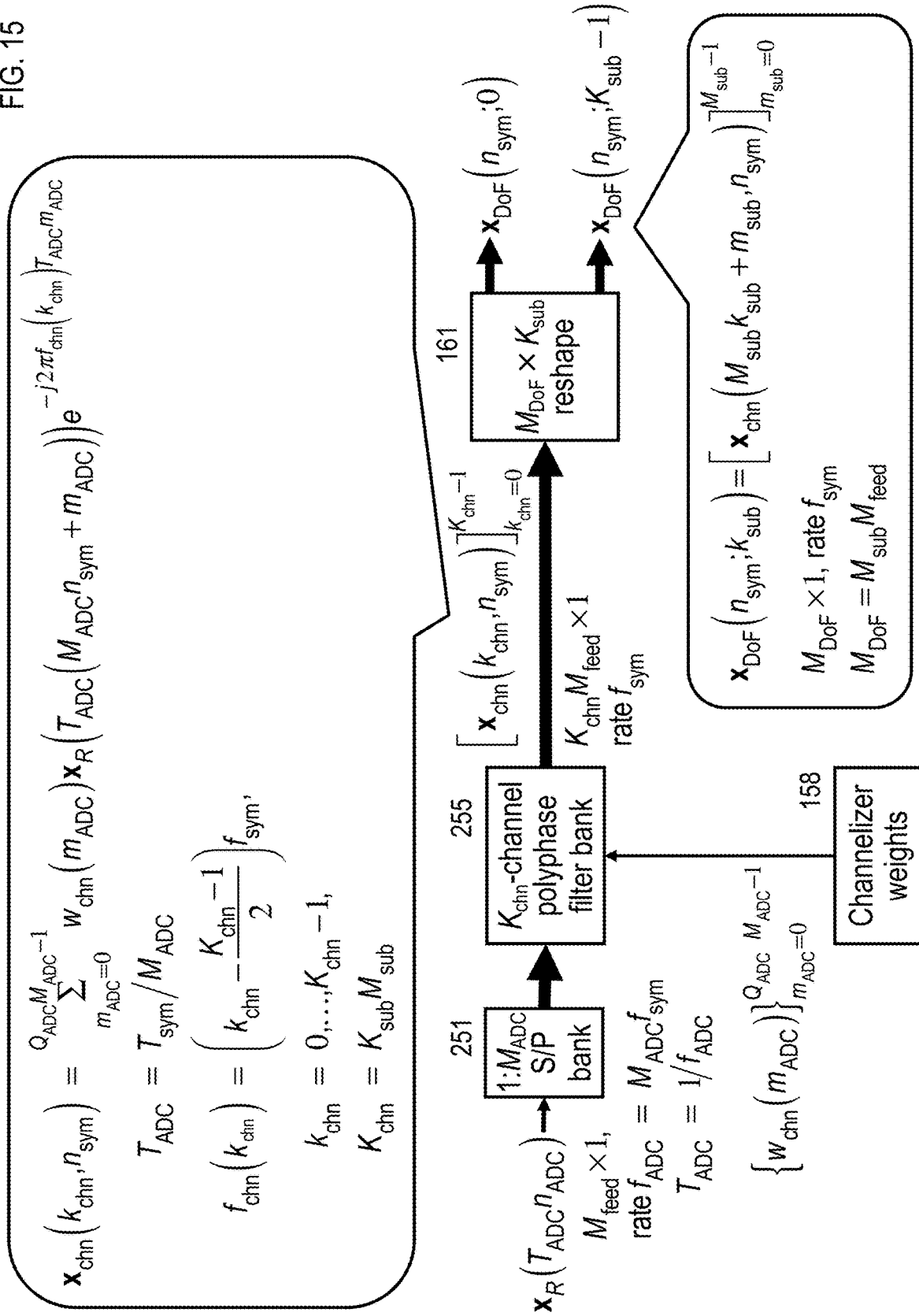
FIG. 15 is a block diagram of a multifeed polyphase filter based symbol-rate synchronous multi-subband channelizer according to an aspect of the disclosure.

FIG. 15 depicts another aspect of the invention, in which the frequency channelization is performed using a bank of polyphase filter based symbol-rate synchronous channelizers. The $M_{feed}\times 1$ vector ADC output signal $x_{ADC}(n_{ADC})=x_R(T_{ADC}n_{ADC})$ is passed through a bank of $M_{feed}$ 1:$M_{ADC}$ serial-to-parallel (S/P) convertors (251) and a bank of $M_{feed}$ polyphase filter based channelizers (255), each using channelizer weights $\{w_{chn}(m_{ADC})\}$ (158), which creates a $K_{chn}M_{feed}\times 1$ data vector $[x_{chn}(k_{chn},n_{sym})]_{k_{chn}=0}^{K_{chn}-1}$ with rate $f_{sym}$, where $x_{chn}(k_{chn},n_{sym})=[x_{chn}(k_{chn},n_{sym};m_{feed})]_{m_{feed}=0}^{M_{feed}}$. As in the single-feed channelizer shown in FIG. 10, the frequency channels are given by Eqn (21).

The $K_{chn}M_{feed}\times 1$ data vector is then put through a $M_{DoF}\times K_{sub}$ reshape operation (161), where $K_{chn}=K_{sub}M_{sub}$, and $M_{DoF}=M_{sub}M_{feed}$, such that $K_{chn}M_{feed}=K_{sub}M_{DoF}$. This creates $K_{sub}$ subband signals $\{x_{DoF}(n_{sym};k_{sub})\}_{k_{sub}=0}^{K_{sub}-1}$, where $M_{DoF}\times 1$ subband $k_{sub}$ signal $x_{DoF}(n_{sym};k_{sub})=[x_{chn}(K_{sub}k_{sub}+m_{sub},n_{sym})]_{m_{sub}=0}^{M_{sub}-1}$.

FIG. 16 and FIG. 17 show exemplary values of $K_{chn}$ and $K_{sub}$, and $M_{sub}$, designed to yield a constant value of $M_{DoF}=60$ as the number of receiver feeds is varied from 1 to 6, for the GPS L1 legacy signal (FIG. 16) and the GPS L5 civil signal (FIG. 17). In all cases, the receiver channelizer spans roughly 96% of the signal mainlobe, or just past the half-power signal bandwidth. As the number of receiver feeds grows, the number of frequency channels per subband is dropped, and the number of subbands is increased correspondingly, so that the degrees of freedom for linear-algebraic processing is the same in each subband, and the multi-subband channelizer continues to occupy the same overall bandwidth.

The order-of-magnitude complexity in Mop/second and convergence time in milliseconds is also shown in FIG. 16 and FIG. 17. As these Figures show, the receiver complexity grows linearly with the number of receiver feeds and bandwidth, and is well within the capabilities of low-cost DSP for the L1 legacy signal, and moderate cost DSP for the GPS L5 signal. In contrast, the needed convergence time can be a low multiple of 60 ms for both signals and all receiver feeds. Moreover, the value of FIG. 16 and FIG. 17 chosen here should be sufficient to detect and demodulate all of the GPS signals within the field of view of any terrestrial receiver, with margin left over for detection and removal of pseudolites and spoofers possibly impinging on the GPS band. Lastly, the multifeed receiver should be able excise as many as $M_{feed}-1$ wideband non-GPS signals, e.g., jammers, or as many as $K_{sub}-1$ narrowband jammers.

The channel model developed for the single-feed receiver also extends in a straightforward fashion to the multifeed receiver. Ignoring channel dynamics, the polyphase-filter based channelizer yields the same channelized receive signal model given in Eqn (25), and the subband model given in Eqn (58), where $$a_{chn}(\ell)\approx[a_{chn}(f_{chn}(k_{chn});\ell)A_{TR}(f_{chn}(k_{chn});\ell)], \quad \text{Eqn (77)}$$

$$a_{DoF}(k_{sub};\ell)\approx[a_{chn}(f_{chn}(K_{sub}+m_{sub});\ell)]_{m_{sub}=0}^{M_{sub}-1}\otimes A_{TR}(f_{sub}(k_{sub})\ell), \quad \text{Eqn (78)}$$

and where $a_{chn}(f_{chn}(k_{chn});\ell)$ is given by Eqn (40)-Eqn (41) and "$\otimes$" denotes the Kronecker product operation. Similarly, the per-channel and per-subband interference ACM is given by $$R_{i_{chn}i_{chn}}(k_{chn})\approx \qquad \text{Eqn (79)}$$

$$\frac{M_{ADC}^2}{M_{chp}}f_{chp}\mathrm{diag}\{|H_R(f_{chn}(k_{chn}))|^2 S_{i_R i_R}(f_{chn}(k_{chn}))\}_{k_{sub}=0}^{K_{sub}-1},$$

$$R_{i_{DoF}i_{DoF}}(k_{sub})\approx \qquad \text{Eqn (80)}$$

$$\frac{M_{ADC}^2}{M_{chp}}f_{chp}|H_R(f_{sub}(k_{sub}))|^2(P_{sub}\otimes S_{i_R i_R}(f_{sub}(k_{sub}))),$$

where $S_{i_R i_R}(f)$ is the $M_{feed}\times M_{feed}$ matrix power spectral density of $i_R(t)$.

Importantly, while the TOA and FOA of a GNSS transmitter can be easily spoofed in a covert or "aligned" spoofing scenario, the DOA (and, to a lesser degree, the polarization) of that transmitter cannot be easily spoofed. In addition, the multi-feed receiver can null any CCI impinging on the array, if the array has sufficient degrees of freedom to separate that CCI from the GNSS signals.

In presence of channel dynamics, the local signal DOA adheres closely to a first-order model over time intervals on the order of 10 seconds in some aspects of the invention, and the individual subbands will experience additional signature blur due to the changing TOA, LOB, and (typically more importantly, due to dependence on changing receiver platform orientation) DOA of the transmitters and receiver. This signature blur is likely to further load the subbands with low-level signature components that will be excised by subsequent linear combining operations. In this regard, the effect of TOA changes is reduced substantively for the multifeed symbol-rate synchronous sub-band channelizer shown in FIG. 15, due to the narrower subband channels obtaining as the number of receiver feeds is increased, as shown in FIG. 16 and FIG. 17.

Resilient PNT Signal Processing Methods

A common set of signal processing methods can be applied to data provided by all of the single-feed and multifeed receiver structures and symbol-rate synchronous channelization and multi-subband formation operations described above. In particular, in-subband linear combining weights approaching the max-SINR solution can be computed using linear-algebraic methods disclosed in the '417 NPA, given any of the following:

Knowledge of the content of $\{d_T(n_{sym};\ell)\}_{\ell=1}^{L_T}$, e.g., from navigation data or symbol sequences provided by third-party sources.

Knowledge of a component of $\{d_T(n_{sym};\ell)\}_{\ell=1}^{L_T}$, e.g., known or periodic pilot signals, as listed in FIG. 4 for the GPS civil L5, QZSS, Galileo E5AB, E6B E6C, and NAVIC RS BOC signals.

Other exploitable structure of $\{d_T(n_{sym};\ell)\}_{\ell=1}^{L_T}$, e.g., real or BPSK structure, as listed in FIG. 4 for the GLONASS and GPS L1 legacy signals; QPSK structure, as listed in FIG. 4 for the Beidou 1B and NAVIC SPS-L5 and SPS-S signals; and constant modulus structure, as listed in FIG. 4 for all of the GNSS signals.

These methods also can be used to estimate the max-SINR obtaining in each subband, thereby providing cross-subband weights for the second combining stage shown in Eqn (64).

The multi-subband solution can further be used to estimate the full max-SINR of the received symbol sequences, detect the navigation signals in the environment, determine at least the geo-observables $\{n_{TR}(\ell), \tilde{\alpha}_{TR}(\ell)\}_{\ell=1}^{L_T}$ for those signals, and if needed estimate information-bearing components of the transmitted symbol streams $\{d_T(n_{sym}; \ell)\}_{\ell=1}^{L_T}$. Moreover, these techniques can perform these operations without prior knowledge of the signal ranging code or receive frequency signature for the signals, or a search over TOA and FOA is the ranging code is known.

In addition, the '417 NPA discloses means for estimating the fine TOA, FOA Nyquist zone, and DFOA using additional copy-aided parameter estimation algorithms. Lastly, the data model derived above can be used to develop matched-filtering methods, using estimates of $a_{chn}(\ell)$ given in Eqn (40)-Eqn (41) for single-receiver systems, or defined in Eqn (77) for multi-receiver systems.

The signal processing structures can be adapted on either a continuous basis, in which geo-observables are updated rapidly over time, or on a batch processing basis, in which a block of $N_{sym}$ channelized data symbols $\{x_{DoF}(n_{sym}; k_{sub})\}_{n_{sym}=0}^{N_{sub}-1}$ are computed for each subband and passed to a DSP processing element that detects the GNSS signals within that data block. The latter approach is especially useful if the invention is being used to develop resilient PNT analytics to aid a primary navigation system, e.g., to assess quality and availability of new GNSS transmissions, or to detect or confirm spoofing transmissions on a periodic basis. The batch adaptive processing algorithms are described in more detail below.

Batch Adaptive Processing Procedure

In the batch adaptive processing procedure is implemented by first collecting data over $N_{sym}$ data symbols, and detecting, extracting, or estimating geo-observables of the MOS-DSSS symbol or navigation sequences directly from that data set. In some aspects, the procedure performs this processing from a "cold start," i.e., with no prior information about the signals contained within that data set. However, if the prior FOA's of the signals (and in particular FOA's derived from the FOA vectors for those signals) are known, then the procedure can be started at an intermediate point in the processing.

This procedure enables a great deal of refinement and accurate discrimination to more closely constrain and limit the processing necessary to accurately interpret the signal's content, before the copy-aided analysis phase begins. In some use scenarios, the blind despreading stage can in fact obviate the copy-aided analysis phase, e.g., if the invention is developing resilient PNT analytics to aid a primary navigation system, or it can be used to substantively thin the number of transmissions that must be analyzed. This procedure can thereby reduce the processing complexity and considerable feedback lag, enabling quicker, more effective signal discrimination without requiring the full processing and analysis of the signal be completed first (or even together).

Figure 18:
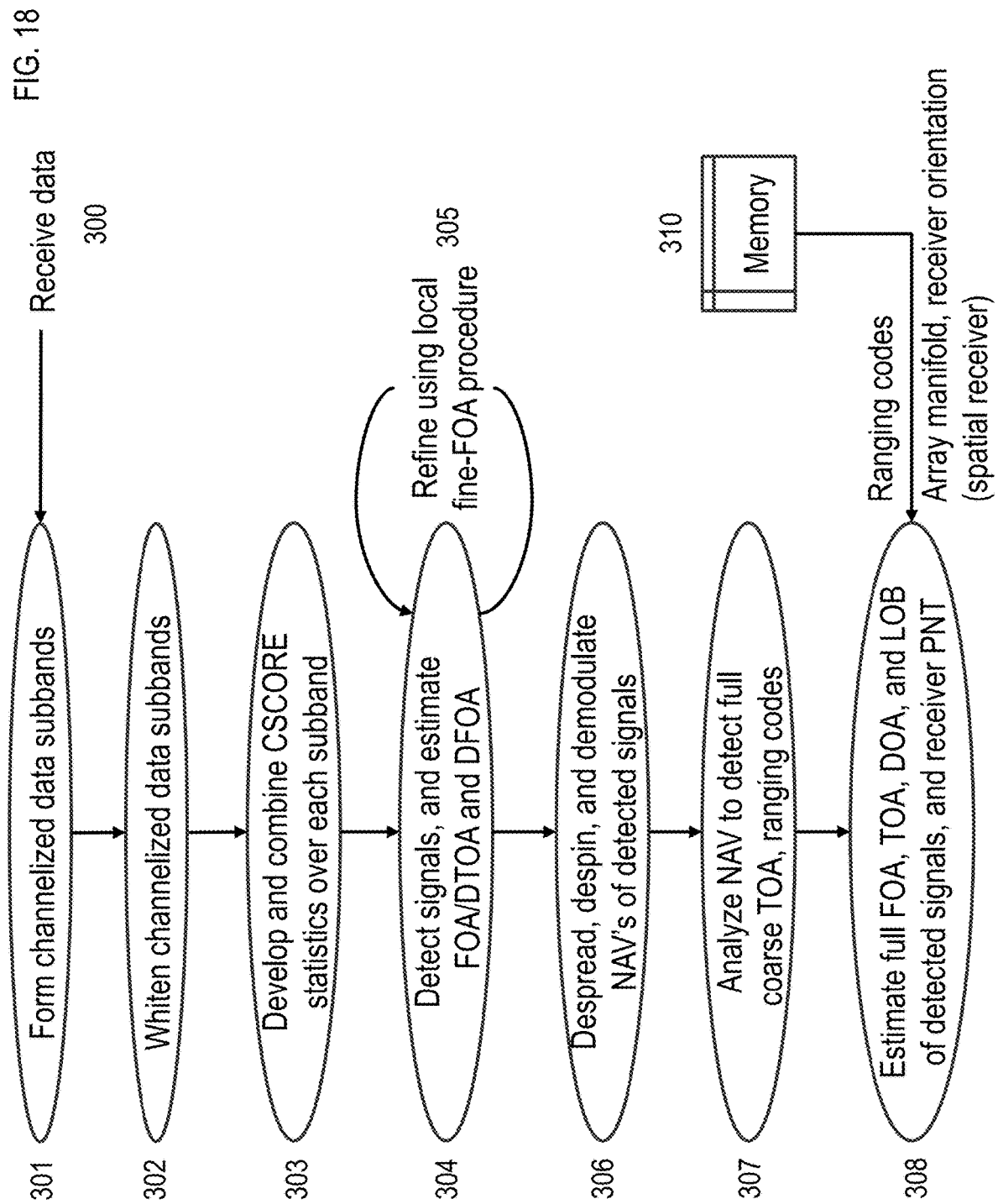
FIG. 18 is a flow diagram of a multi-subband signal detection, geo-observable/quality estimation, and symbol estimation algorithm that can be employed in aspects disclosed herein.

FIG. 18 is a flow diagram of a fully-blind multi-subband signal detection, geo-observable/quality estimation, and symbol estimation batch procedure that can be employed for MOS-DSSS signals with BPSK (or, more generally, real) symbol sequences, e.g., the GLONASS and GPS L1 legacy signal, or LocataLite beacons. Upon receipt of $N_{sym}$ symbols of data (300), e.g., $N_{sym}$ milliseconds of receive data for the GNSS signals depicted in FIG. 4, the procedure first channelizes the data and forms it into $K_{sub}$ subbands using a symbol-rate synchronous channelizer (301). In some aspects, the data subbands are formed into $K_{sub}$ data matrices with dimension $N_{sym} \times M_{DoF}$, e.g., given by $$x_{DoF}(k_{sub}) \triangleq \begin{pmatrix} \sqrt{\omega_{DoF}(0)} \times_{DoF}^H (0; k_{sub}) \\ \vdots \\ \sqrt{\omega_{DoF}(N_{sym}-1)} \times_{DoF}^H (N_{sym}-1; k_{sub}) \end{pmatrix}, \quad \text{Eqn (81)}$$

where $\{\omega_{DoF}(n_{sym})\}_{n_{sym}=0}^{N_{sym}-1}$ is a real data window satisfying $$\sum_{n_{sym}=0}^{N_{sym}-1} \omega_{DoF}(n_{sym}) = 1.$$

The channelized subband data matrices $\{X_{DoF}(k_{sub})\}_{k_{sub}=0}^{K_{sub}-1}$ are then whitened (302), e.g., by performing the QR decomposition (QRD) of each subband matrix, to form whitened subband matrices $\{Q_{DoF}(k_{sub})\}_{k_{sub}=0}^{K_{sub}-1}$. The QRD, denoted $\{Q,R\}=QRD(X)$ for general $N \times M$ matrix $X$, solves $$R = chol\{X^H X\}, \quad \text{Eqn (82)}$$

$$Q = XR^{-1} = \begin{pmatrix} q^H(0) \\ \vdots \\ q^H(N-1) \end{pmatrix}, \quad \text{Eqn (83)}$$

where chol(◦) is the Cholesky factorization operation, such that $X=QR$ and $Q^H Q = I_M$, where $I_M$ M×M identity matrix. The data window is nominally rectangular; however, other windows are recommended if the FOA offset between the navigation signals is small, e.g., for fixed ground beacons or aligned spoofers, or for reception intervals that are long enough to induce substantive differential FOA effects.

For navigation signals in which only a single rail is modulated, e.g., GLONASS or GPS L1 legacy signals, the subbands can be processed using the conjugate self-coherence restoral (CSCORE) method disclosed in the '417 NPA. For the multi-subband method, CSCORE statistics are developed within each subband, and combined to form a cross-subband statistic (303) that simultaneously detects the signals, and provides an estimate the fine FOA and quality of each signal. In one aspect, the CSCORE algorithm is implemented in each subband for a trial FOA vector $\alpha = \alpha \; \alpha^{(1)}]^T$, by first computing $$Q_{DoF}(\alpha; k_{sub}) = \Delta(\alpha) Q_{DoF}(k_{sub}), \; \Delta(\alpha) \triangleq \text{diag}\{\exp(j2\pi g_{FOA}(n_{sym})\alpha)\}_{n_{sym}=0}^{N_{sym}-1},$$

where $$g_{FOA}(n_{sym}) = \begin{bmatrix} n_{sym} & \frac{1}{2} n_{sym}^2 \end{bmatrix};$$

forming whitened CSCORE matrix $\hat{R}_{q_{DoF}q^*_{DoF}}(\alpha;k_{sub})$ given by $$\hat{R}_{q_{DoF}q^*_{DoF}}(\alpha;k_{sub}) = \sum_{n_{sym}=0}^{N_{sym}-1} q_{DoF}(n_{sym};k_{sym})q_{DoF}^T(n_{sym};k_{sym})\exp(-j4\pi g_{FOA}^T(n_{sym})\alpha)$$

Eqn (84)

$$= \sum_{n_{sym}=0}^{N_{sym}-1} q_{DoF}(n_{sym};\alpha;k_{sub})q_{DoF}^T(n_{sym};\alpha;k_{sub}),$$

$$= Q_{DoF}^H(\alpha;k_{sub})Q_{DoF}^*(\alpha;k_{sub})$$

for each subband; and determining the dominant mode $\{\lambda_{CSC}(\alpha;k_{sub}),v_{CSC}(\alpha;k_{sub})\}$ of the singular value decomposition (SVD) of $\hat{R}_{q_{DoF}q^*_{DoF}}(\alpha;k_{sub})$, e.g., using a power method. The detection statistics $\{\lambda_{CSC}(\alpha;k_{sub})\}_{k_{sub}=0}^{K_{sub}-1}$ are then combined across the subbands to form a full-band CSCORE statistic. In one aspect on the invention, this is accomplished by first computing max-SINR estimate $\gamma_{CSC}(\alpha;k_{sub})=(1+\lambda_{CSC}(\alpha;k_{sub}))/(1-\lambda_{CSC}(\alpha;k_{sub}))$ for each subband, and summing those estimates together for each FOA vector $\alpha$. In other aspects, nonlinear combining operations, e.g., dictated by maximum-likelihood (ML) estimation arguments are performed. In other aspects, the combining is performed over values of that are adjusted to account for DTOA between subbands.

This procedure generates a CSCORE spectrum that is parameterized with respect to both FOA (or DTOA) and DFOA. This spectrum is then used to detect the MOS-DSSS signals in the environment, and estimate their FOA (or DTOA) and DFOA geo-observables (304). Additional joint processing is then performed to further improve quality of the geo-observables and the detection statistic (305), resulting in optimized DTOA and DFOA estimates $\{\hat{\tau}_{CSC}^{(1)}(\ell),\hat{\alpha}_{CSC}^{(1)}(\ell)\}_{\ell=1}^{\hat{L}_T}$ for the $\hat{L}_T$ detected signals, and resulting optimized DTOA and DFOA estimates $\{v_{CSC}(\alpha(k_{sub};\ell));k_{sub}\}_{\ell=1}^{\hat{L}_T}$ for each subband, where $\alpha(k_{sub};\ell)= [-\hat{\tau}_{CSC}^{(1)}(\ell)(f_T+f_{sub}(k_{sub}))\,\hat{\alpha}_{CSC}^{(1)}(\ell)]^T$.

The optimized despreading weights and estimated FOA vector are then used to despread and despin the symbol sequence for each detected signal, and to demodulate the underlying signal navigation sequence based on further structure of that sequence, e.g., 20:1 NAV bit replication for the GPS L1 legacy signal (306). As part of this process, the coarse TOA timing is computed to within a NAV bit edge.

Given reception of sufficient data, the NAV signal is analyzed to resolve the ±1 ambiguity in the spread signal; detect NAV block boundaries to determine the full coarse TOA; and if needed extract the satellite ephemeres from the NAV signal sequences (307). In some aspects, this is accomplished by processing of data over multiple reception blocks. In other aspects, this is accomplished by shifting to a continuous update (non-batch) processing mode.

In some aspects, the ranging code and (for multifeed receivers) array manifold are downloaded from memory (310), and used to determine the full TOA, FOA, DOA, and (using estimated and/or on-board orientation data) LOB of the detected signals, and determine a positioning, navigation, and timing (PNT) solution for the receiver (308). In other aspects, the fine FOA (or TDOA) and DFOA, and transmitter ephemeres are sufficient to determine a positioning, navigation and frequency synchronization solution for the receiver.

Figure 19:
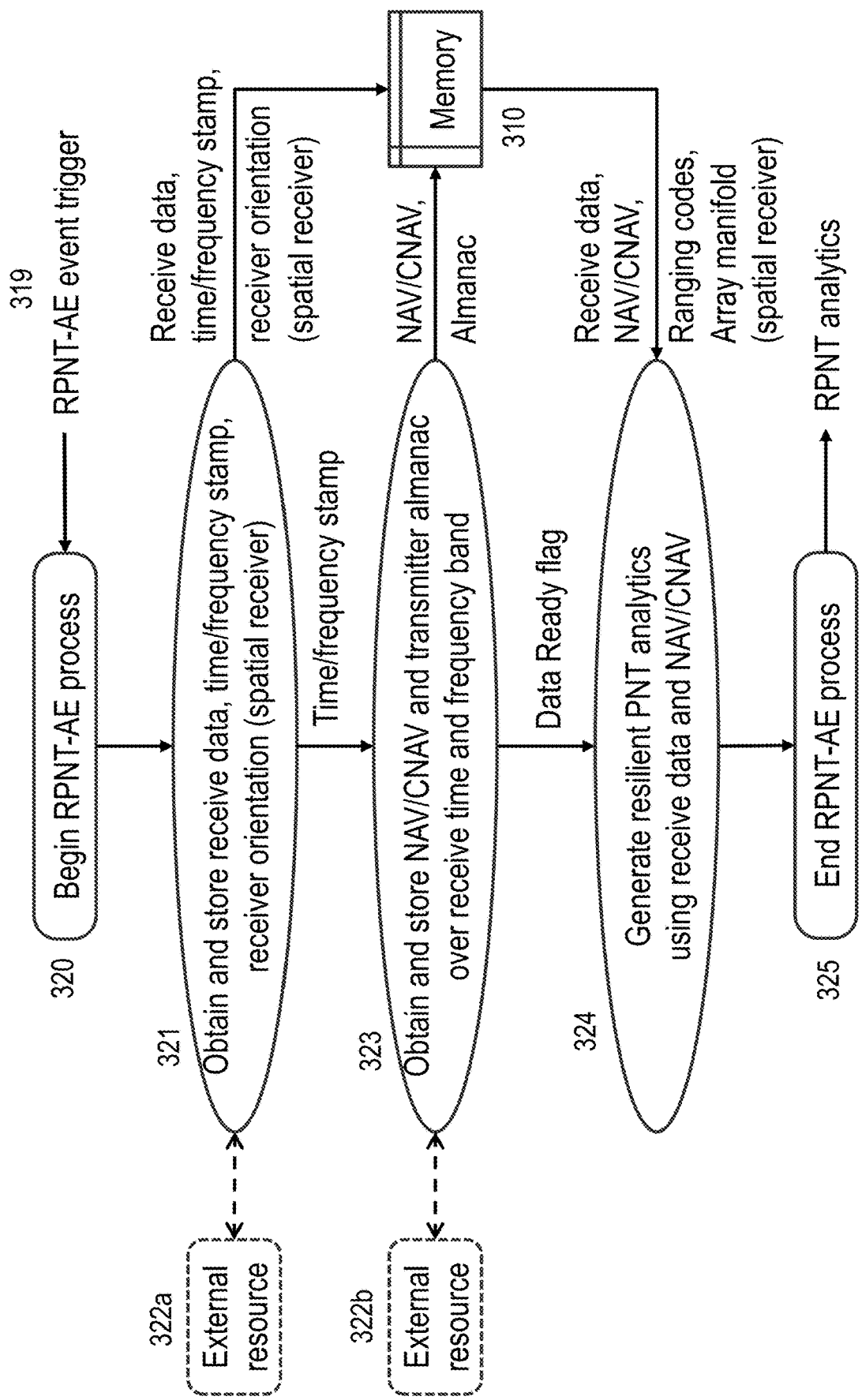
FIG. 19 is a flow diagram of a multi-subband signal detection and geo-observable/quality estimation, algorithm that can be employed in aspects disclosed herein.

FIG. 19 is a flow diagram of a multi-subband signal detection and geo-observable/quality estimation, algorithm that can be employed in a resilient PNT data analytics engine (RPNT-AE) aspect of the invention. Upon receipt of an RPNT-AE trigger (319), e.g., initiated by a primary GNSS processor, or by other processes on board and/or connected to the receiver, the RPNT-AE process is begun (320). The RPNT-AE processor then tasks a receiver to obtain and store a snapshot of $N_{sym}$ data symbols, and obtains a time/frequency stamp recording rough (to within receiver clock accuracy) center frequency and start time of the snapshot, and other information available to the receiver, e.g., receiver orientation (321). The RPNT-AE processor then places the time/frequency stamped data into memory (310), and sends the stamp to an external resource (322a) along with a request for third-party data. The RPNT-AE processor then waits until an external resource (322b) provides the processor with a snapshot of navigation (NAV/CNAV) data covering the time period and frequency band recorded in the time/frequency stamp, and (if needed) a transmitter almanac containing the ephemeres of the transmitters over the time period covering the NAV/CNAV data. Once RPNT-AE processor obtains that data (323), it places that data in memory (310) and sends a "Data Ready" flag is sent to the DSP processor tasked with estimating RPNT analytics for the processor.

Once the Data Ready flag is obtained from the RPNT-AE processor, the DSP resources obtain the time/frequency stamped received data snapshot and the NAV/CNAV data from memory (310), and generate RPNT analytics using partially blind methods disclosed in the '417 NPA, e.g., an "FFT-least-squares" algorithm or a single-target or multi-target maximum-likelihood estimator, the DSP processor. Analytics measure here can include the following:

estimates of observed received parameters of navigation signals, including signal geo-observables usable to obtain PNT solutions for the reception platform, e.g., observed signal frequency-of-arrival (FOA), time-of-arrival (TOA), and observed local direction-of-arrival (DOA) or global line-of-bearing (LOB) in systems employing multifeed receivers;

estimates of received signal quality, e.g., received incident power, and of despread/demodulated navigation sequence quality, e.g., despreader output signal-to-interference-and-noise ratio (SINR); and measures of accuracy of parameter and signal quality estimates.

RPNT analytic measurement methods include "partially-blind" methods that do not require knowledge of the ranging code for the navigation signals, or spatial/polarization array-manifold data (measurement of cross-feed spatial/polarization signatures as a function of DOA) for the receiver, and "copy-aided" methods that may require one or both of the ranging codes or the array manifold to provide more complete RPNT analytics. In the aspects disclosed herein, RPNT analytics are further computed over multiple subbands.

Once the RPNT analytics have been obtained, the RPNT-AE process is ended (325), and the RPNT analytics are reported to the resources requesting the analytics.

Figure 20:
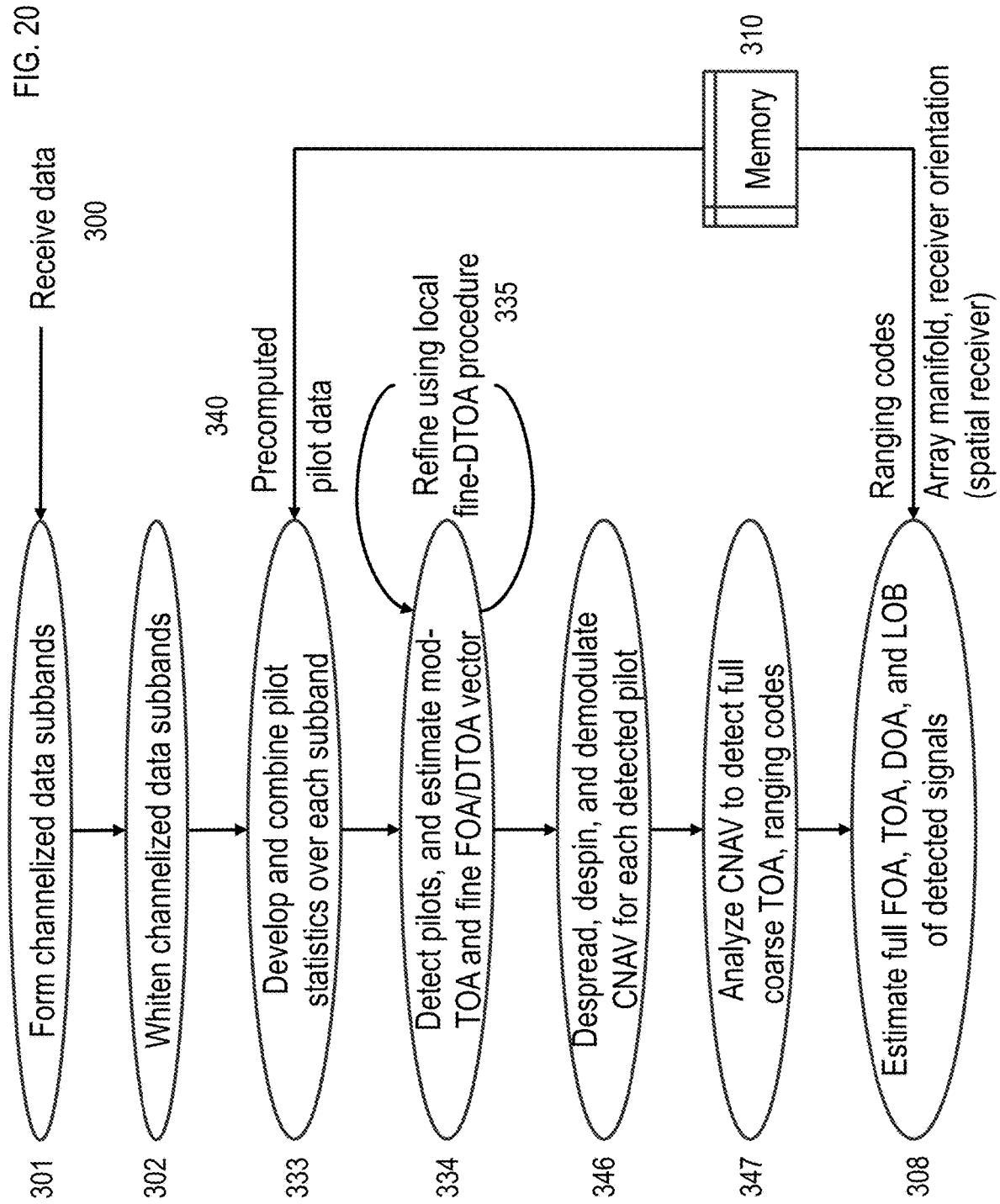
FIG. 20 is a flow diagram of a multi-subband signal detection and geo-observable/quality estimation, algorithm that can be employed in aspects disclosed herein.

FIG. 20 is a block diagram of a multi-subband pilot-exploiting RPNT (PE-RPNT) processor that can detect and estimate geo-observables and quality of MOS-DSSS signals in which known or repeating pilots transmitted as part of the MOS-DSSS system sequence. The method reported herein can also be used to implement the operations performed by the RPNT-AE DSP processor (324), using the full MOS-DSSS symbol sequence provided in that system.

Upon receipt of $N_{sym}$ symbols of data (300), e.g., $N_{sym}$ milliseconds of receive data for the GNSS signals depicted in FIG. 4, the procedure first channelizes the data and forms it into $K_{sub}$ subbands using a symbol-rate synchronous channelizer (301). In some aspects, the data subbands are formed into $K_{sub}$ data matrices with dimension $N_{sym} \times M_{DoF}$, e.g., given by Eqn (81). The channelized subband data matrices $\{x_{DoF}(k_{sub})\}_{k_{sub}=0}^{K_{sub}-1}$ are then whitened (302), e.g., by performing the QR decomposition (QRD) of each subband matrix, to form whitened subband matrices $\{Q_{DoF}(k_{sub})\}_{k_{sub}=0}^{K_{sub}-1}$.

The processor then retrieves a single period of repeating pilot data $\{p(n_{sym})\}_{n_{sym}=0}^{N_{pilot}-1}$ from memory (310), where $N_{pilot}$ is the period of the pilot sequence; computes pilot statistics over a set of trial FOA vectors $\alpha = [\alpha \; \alpha^{(1)}]^T$ trial pilot delay $m_{pilot} \in \{0, ,N_{pilot}-1\}$ in each subband, given by least-squares (LS) whitened linear combiner weights $$u_{LS}(\alpha, m_{pilot}; k_{sub}) = \sum_{n_{sym}=0}^{N_{sym}} q_{DoF}(n_{sym}; k_{sub}) d_{LS}^*(n_{sym}; \alpha, m_{pilot}) = \quad \text{Eqn (85)}$$

$$Q_{DoF}^H(k_{sub}) d_{LS}(\alpha, m_{pilot}),$$

$$d_{LS}(n_{sym}; \alpha, m_{sym}) = \quad \text{Eqn (86)}$$

$$\sqrt{\omega_{DoF}(n_{sym})} \rho((n_{sym} - m_{pilot}) \bmod N_{pilot}) e^{j2\pi g_{FOA}(n_{sym})\alpha}$$

$$d_{LS}(\alpha, m_{sym}) = \begin{pmatrix} d_{LS}^*(0; \alpha, m_{sym}) \\ \vdots \\ d_{LS}^*(N_{sym}-1; \alpha, m_{sym}) \end{pmatrix},$$

where $$g_{FOA}(n_{sym}) = \left[n_{sym} \; \frac{1}{2} n_{sym}^2\right],$$

and in-band LS SINR estimate, $$\gamma_{LS}(\alpha, m_{pilot}; k_{sub}) = \frac{\|u_{LS}(\alpha, m_{pilot}; k_{sub})\|_2^2}{1 - \|u_{LS}(\alpha, m_{pilot}; k_{sub})\|_2^2}; \quad \text{Eqn (87)}$$

and combines the in-subband least-square SINR estimates to created a multi-subband quality statistic as a function of FOA vector and pilot delay (333). In one aspect, the in-subband LS SINR estimates are combined in accordance with a maximum-likelihood estimator, yielding multi-subband quality statistic $$S_{ML}(\alpha, m_{pilot}) = \sum_{k_{sub}=0}^{K_{sub}-1} \log(1 + \gamma_{LS}(\alpha, m_{pilot}; k_{sub})), \quad \text{Eqn (88)}$$

which is maximized at modulo-$N_{pilot}$ coarse TOA's and fine FOA vectors possessed by the MOS-DSSS signals in the receiver's field of view. In another aspect, the in-subband LS SINR estimates are combined in accordance with Eqn (65), yielding multi-subband ML quality statistic $$S_{LS}(\alpha, m_{pilot}) = \sum_{k_{sub}=0}^{K_{sub}-1} \gamma_{LS}(\alpha, m_{pilot}; k_{sub}), \quad \text{Eqn (89)}$$

which is also maximized at modulo-$N_{pilot}$ coarse TOA's and fine FOA vectors possessed by the MOS-DSSS signals in the receiver's field of view. In other aspects, the effect of DTOA across frequency subbands is taken into account, e.g., resulting in DTOA-corrected multi-subband LS quality statistic $$S_{LS}(\tau^{(1,2)}, m_{pilot}) = \sum_{k_{sub}=0}^{K_{sub}-1} \gamma_{LS}(\alpha(k_{sub}), m_{pilot}; k_{sub}), \quad \text{Eqn (90)}$$

$$\tau^{(1,2)} = \begin{pmatrix} \tau^{(1)} \\ \tilde{\tau}^{(2)} \end{pmatrix}, \quad \text{Eqn (91)}$$

$$\alpha(k_{sub}) = -(f_T + f_{sub}(k_{sub})) T_{sym} \tau^{(1,2)}, \quad \text{Eqn (92)}$$

where $\tilde{\tau}^{(2)} = \tau^{(2)} T_{sym}$ is the symbol-normalized differential DTOA. In addition, for rectangular time windows, the in-band LS SINR estimate can be converted to unbiased max-SINR estimate $$\hat{\gamma}_{max-SINR}(\alpha, m_{pilot}; k_{sub}) = \quad \text{Eqn (93)}$$

$$\left(1 - \frac{M_{DoF} + 1}{N_{sym}}\right) \gamma_{LS}(\alpha, m_{pilot}; k_{sub}) - M_{DoF},$$

which can greatly improve visible quality of $S_{LS}(\alpha, m_{pilot})$ (or $S_{LS}(\tau^{(1,2)}; m_{pilot})$) without affecting performance of the statistic.

A number of means can be used to minimize efficiency of the in-subband LS SINR's and multi-subband quality statistics. In particular, FFT-based methods can be used to efficiently compute $\gamma_{LS}(\alpha, m_{pilot}; k_{sub})$ or $\gamma_{LS}(\alpha(k_{sub}), m_{pilot}; k_{sub})$ with fine accuracy. At this stage of processing, the whitened LS weights given in Eqn (85) need not be computed, further reducing complexity and memory requirements of the overall processor.

The multi-subband quality statistic is then analyzed to detect the pilot-bearing MOS-DSSS signals in the environment, determine their coarse TOA to modulo-$N_{pilot}$ accuracy, and determine their fine FOA or DTOA vector (334), resulting in $\hat{L}_T$ peak detections and FOA-TOA locations $\{\alpha(\ell), m_{pilot}(\ell)\}_{\ell=1}^{\hat{L}_T}$ or DTOA-TOA locations $\{\tau^{(1,2)}(\ell), m_{pilot}(\ell)\}_{\ell=1}^{\hat{L}_T}$ of those peaks. Iterative refinement of the DTOA-TOA locations $\mathcal{L}=1$ $\{\tau^{(1,2)}(\ell), m_{pilot}(\ell)\}_{\ell=1}^{\hat{L}_T}$ (where the FOA vector is converted to a DTOA vector) is then performed (335), e.g., using Newton search methods disclosed in the '417 NPA, to determine the fine DTOA vector (from which FOA can be derived) and optimize the multi-subband quality statistic.

Using the optimized DTOA vectors and modulo-$N_{pilot}$ coarse TOA's $\{\tau^{(1,2)}(\ell),m_{pilot}(\ell)\}\ell_{=1}^{\hat{L}_T}$, LS combiner weights $\{\gamma_{LS}(k_{sub};\ell),u_{LS}(K_{sub};\ell)\}$ are then computed using formula $$u_{LS}(k_{sub};\ell) = \sum_{n_{sym}=0}^{N_{sym}} q_{DoF}(n_{sym};k_{sub})d_{LS}^*(n_{sym};\alpha(k_{sub};\ell),m_{pilot}(\ell)), \quad \text{Eqn (94)}$$

$$\alpha(k_{sub};\ell) = -(f_T + f_{sub}(k_{sub}))T_{sym}\tau^{(1,2)}(\ell), \quad \text{Eqn (95)}$$

$$\gamma_{LS}(k_{sub};\ell) = \frac{\|u_{LS}(k_{sub};\ell)\|_2^2}{1 - \|u_{LS}(k_{sub};\ell)\|_2^2}, \quad \text{Eqn (96)}$$

and cross-subband combiner gains are computed based on Eqn (64), i.e., by setting $g_{LS}(k_{sub};\ell)=1+\gamma_{LS}(k_{sub};\ell)$. The full multi-subband despread, despun and partially time-synchronized symbol sequence is then estimated for each peak using formula $$\hat{d}_T(n_{sym};\ell) = \sum_{k_{sub}=0}^{K_{sub}-1} g_{LS}^*(k_{sub};\ell)\hat{d}_T(n_{sym};k_{sub};\ell), \quad \text{Eqn (97)}$$

$$\hat{d}_T(n_{sym};k_{sub};\ell) = \quad \text{Eqn (98)}$$

$$\left(u_{LS}^H(k_{sub})q_{DoF}(n_{sym}+m_{pilot}(\ell);\ell)\right)e^{-j2\pi g_{FOA}(n_{sym})\alpha(k_{sub};\ell)}.$$

The navigation-bearing component of the symbol sequence (CNAV for the GPS L5 signal) is then demodulated using information about the structure of the navigation data (346).

Given reception of sufficient data, the CNAV signal is analyzed to determine the full coarse TOA, and if needed extract the satellite ephemeres from the NAV signal sequences (347). In some aspects, this is accomplished by processing of data over multiple reception blocks. In other aspects, this is accomplished by shifting to a continuous update (non-batch) processing mode.

In some aspects, the ranging code and (for multifeed receivers) array manifold are downloaded from memory (310), and used to determine the full TOA, FOA, DOA, and (using estimated and/or on-board orientation data) LOB of the detected signals, and determine a positioning, navigation, and timing (PNT) solution for the receiver (308). In other aspects, the fine FOA (or TDOA) and DFOA, and transmitter ephemeres are sufficient to determine a positioning, navigation and frequency synchronization solution for the receiver.

Figure 21:
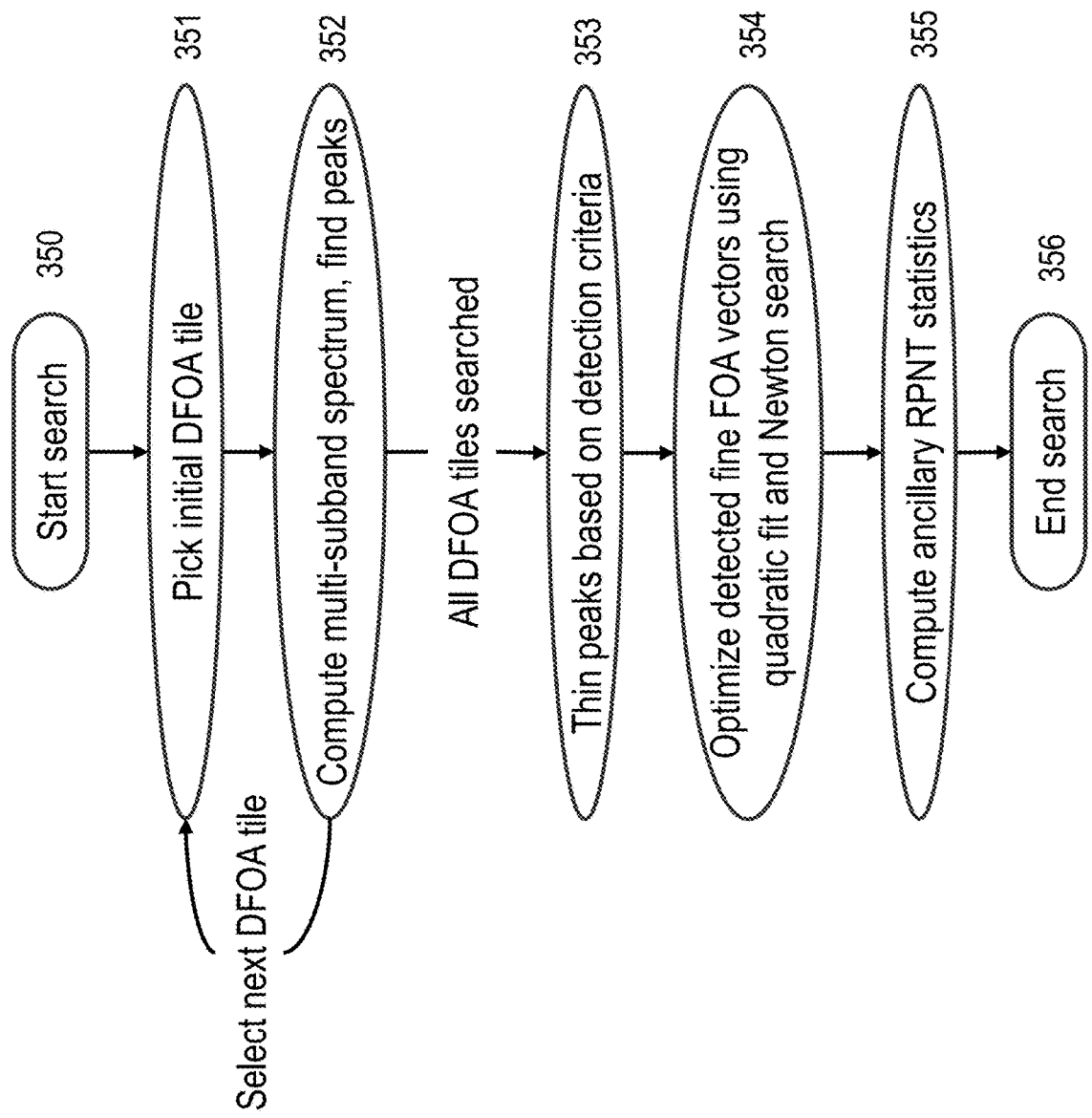
FIG. 21 is a flow diagram of a local-maxima search procedure according to an aspect of the disclosure.

FIG. 21 is a flow diagram of a local-maxima search procedure according to an aspect of the disclosure, which is applicable to searches over FOA and DFOA, over reception intervals in which DFOA can have a substantive effect on detection sensitivity. The approach assumes the use of an FFT-based coarse search procedure, in which $\alpha$ is defined over search grid $$\bar{\alpha}(k_{bin}) = k_{bin}/K_{bin}, \quad k_{bin}=0,\ldots,K_{bin}-1, \quad \text{Eqn (99)}$$

$$\bar{\alpha}_{TR}^{(1)}(k_{tile}) = \bar{\alpha}_{TR}^{(1)}|_{max}\left(\frac{2k_{tile}+1}{K_{tile}}-1\right), \quad k_{tile}=0,\ldots,K_{tile}-1, \quad \text{Eqn (100)}$$

where $K_{bin}$ is the number of FOA bins searched over, and $K_{tile}$ is the number of DFOA tiles searched over. Then the multi-subband quality estimate can be given by 3-dimensional surface $$S_{LS}(k_{bin},k_{tile},m_{pilot}) = \sum_{k_{sub}=0}^{K_{sub}-1}\gamma_{LS}(k_{bin},k_{tile},m_{pilot};k_{sub}), \quad \text{Eqn (101)}$$

$$\gamma_{LS}(k_{bin},k_{tile},m_{pilot};k_{sub}) = \frac{\|u_{LS}(k_{bin},k_{tile},m_{pilot};k_{sub})\|_2^2}{1-\|u_{LS}(k_{bin},k_{tile},m_{pilot};k_{sub})\|_2^2}, \quad \text{Eqn (102)}$$

$$u_{LS}(k_{bin},k_{tile},m_{pilot};k_{sub}) = \quad \text{Eqn (103)}$$

$$\sum_{n_{sym}=0}^{N_{sym}-1} q_{DoF}(n_{sym};k_{sub})d_{LS}^*(n_{sym};k_{tile},m_{pilot})e^{-j2\pi k_{bin}n_{sym}/K_{bin}} =$$

$$DFT\{q_{DoF}(n_{sym};k_{sub})d_{LS}^*(n_{sym};k_{tile},m_{pilot})\},$$

$$d_{LS}(n_{sym};k_{tile},m_{pilot}) = e^{j\pi\bar{\alpha}^{(1)}(k_{tile})n_{sym}^2}p((n_{sym}-m_{pilot})\mathrm{mod}N_{pilot}), \quad \text{Eqn (104)}$$

which can be implemented using $K_{tile}N_{pilot}$ DFT operations.

Returning to FIG. 21, once the search is started (350), the number of DFOA search tiles $K_{tile}$ first is determined based on the expected range in DFOA and the reception time. Then an initial DFOA search tile is chosen (351), and a DFT-based search is conducted over that tile using Eqn (101)-Eqn (104), to compute a multi-subband search spectrum for that tile, and determine peaks in that tile (352).

Once all of the DFOA tiles have been searched, and peaks have been determined, the detected peaks are thinned to a significant number of peaks based on peak value (353). Then the peak values are iterivaley optimized using local optimization methods, e.g., quadratic fit to the peak maximum, followed by Newton or Gauss-Newton search methods (354). In this case, $m_{pilot}$ is defined over an integer set of values, hence it is not iteratively optimized using this procedure.

In one aspect of the invention, the local optimization is performed to optimize $$S_{LS}(\ell) = \sum_{k_{sub}=0}^{K_{sub}-1}\gamma_{LS}(k_{sub};\ell), \quad \text{Eqn (105)}$$

where $\gamma_{LS}(k_{sub};\ell)$ is given by Eqn (94)-Eqn (96), and where $\{\tau^{(1,2)}(\ell),m_{pilot}(\ell)\}\ell_{=1}^{\hat{L}_T}$ is the parameter set being optimized. In this case, $\tau^{(1,2)}(\ell)$ is initialized using the optimal value of $\alpha(\ell)$ determined during the FFT-based search procedure.

Once optimal values have been determined, ancillary RPNT statistics are computed at those optimal search locations (355). The search is then ended (356).

Figure 22A:
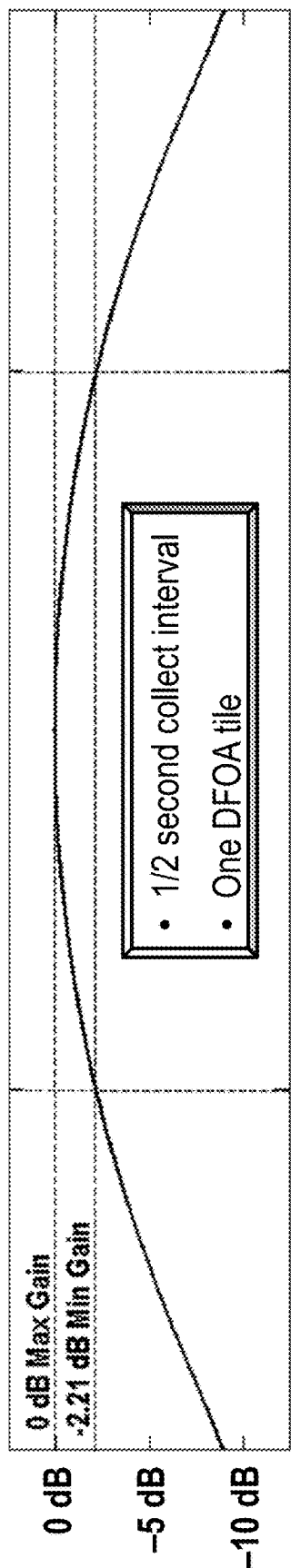
FIGS. 22A, 22B, and 22C and FIGS. 23A, 23B, and 23C are plots that depict DFOA search sensitivity.
Figure 22B:
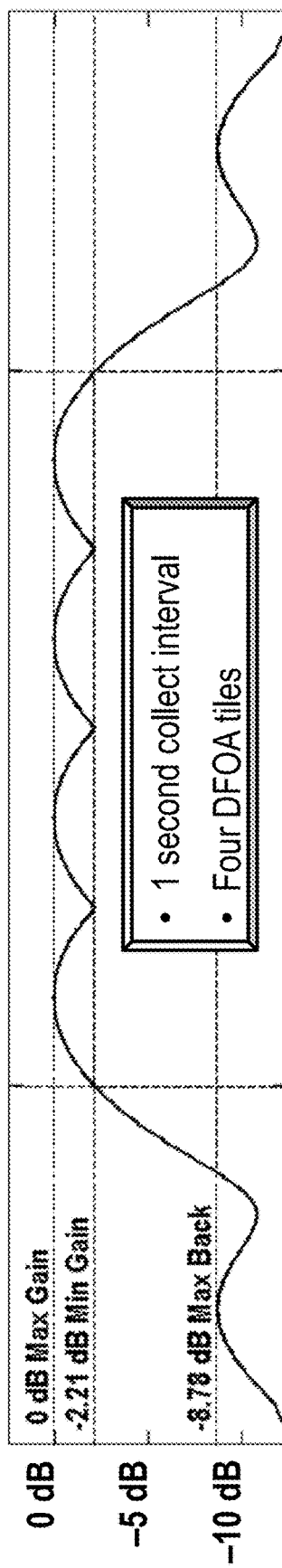
Figure 22C:
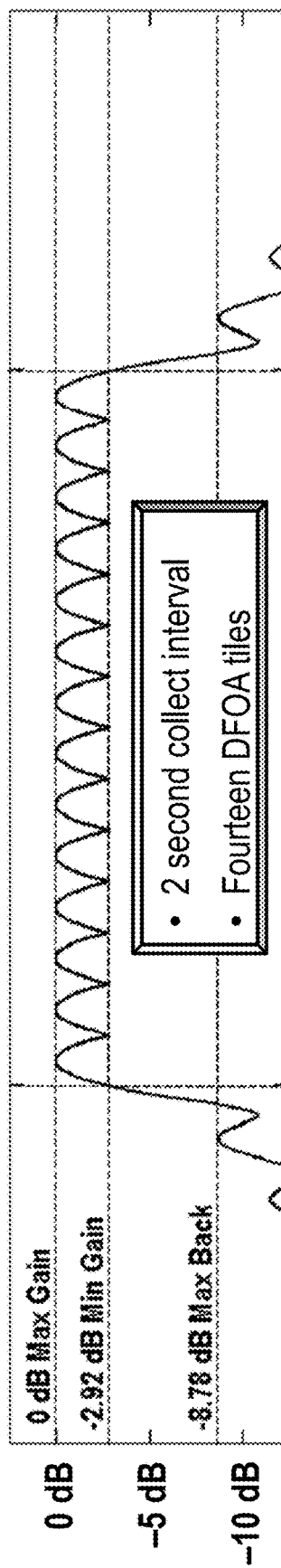
Figure 23A:
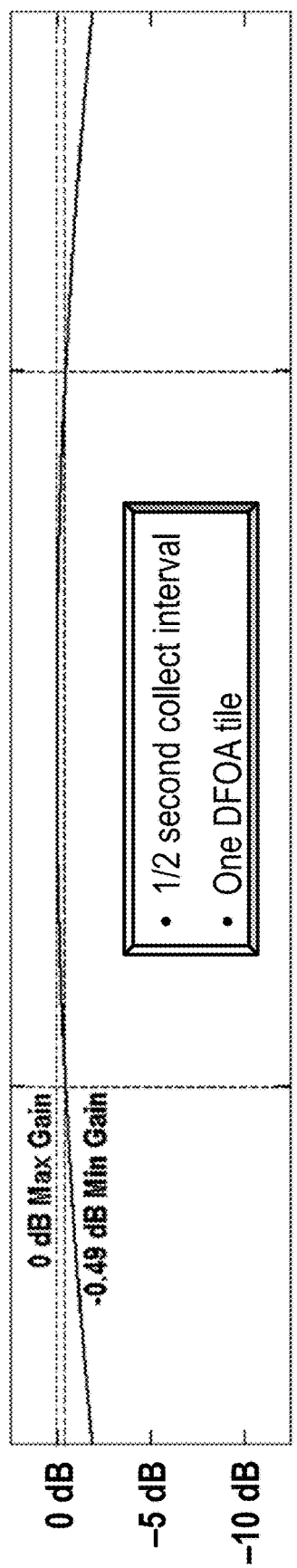
Figure 23B:
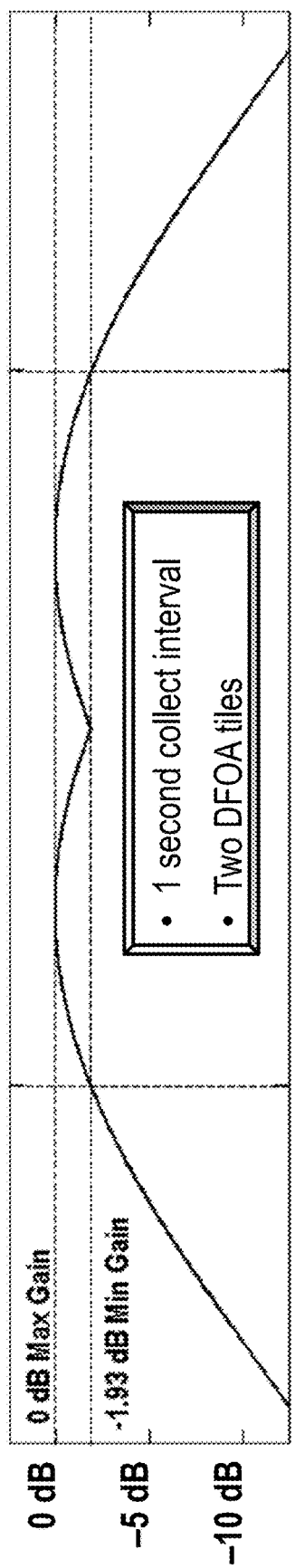
Figure 23C:
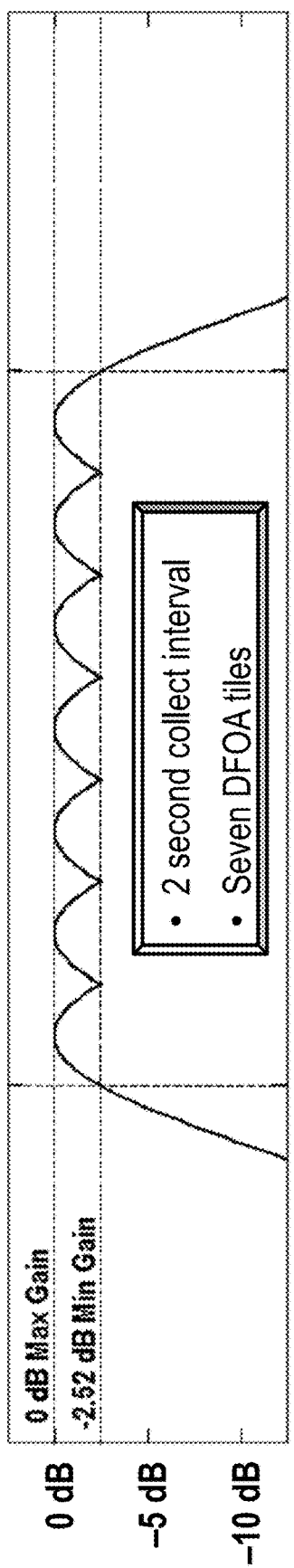

FIGS. 22A, 22B, and 22C, and FIGS. 23A, 23B, and 23C depict DFOA search sensitivity as a function of the number of DFOA search tiles, for a ±3 Hz/s DFOA range, consistent with DFOA's expected for a MEO satellite constellation. FIGS. 22A, 22B, and 22C show search sensitivity relative to 0 Hz/s for a rectangular time window, and for a ½ second (FIG. 22A), 1 second (FIG. 22B), and 2 second (FIG. 22C) reception interval. As shown in FIGS. 22A, 22B, and 22C, the number of search tiles needed to minimize sensitivity loss grows rapidly with reception time. FIGS. 23A, 23B, and 23C show equivalent search sensitivity for a Nuttall time window, which has a time-bandwidth product (TBP) that is roughly half the value of the rectangular window. The Nuttall window can reduce the number of tiles required to perform an effective search at a 2 second reception time. However, this is offset by the lower TBP of the window.

While this invention is susceptible of instantiation in many different forms, there are shown in the drawings and described in detail in the text of Provisional Appl. No. 62/773,589, incorporated herein by reference, and Provisional Appl. No. 62/773,605, incorporated herein by reference, several specific aspects of the invention, with the understanding that the present disclosure is to be considered as an exemplification of the principles of the invention and is not intended to limit the invention to the aspects illustrated.

In an aspects applicable to all of the approaches above, the invention obtains snapshots of baseband navigation data covering the time interval of data collected by the receiver, and symbol-synchronously channelized by the invention, and uses that baseband navigation data to implement non-fully-blind demodulation algorithms. The resultant aspects can provide extreme high precision of FOA, TOA, and DFOA/DTOA drift estimates; assess integrity of data collected by the host platform; and provide other functions of interest to the user. When coupled with a communication channel allowing the receive data to be transported to a central processor, the invention can also allow implementation of all functions at off-line resources, thereby eliminating all DSP complexity associated with the algorithms. The aspects can also be used to implement signal cancellation algorithms that detect signals under the known navigation signals, e.g., for purposes of spoofer and jammer detection.

Any reception operation used in the invention can be implemented using any of the set of one or more dedicated receivers and software defined radios (SDR) either separate from or integrated with antennas, amplifiers, mixers, filters, analog-to-digital converters (ADC's) and signal processing gear.

Operations Processing used in each of the inventions above can be implemented in any combination of hardware and software, from special-purpose hardware including any of application-specific integrated circuits (ASIC's) and field-programmable gate arrays (FPGA's); firmware instructions in a lesser-specialized set of hardware; embedded digital signal processors (e.g. Texas Instrument or Advanced Risc Machine DSP's); graphical processing units (GPU's); vector, polynomic, quantum, and other processors; and in any combination or sole use of serial or parallel processing; and on general-purpose computers using software instructions.

Operations Processing used in each of the inventions above can be further implemented using any set of resources that are on-board, locally accessible to, and remotely accessible by the receiver after transport of the data and instructions to be processed by any of a single computer, server, and set of servers, and then directed onwards, using any number of wired or wireless means for such transport.

Some of the above-described functions may be composed of instructions, or depend upon and use data, that are stored on storage media (e.g., computer-readable medium). Some of the above-described functions may be comprised in EEPROMs, ASICs, or other combinations of digital circuitry for digital signal processing, connecting and operating with the adaptive processor. The instructions and/or data may be retrieved and executed by the adaptive processor. Some examples of storage media are memory devices, tapes, disks, and the like. The instructions are operational when executed by the adaptive processor to direct the adaptive processor to operate in accord with the invention; and the data is used when it forms part of any instruction or result therefrom.

The terms "computer-readable storage medium" and "computer-readable storage media" as used herein refer to any medium or media that participate in providing instructions to a CPU for execution. Such media can take many forms, including, but not limited to, non-volatile (also known as 'static' or 'long-term') media, volatile media and transmission media. Non-volatile media include, for example, one or more optical or magnetic disks, such as a fixed disk, or a hard drive. Volatile media include dynamic memory, such as system RAM or transmission or bus 'buffers'. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes.

Memory, as used herein when referencing to computers, is the functional hardware that for the period of use retains a specific structure which can be and is used by the computer to represent the coding, whether data or instruction, which the computer uses to perform its function. Memory thus can be volatile or static, and be any of a RAM, a PROM, an EPROM, an EEPROM, a FLASH-EPROM, any other memory chip or cartridge, a carrier wave, or any other medium from which a computer can read data, instructions, or both.

I/O, or 'input/output', is any means whereby the computer can exchange information with the world external to the computer. This can include a wired, wireless, acoustic, infrared, or other communications link (including specifically voice or data telephony); a keyboard, tablet, camera, video input, audio input, pen, or other sensor; and a display (2D or 3D, plasma, LED, CRT, tactile, or audio). That which allows another device, or a human, to interact with and exchange data with, or control and command, a computer, is an I/O device, without which any computer (or human) is essentially in a solipsistic state.

While this invention has been described in reference to illustrative aspects of the invenion, this description is not to be construed in a limiting sense. Various modifications and combinations of the illustrative aspects as well as other aspects of the invention will be apparent to those skilled in the art upon referencing this disclosure. It is therefore intended this disclosure encompass any such modifications or aspects.

The scope of this invention includes any combination of the elements from different aspects disclosed in this specification, and is not limited to the specifics of any of the aspects mentioned above. Individual user configurations and aspects of this invention may contain all, or less than all, of the elements disclosed in the specification according to the needs and desires of that user. The claims stated herein should be read as including those elements which are not necessary to the invention yet are in the prior art and are necessary to the overall function of that particular claim, and should be read as including, to the maximum extent permissible by law, known functional equivalents to the elements disclosed in the specification, even though those functional equivalents are not exhaustively detailed herein.

Although the present invention has been described chiefly in terms of the specific aspects of the invention, it is to be understood that the disclosure is not to be interpreted as limiting. Various alterations and modifications will no doubt become apparent to those skilled in the art after having read the above disclosure. Such modifications may involve other features which are already known in the design, manufacture and use of wireless electromagnetic communications networks, systems and MIMO networks and systems therefore, and which may be used instead of or in addition to features already described herein. The algorithms and equations herein are not limiting but instructive of aspects of the invention, and variations which are readily derived through programming or mathematical transformations which are standard or known to the appropriate art are not excluded by omission. Accordingly, it is intended that the appended claims are interpreted as covering all alterations and modifications as fall within the true spirit and scope of the invention in light of the prior art.

Additionally, although claims have been formulated in this application to particular combinations of elements, it should be understood that the scope of the disclosure of the present application also includes any single novel element or any novel combination of elements disclosed herein, either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method performed in a receiver, comprising:
configuring the receiver to select a despreading gain;
providing for symbol-rate synchronous channelizing of a received signal that comprises at least two navigation signals, to produce a plurality of frequency channels;
combining the plurality of frequency channels to produce a combined signal; and
estimating the position of the receiver using the combined signal.

2. The method of claim 1, wherein the at least two navigation signals comprises a ground-based beacon signal.

3. The method of claim 1, wherein the interference comprises near-far interference.

4. The method of claim 3, further comprising employing linear-algebraic combining to remove the near-far interference, wherein the near-far interference is higher than the despreading gain.

5. The method of claim 1, wherein the despreading gain is a function of the plurality of frequency channels.

6. The method of claim 1, wherein configuring the receiver to select the despreading gain comprises provisioning the receiver with a predetermined number of degrees of freedom.

7. The method of claim 1, wherein the symbol-rate synchronous channelizing produces a sufficient number of degrees of freedom to enable the linear-algebraic combining to provide for detection and separation of each of the at least two navigation signals in the presence of arbitrary multipath.

8. The method of claim 1, wherein the symbol-rate synchronous channelizing produces a number of degrees of freedom that exceeds a total number of navigation signals, spoofers, and tonal interferers.

9. The method of claim 1, wherein the symbol-rate synchronous channelizing comprises sparse channelization such that the plurality of frequency channels comprises less than a total bandwidth of the at least one navigation signal.

10. The method of claim 1, wherein the received signal comprises a pilot signal, and the symbol-rate synchronous channelizing provides for a number of degrees of freedom that is sufficient to integrate the pilot signal above noise and interference;
the method further comprising:
integrating the pilot signal above the noise and interference; and
determining geo-observables for the pilot signal.

11. The method of claim 1, further comprising de-emphasizing any of the plurality of frequency channels that contains excessive non-beacon interference.

12. The method of claim 1, wherein providing for symbol-rate synchronous channelizing is configured to adapt the plurality of frequency channels in response to a frequency shift in at least one of the at least two navigation signals.

13. An apparatus, comprising:
one or more processors;
memory in electronic communication with the one or more processors; and instructions stored in the memory and executable by the one or more processors to:
configure a receiver to select a despreading gain;
provide for symbol-rate synchronous channelizing of a received signal that comprises at least two navigation signals, to produce a plurality of frequency channels;
combine the plurality of frequency channels to produce a combined signal; and
estimate the position of the receiver using the combined signal.

14. The apparatus of claim 13, wherein the at least two navigation signals comprises a ground-based beacon signal.

15. The apparatus of claim 13, wherein the interference comprises near-far interference.

16. The apparatus of claim 15, further comprising instructions stored in the memory and executable by the one or more processors to employ linear-algebraic combining to remove the near-far interference, and wherein the near-far interference is higher than the despreading gain.

17. The apparatus of claim 13, wherein the despreading gain is a function of the plurality of frequency channels.

18. The apparatus of claim 13, wherein the despreading gain is selected by provisioning the receiver with a predetermined number of degrees of freedom.

19. The apparatus of claim 13, wherein the symbol-rate synchronous channelizing produces a sufficient number of degrees of freedom to enable the linear- algebraic combining to provide for detection and separation of each of the at least two navigation signals in the presence of arbitrary multipath.

20. The apparatus of claim 13, wherein the symbol-rate synchronous channelizing produces a number of degrees of freedom that exceeds a total number of navigation signals, spoofers, and tonal interferers.

21. The apparatus of claim 13, wherein the symbol-rate synchronous channelizing comprises sparse channelization such that the plurality of frequency channels comprises less than a total bandwidth of the at least one navigation signal.

22. The apparatus of claim 13, wherein the received signal comprises a pilot signal, and the symbol-rate synchronous channelizing provides for a number of degrees of freedom that is sufficient to integrate the pilot signal above noise and interference;
the apparatus further comprising instructions stored in the memory and executable by the one or more processors to:
integrate the pilot signal above the noise and interference; and
determine geo-observables for the pilot signal.

23. The apparatus of claim 13, further comprising instructions stored in the memory and executable by the one or more processors to de-emphasize any of the plurality of frequency channels that contains excessive non-beacon interference.

24. The apparatus of claim 13, wherein the symbol-rate synchronous channelizing is configured to adapt the plurality of frequency channels in response to a frequency shift in at least one of the at least two navigation signals.

* * * * *